(12) United States Patent
Daniell et al.

(10) Patent No.: US 7,853,668 B2
(45) Date of Patent: Dec. 14, 2010

(54) COMMUNICATION THREADS OVER DIFFERENT COMMUNICATION MEDIUMS

(75) Inventors: W. Todd Daniell, Kennesaw, GA (US); Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 516 days.

(21) Appl. No.: 11/300,998

(22) Filed: Dec. 15, 2005

(65) Prior Publication Data

US 2006/0168315 A1    Jul. 27, 2006

Related U.S. Application Data

(63) Continuation-in-part of application No. 10/686,344, filed on Oct. 14, 2003, now abandoned, which is a continuation-in-part of application No. 10/326,479, filed on Dec. 19, 2002, and a continuation-in-part of application No. 10/274,405, filed on Oct. 18, 2002, now abandoned.

(60) Provisional application No. 60/411,336, filed on Sep. 17, 2002, provisional application No. 60/416,916, filed on Oct. 8, 2002, provisional application No. 60/419,613, filed on Oct. 17, 2002, provisional application No. 60/426,145, filed on Nov. 14, 2002, provisional application No. 60/426,146, filed on Nov. 14, 2002, provisional application No. 60/426,422, filed on Nov. 14, 2002, provisional application No. 60/426,432, filed on Nov. 14, 2002, provisional application No. 60/426,440, filed on Nov. 14, 2002, provisional application No. 60/411,336, filed on Sep. 17, 2002, provisional application No. 60/419,613, filed on Oct. 17, 2002.

(51) Int. Cl.
    *G06F 15/16*    (2006.01)

(52) U.S. Cl. .......... 709/217; 709/204; 709/206; 709/207; 715/751; 715/752; 715/753; 715/758

(58) Field of Classification Search ........... 709/204, 709/206, 207, 217; 715/751, 752, 753, 758
See application file for complete search history.

(56) References Cited

U.S. PATENT DOCUMENTS

| 5,880,731 A | 3/1999 | Liles et al. |
|---|---|---|
| 6,014,136 A | 1/2000 | Ogasawara et al. |

(Continued)

OTHER PUBLICATIONS

Day; "A Model for Presence and Instant Messaging", Feb. 2000, pp. 1-17.

(Continued)

*Primary Examiner*—Yves Dalencourt
(74) *Attorney, Agent, or Firm*—Akerman Senterfitt; Michael K. Dixon; Peter A. Chiabotti

(57) ABSTRACT

Included herein are systems and methods for associating information related to a first communication and information related to a second communication. At least one embodiment of a method includes receiving a first communication, the first communication being associated with a first communications protocol; and associating the received first communication with a communication thread. Additionally embodiments of the method include receiving a second communication, the second communication associated with a second communications protocol, wherein the first communications protocol is different than the second communications protocol; and associating the second communication with the communication thread. Other methods and devices are also provided.

23 Claims, 55 Drawing Sheets

U.S. PATENT DOCUMENTS

| | | | |
|---|---|---|---|
| 6,525,747 | B1 | 2/2003 | Bezos |
| 7,032,007 | B2 | 4/2006 | Fellenstein et al. |
| 7,058,082 | B1 * | 6/2006 | Bhat et al. .................. 370/466 |
| 7,076,042 | B1 * | 7/2006 | Praturi et al. .......... 379/201.01 |
| 7,139,761 | B2 | 11/2006 | McKibben et al. |
| 7,328,242 | B1 * | 2/2008 | McCarthy et al. ........... 709/204 |
| 2001/0048449 | A1 | 12/2001 | Baker |
| 2001/0055036 | A1 | 12/2001 | Burstrom |
| 2002/0065887 | A1 | 5/2002 | Paik et al. |
| 2002/0087645 | A1 | 7/2002 | Ertugrul et al. |
| 2002/0089537 | A1 * | 7/2002 | Balasubramanian ........ 345/751 |
| 2002/0123359 | A1 | 9/2002 | Wei et al. |
| 2002/0143877 | A1 | 10/2002 | Hackbarth et al. |
| 2003/0088623 | A1 | 5/2003 | Kusuda |
| 2003/0090518 | A1 | 5/2003 | Chien et al. |
| 2003/0105815 | A1 | 6/2003 | Gusler et al. |
| 2004/0080534 | A1 | 4/2004 | Quach |
| 2004/0172456 | A1 | 9/2004 | Green et al. |
| 2004/0193722 | A1 * | 9/2004 | Donovan .................... 709/230 |
| 2005/0060656 | A1 | 3/2005 | Martinez et al. |
| 2007/0006094 | A1 | 1/2007 | Canfield et al. |

OTHER PUBLICATIONS

Day; "Instant Messaging/ Presence Protocol Requirements", Feb. 2000, pp. 1-26.

W3C; "Extensible Markup Language (XML) 1.0", W3C Recommendation, Second Edition, Oct. 6, 2000, pp. 1-59.

Trillian; Features, Tour, messaging Enhancements, Connect to 5 Mediums, Interface Overview, Features Tour, Gallery-Contact List, Sending Pictures, Message Windows, Apr. 23, 2003, pp. 1-9.

Jabber; "Open Instant Messaging Powered by XMPP",www.jabber.org, Apr. 23, 2003, pp. 1-3.

Saint-Andre; XMPP Instant Messaging-draft-ietf-xmp-im-12, Jabber Software Foundation, Jun. 4, 2003, pp. 1-88.

Wayback Machine; http://web.archive.org/web/;then type www.albion.com; then wherein; http//:web.archive.org/web/*/http://www.albion.com; click on link: Jan. 25, 1997; click on link "The Chat Chapter" http//:web.archive.org/web/19970125101157.

Daniell; U.S. Appl. No. 10/686,344, filed Oct. 14, 2003.

Daniell; Non- Final Rejection mailed Oct. 12, 2006; U.S. Appl. No. 10/686,344, filed Oct. 14, 2003.

Daniell; Final Rejection mailed Feb. 6, 2007;U.S. Appl. No. 10/686,344, filed Oct. 14, 2003.

Daniell; Non- Final Rejection mailed May 29, 2007; U.S. Appl. No. 10/686,344, filed Oct. 14, 2003.

Daniell; Final Rejection mailed Nov. 1, 2007; U.S. Appl. No. 10/686,344, filed Oct. 14, 2003.

Daniell; Examiner Interview Summary Record mailed Dec. 14, 2006 for U.S. Appl. No. 10/686,344, filed Oct. 14, 2003.

Daniell; Non-Final Rejection mailed May 14, 2008 for U.S. Appl. No. 10/686,344, filed Oct. 14, 2003.

* cited by examiner

| ADDRESS BOOK | | | ⌀ ⊝ ⊙ ⊗ |
|---|---|---|---|

YOUR CONTACTS ARE IN ALPHABETICAL ORDER BY LAST NAME. TO FIND A SPECIFIC CONTACT, YOU CAN SCROLL THROUGH THE LIST OR USE THE SELECTION BUTTONS BELOW TO NARROW YOUR SEARCH. TO SEE A CONTACT'S COMPLETE INFORMATION DETAILS SELECT "CLICK."

| LAST NAMES A-K | LAST NAMES L-Z | NUMBERS | E-MAIL LISTS |
|---|---|---|---|

| SELECT RECIPIENTS | | 1110 | 1115 | 1120 |
|---|---|---|---|---|
| TO: | CC: | NAME | E-MAIL ADDRESS | |
| ☒ | ☐ | BACH, JOHANN | BACHMAN@AOL.COM | DETAILS |
| ☐ | ☐ | BAER, MAX | MAX@BELLSOUTH.NET | DETAILS |
| ☒ | ☐ | BALDWIN, ALEC | BALD@EARTHLINK.NET | DETAILS |
| ☐ | ☒ | BALDWIN, KIM | KIM@BELLSOUTH.NET | DETAILS |
| ☐ | ☒ | BEST, PETE | BEST@HOTMAIL.COM | DETAILS |
| ☐ | ☐ | BUNDY, AL | BUNDY@EXCITE.COM | DETAILS |
| ☐ | ☐ | BUNDY, PEG | PEGGY@AOL.COM | DETAILS |
| ☐ | ☒ | CARTER, JIMMY | PEANUT@GO.COM | DETAILS |

305

| WRITE 1125 | NEW CONTACT 1130 | NEW E-MAIL LIST 1135 | DELETE 1140 | EDIT 1145 | CANCEL 1150 |
|---|---|---|---|---|---|

| ADD NEW CONTACT | ? ⊖ ▢ ⊗ |
|---|---|

CONTACT NAME

LAST [HOWARD]    FIRST [CURLY]    M.I. [Q]    1260

E-MAIL

[CURLY@BELLSOUTH.NET] [WORK ▽]
[WISEGUY@STOOGE.NET] [HOME ▽]
1265

E-MAIL LIST(S)

STOOGE GROUP    [EDIT]
1270

PHONE NUMBER(S)    1275

[770-555-6789] [WORK ▽]
[404-555-1234] [HOME ▽]
[678-555-5432] [CELL ▽]

INSTANT MESSAGING (IM)

ENTER IM ADDRESS(ES) HERE, TO CHAT FROM "READ" WINDOW

[CURLY2002]    [BELLSOUTH]
[STOOGES1935]  [AOL ▽]
[THECURLYMAN]  [HOTMAIL ▽]
[WHYIOTTA]     [PASSPORT ▽]
1280

STREET ADDRESS

[1313 MOCKINGBIRD LN.] LINE 1
[SUITE 1234] LINE 2
[ATLANTA] CITY [GA ▽] STATE
[30338] ZIP
1285

DESCRIPTION

CURLY HAS TWO BROTHERS, MOE AND SHEMP. SHEMP IS NOT TOO FUNNY. HIS BIRTHDAY IS IN AUGUST. DO NOT LEAVE HIM IN CHARGE.
1290

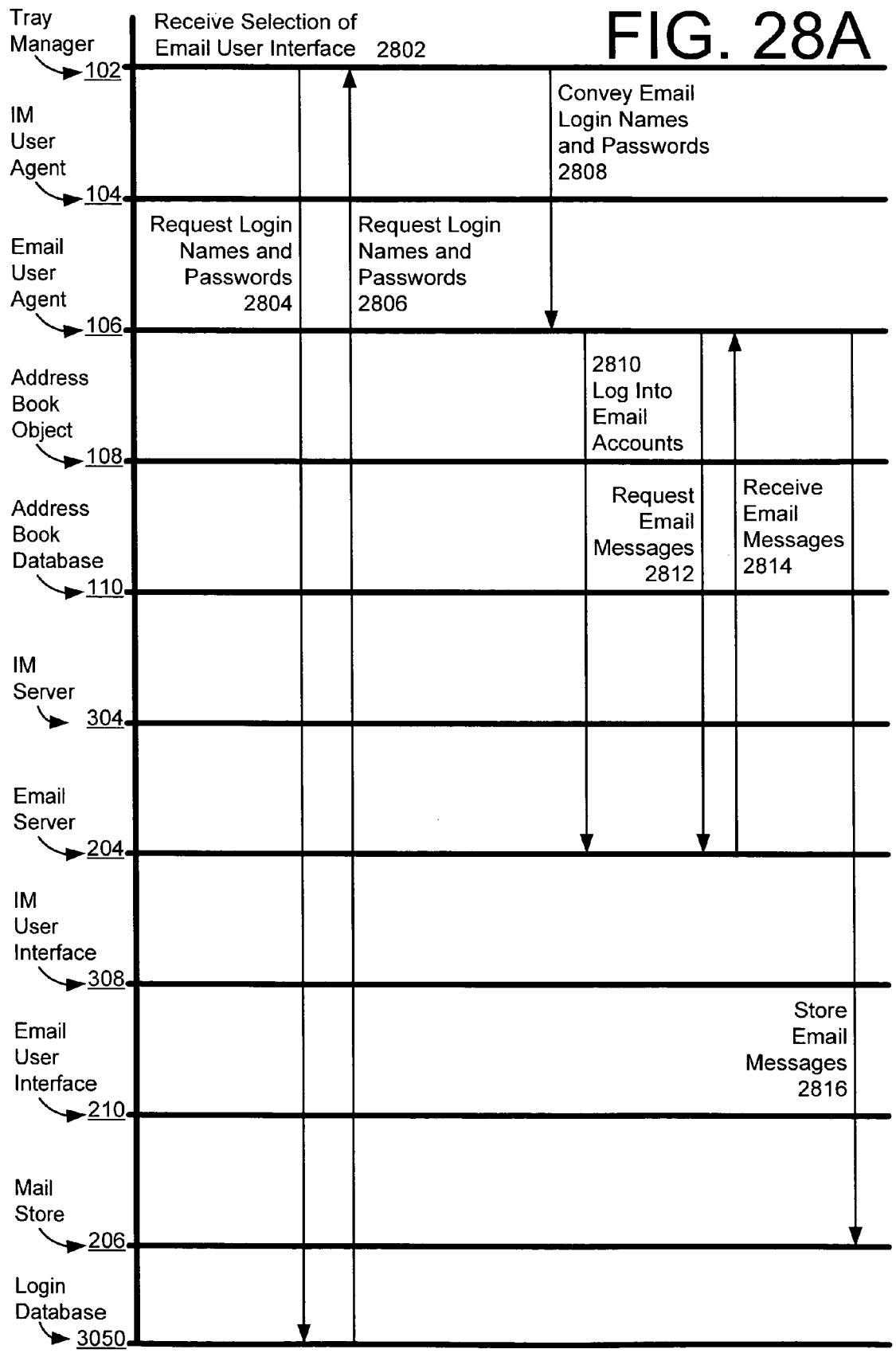

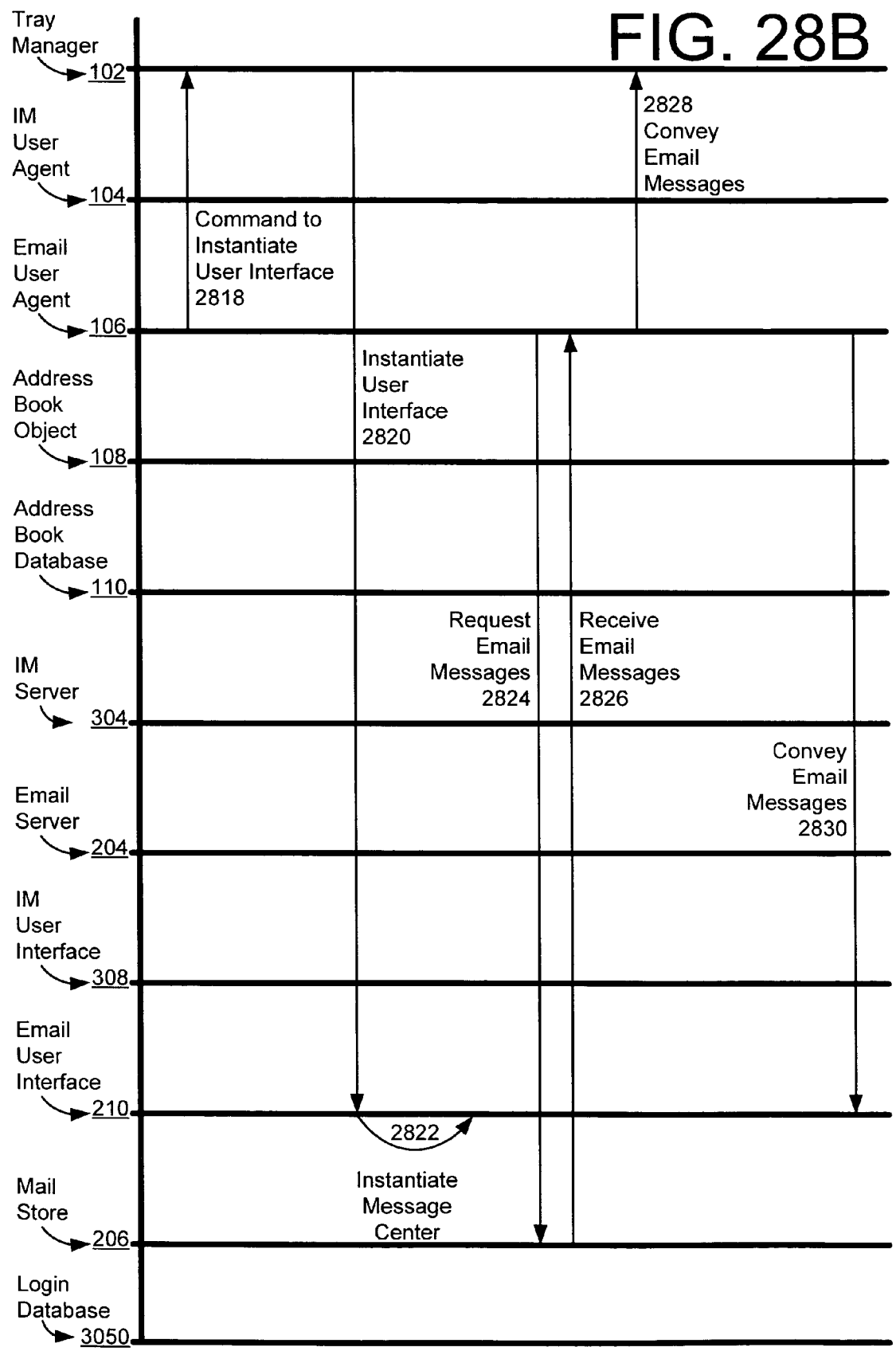

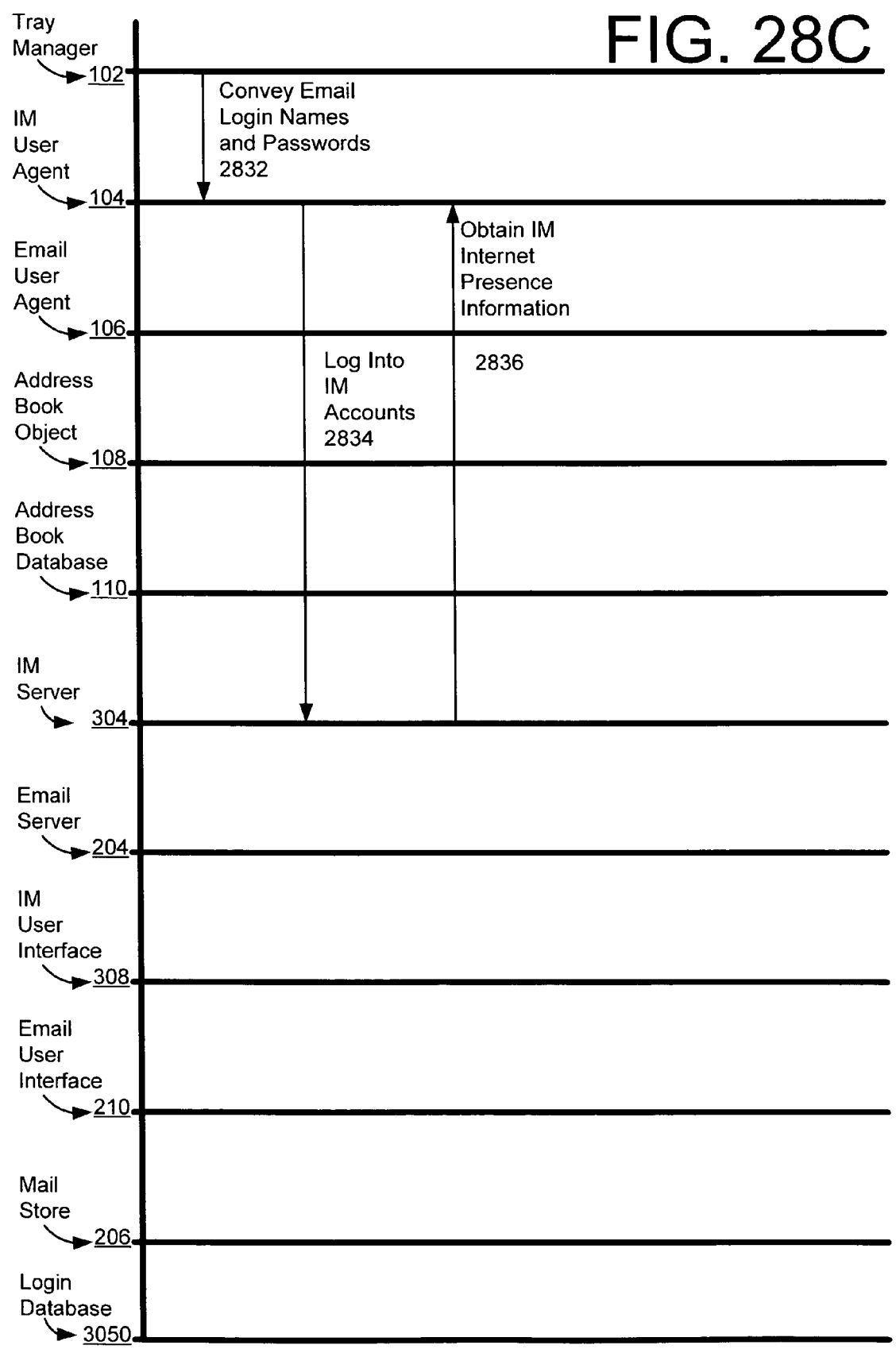

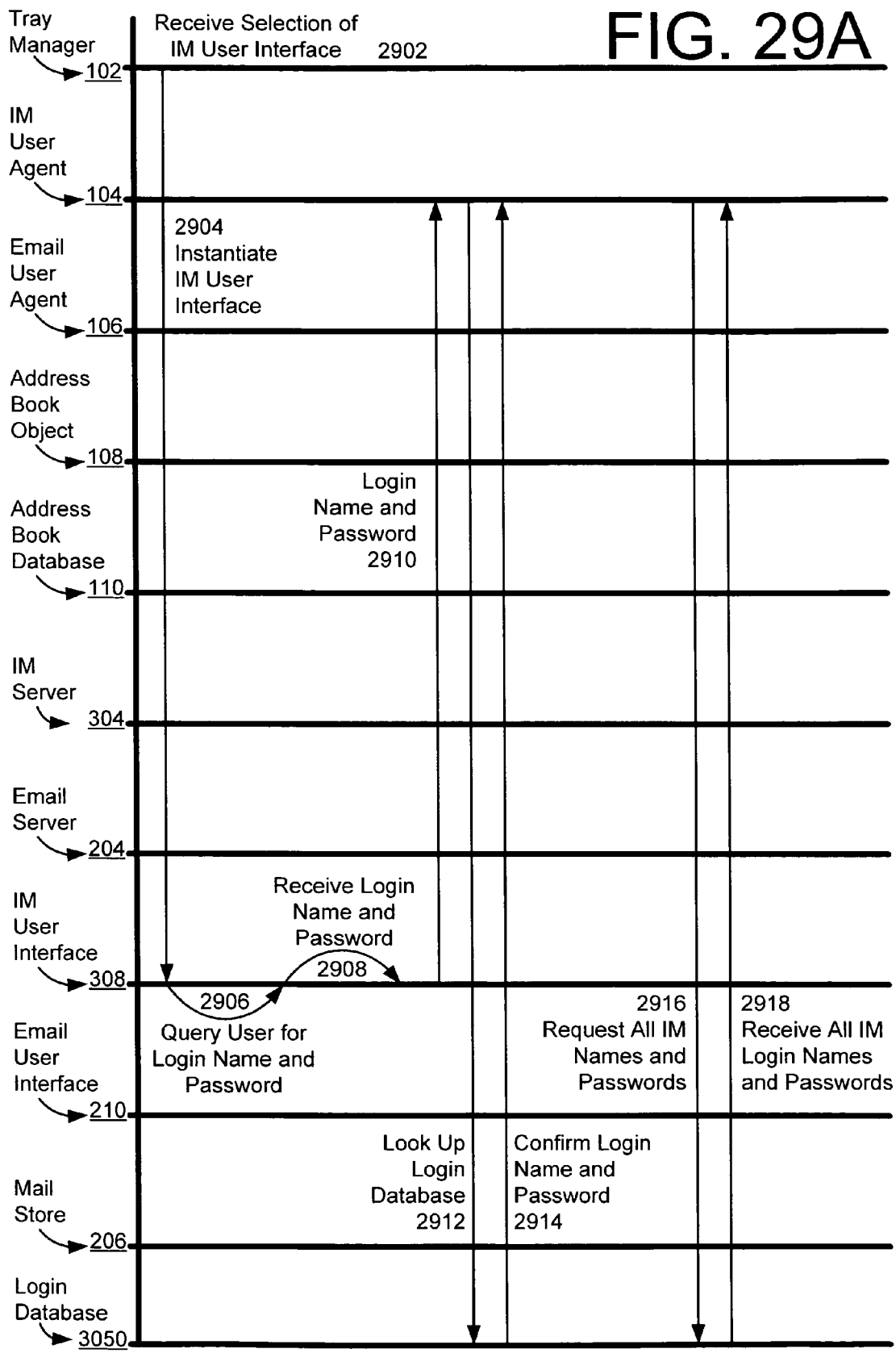

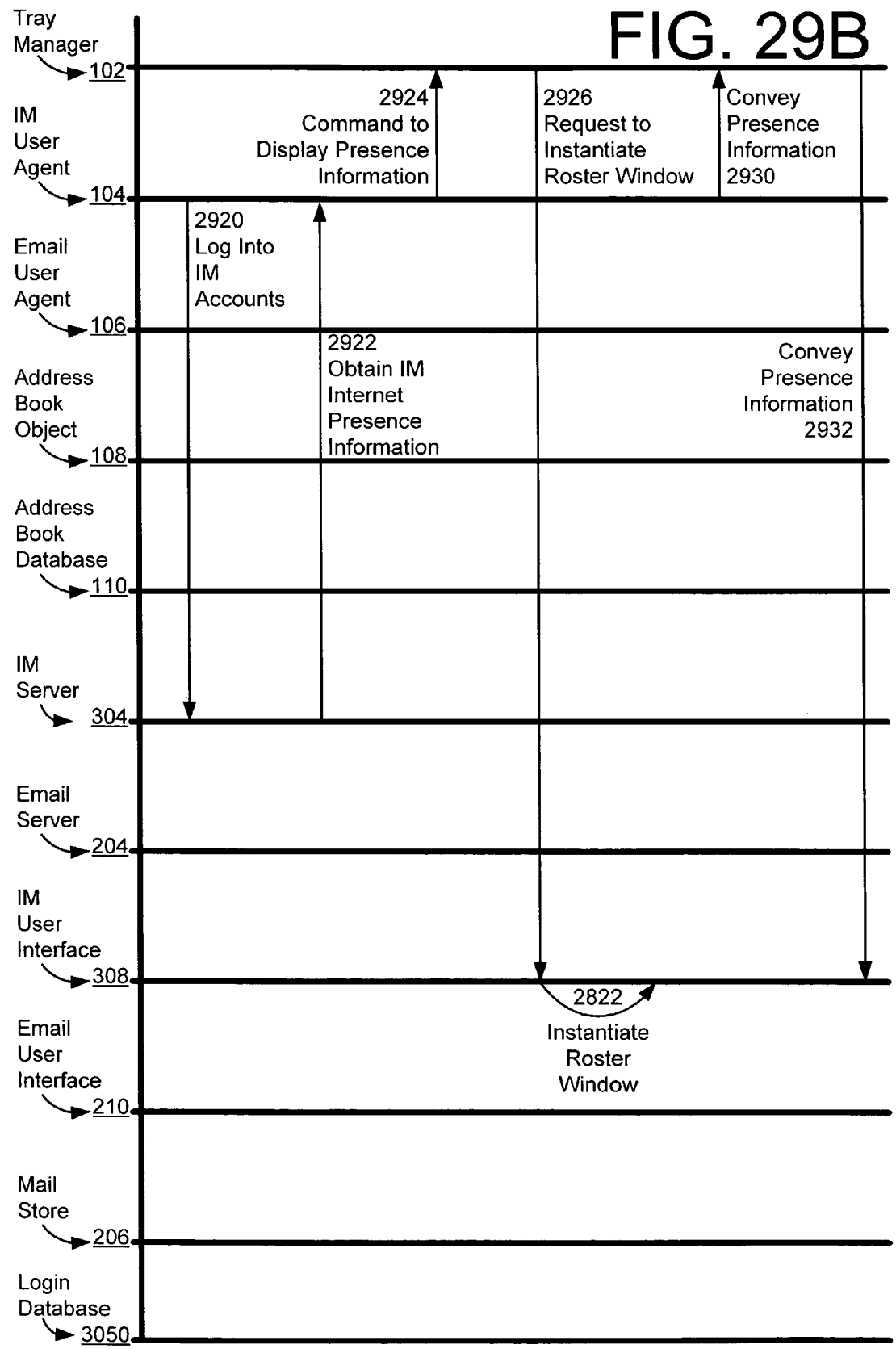

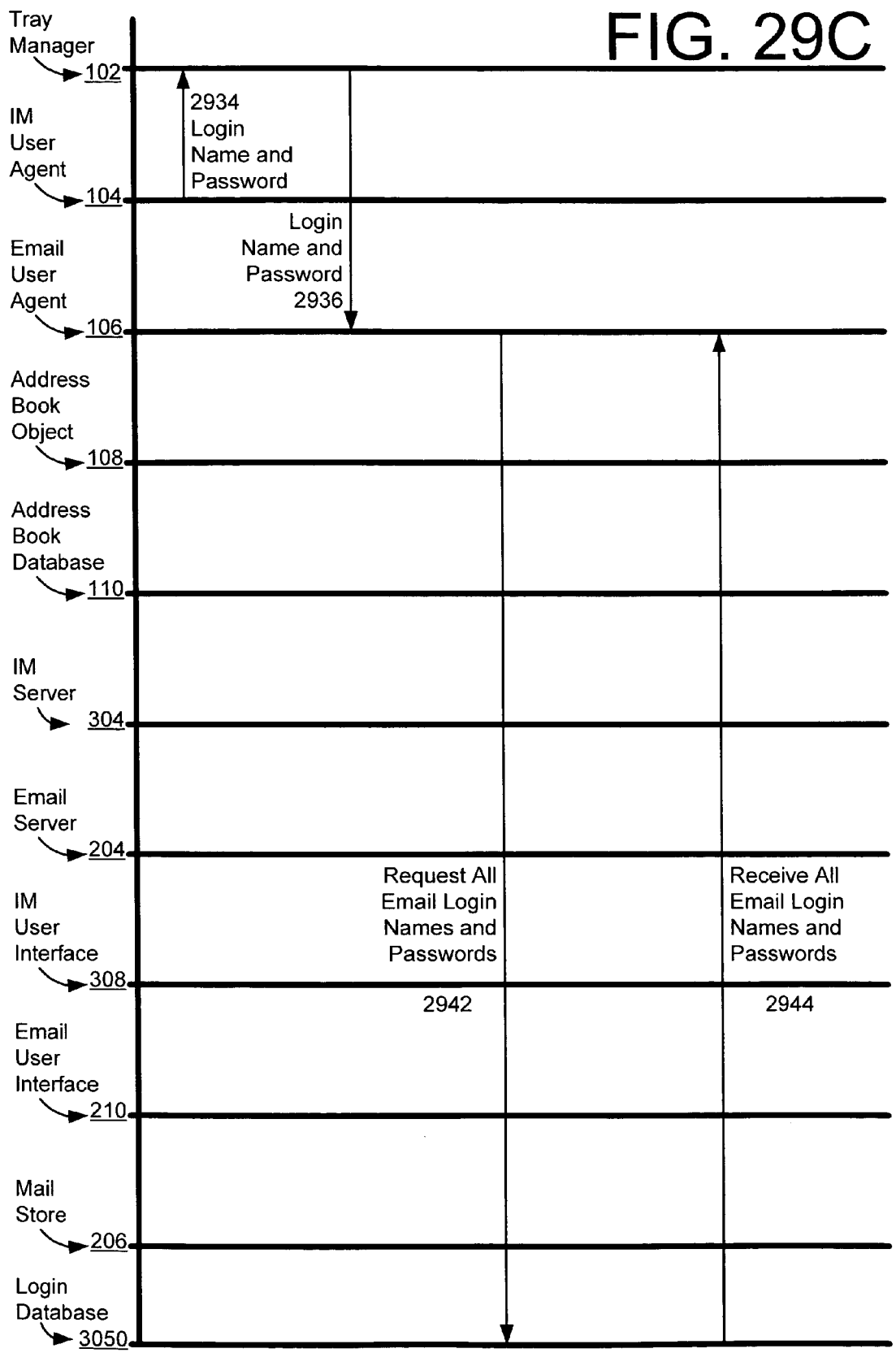

COMMUNICATION THREADS OVER DIFFERENT COMMUNICATION MEDIUMS

CROSS REFERENCE TO RELATED APPLICATIONS

This application is a continuation-in-part (CIP) of U.S. patent application Ser. No. 10/686,344, Oct. 14, 2003 now abandoned, which is a CIP of U.S. patent application Ser. No. 10/326,479, filed on Dec. 19, 2002, still pending, which claims the benefit of U.S. provisional patent application Ser. Nos. 60/411,336, filed Sep. 17, 2002; 60/416,916, filed Oct. 8, 2002; 60/419,613, filed Oct. 17, 2002; 60/426,145, filed Nov. 14, 2002; 60/426,146, filed Nov. 14, 2002; 60/426,422, filed Nov. 14, 2002; 60/426,432, filed Nov. 14, 2002; and 60/426,440, filed Nov. 14, 2002. The U.S. patent application Ser. No. 10/686,344, to which this application is a CIP, is also a CIP of U.S. patent application Ser. No. 10/274,405, filed Oct. 18, 2002, now abandoned, which claims the benefit of U.S. provisional patent application Ser. Nos. 60/411,336, filed Sep. 17, 2002; and 60/419,613, filed on Oct. 17, 2002.

The above-referenced applications are incorporated herein by reference as if set forth in their entireties.

FIELD OF DISCLOSURE

The present disclosure relates generally to digital communications and, more particularly, to instant messaging (IM).

BACKGROUND

With the advent of the Internet, different forms of digital communications have recently appeared. Examples of such digital communications include email and instant messaging (IM). Often, in IM, one user communicates with another user in near real time. Unlike email, which resides on a server or a client until deleted, IM messages typically vanish when an IM chat session is terminated, unless that IM chat session is recorded in an IM chat transcript.

Currently, systems and methods exist in which instant messaging (IM) chat sessions are recorded in an IM chat transcript. Often, these systems and methods provide mechanisms for either activating or deactivating the chat transcript. Typically, when the option to record the chat transcript is activated, every IM chat session is recorded. Conversely, when the option to record the chat transcript is deactivated, then none of the IM chat sessions are recorded.

In view of this deficiency, a heretofore-unaddressed need exists in the industry for selectively recording IM chat transcripts.

SUMMARY

Briefly described, embodiments discussed herein include a method for associating information related to a first communication and information related to a second communication, embodiments of the method include receiving a first communication, the first communication being associated with a first communications protocol; and associating the received first communication with a communication thread. Other embodiments of the method include receiving a second communication, the second communication associated with a second communications protocol, wherein the first communications protocol is different than the second communications protocol; and associating the second communication with the communication thread.

Additionally included in this disclosure are embodiments of a computer readable medium for associating information related to a first communication and information related to a second communication. Also embodiment of the computer readable medium includes logic configured to receive a first communication, the first communication being associated with a first communications protocol; and logic configured to associate the received first communication with a communication thread. Other embodiment of the computer readable medium include logic configured to receive a second communication, the second communication associated with a second communications protocol, wherein the first communications protocol is different than the second communications protocol; and logic configured to associate the second communication with the communication thread.

Also included in this disclosure are embodiments of a client device including software for associating a first communication with a second communication in a common thread. At least one embodiment of the software includes logic configured to receive a first communication, the first communication being associated with a first communications protocol; and logic configured to associate the received first communication with a communication thread. Other embodiments of the software include logic configured to receive a second communication, the second communication associated with a second communications protocol, wherein the first communications protocol is different than the second communications protocol; and logic configured to associate the second communication with the communication thread.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 11 is a diagram showing one embodiment of the address book user interface of FIG. 7 in greater detail.

FIG. 12 is a diagram showing one embodiment of a user interface for adding new contact information.

FIGS. 28A through 28C are data flow diagrams corresponding to FIGS. 2A through 2C.

FIGS. 29A through 29D are data flow diagrams corresponding to FIGS. 3A through 3C.

DETAILED DESCRIPTION

Figure 1:
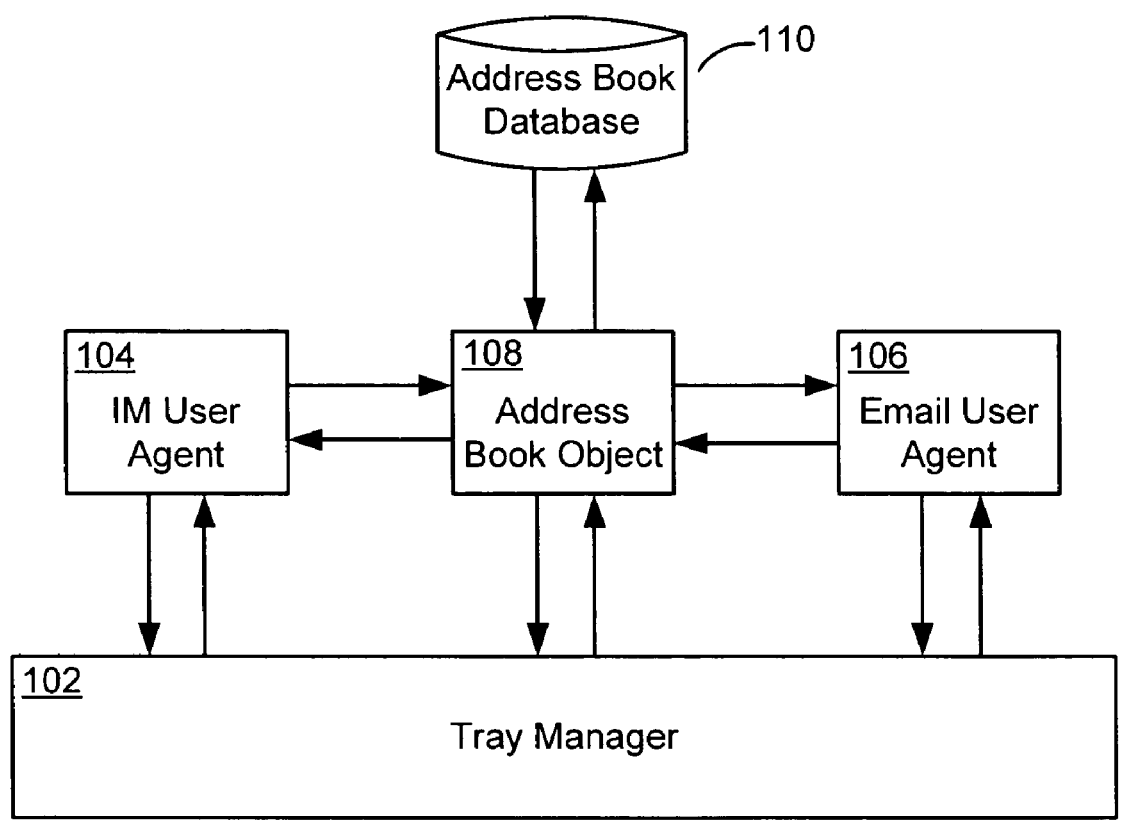
FIG. 1 is a block diagram showing one embodiment of component architecture for integrating instant messaging (IM) and email.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawings specifically describe integration of instant messaging (IM) and email, it will be clear to one of ordinary skill in the art that the systems and methods presented herein may be extended to integrating other messaging protocols such as voice-over Internet protocol (VoIP), video conferencing, etc.

FIG. 1 is a block diagram showing one embodiment of component architecture for integrating instant messaging (IM) and email. As shown in FIG. 1, one embodiment of a system for integrating IM and email comprises a tray manager 102, an IM user agent 104, an email user agent 106, an address book object 108, and an address book database 110.

In an example embodiment, the various components 102, 104, 106, 108, 110 may be seen as software modules, which are launched by a user on a personal computer (not shown) or other programmable device (not shown). In another embodiment, the various components 102, 104, 106, 108, 110 may be seen as software objects in a distributed network (not shown), which are instantiated and destroyed by appropriate software commands. Since instantiation and destruction of objects in distributed networks is well known, further discussion of object instantiation and destruction is omitted.

In one embodiment, the various components 102, 104, 106, 108, 110 of FIG. 1 are software modules on a user's personal computer (not shown). In this regard, the software modules are installed on a user's personal computer and, thereafter, are launched by the user. During installation of the software modules, the user is queried for the user's login names and passwords for all of the user's email accounts and all of the user's IM accounts. The login names and passwords for the user's email and IM accounts are stored in a login database (not shown) for subsequent use by the software modules.

Upon installation of the software modules onto the personal computer (not shown), a user launches the tray manager 102. The tray manager 102 generates commands to launch the IM user agent 104, the address book object 108, the email user agent 106, and the address book database 110 as background processes. In response to the generated commands, the various components 104, 106, 108, 110 are launched as background processes. The address book object 108 is coupled to the address book database 110 so that information may be stored to the address book database 110 by the address book object 108 or retrieved from the address book database 110 by the address book object 108. Information stored in the address book database 110 may include, for example, names and email addresses of the user's email contacts, names and IM addresses of the user's IM contacts, phone numbers for the various email and IM contacts, mailing addresses for the various email and IM contacts, business addresses for the various email and IM contacts, etc. Examples of the address book database 110 are shown in greater detail with reference to FIGS. 13A and 13B.

The IM user agent 104 and the email user agent 106 are configured to communicate with the address book object 108. In this regard, the address book object 108 functions as an interface between the IM user agent 104 and the email user agent 106. In a broader sense, the address book object 108 interfaces the entire IM system (not shown in FIG. 1) to the entire email system (not shown in FIG. 1), thereby providing integration between the email system and the IM system.

The tray manager 102 is configured to track communications between with the IM user agent 104, the address book object 108, and the email user agent 106. In this regard, the tray manager 102 receives commands from the IM user agent 104, the address book object 108, and the email user agent 106. Similarly, the tray manager 102 generates commands and directs the generated (or received) commands to the IM user agent 104, the address book object 108, and the email user agent 106. Thus, in a general sense, the tray manager 102 receives information (e.g., commands, requests, data, etc.) and directs the received information to the appropriate software module. The interplay between the various components 102, 104, 106, 108, 110 is described below in greater detail. However, it is worthwhile to note that the various launched components 102, 104, 106, 108, 110 provide a mechanism by which integration between the IM system and the email system is achieved.

In another embodiment, the various components 102, 104, 106, 108, 110 of FIG. 1 are objects in a distributed network (not shown). In this regard, subsequent to installation of the software modules, when a user launches the tray manager 102, the tray manager 102 instantiates the IM user agent 104, the address book object 108, the email user agent 106, and the address book database 110 and runs these objects on the client system (not shown) as background processes. The address book object 108 is coupled to the address book database 110 so that information may be stored to the address book database 110 by the address book object 108 or retrieved from the address book database 110 by the address book object 108. The IM user agent 104 and the email user agent 106 communicate with the address book object 108, thereby using the address book object 108 as an interface between the IM user agent 104 and the email user agent 106. As described above, the various instantiated components 104, 106, 108, 110 provide a mechanism by which integration between the IM system and the email system is achieved.

In one embodiment, the address book database 110 may be located at a client machine (not shown) with a duplicate copy (not shown) stored at a server (not shown). In that embodiment, the copy of the address book database at the server may be updated by the address book database 110 at the client machine when a user logs into the server. Similarly, the copy of the address book database at the server may be updated by the address book database 110 at the client machine when the user logs out of the server. In this regard, a user may edit contents of the address book database 110 while the user is "off line," and the updated contents may be uploaded to the copy of the address book database at the server when the user logs into the server.

Figure 2A:
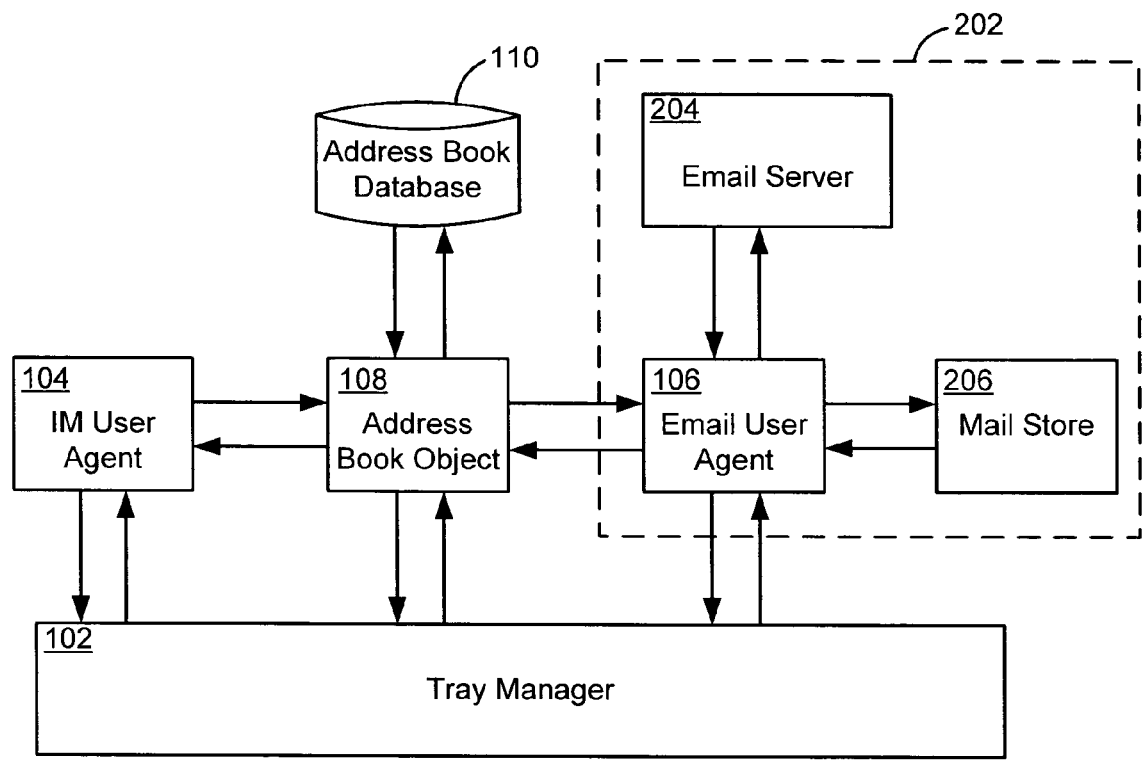
FIGS. 2A through 2C are block diagrams showing one embodiment of component architecture related to email services.
Figure 2B:
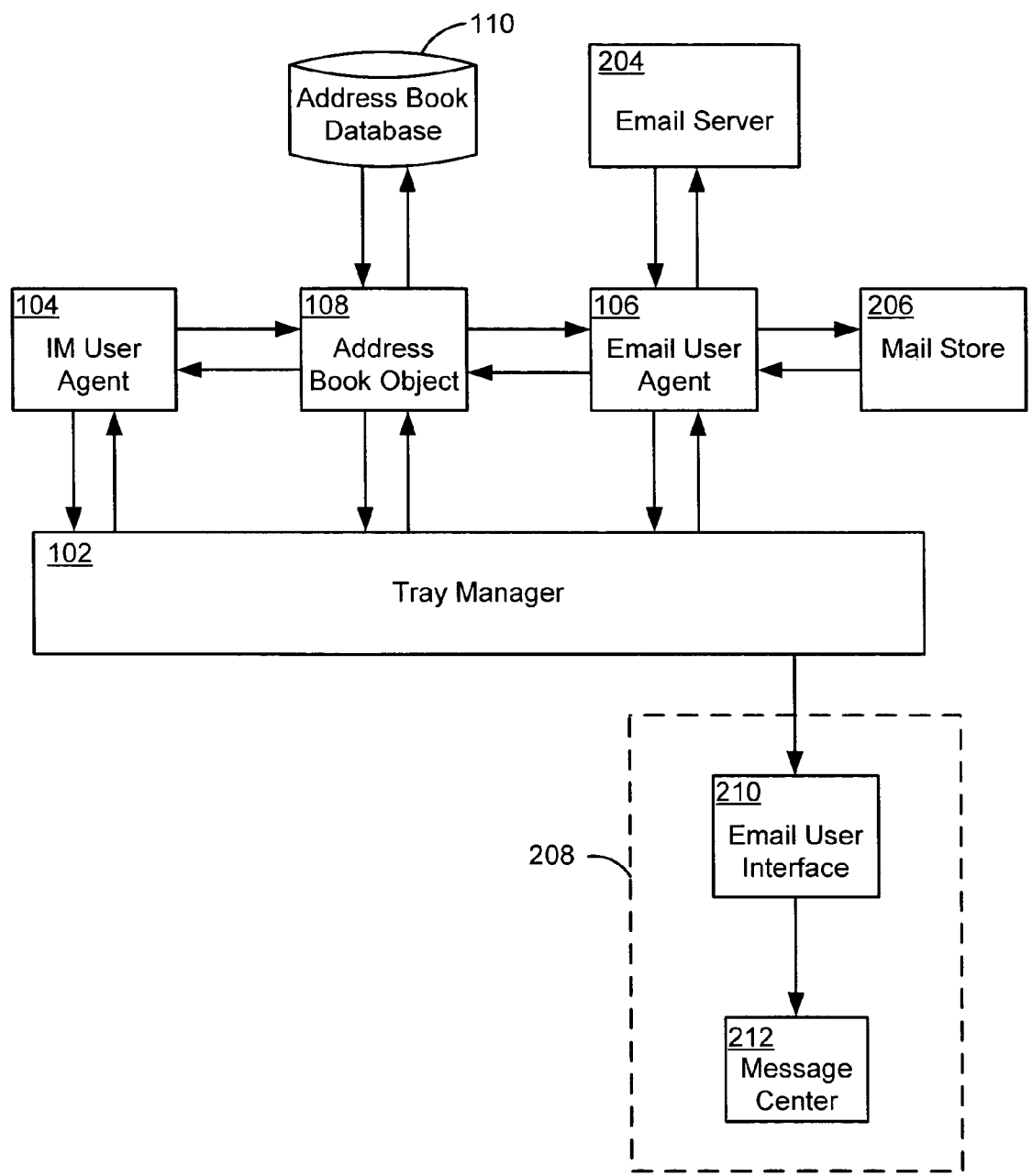
Figure 2C:
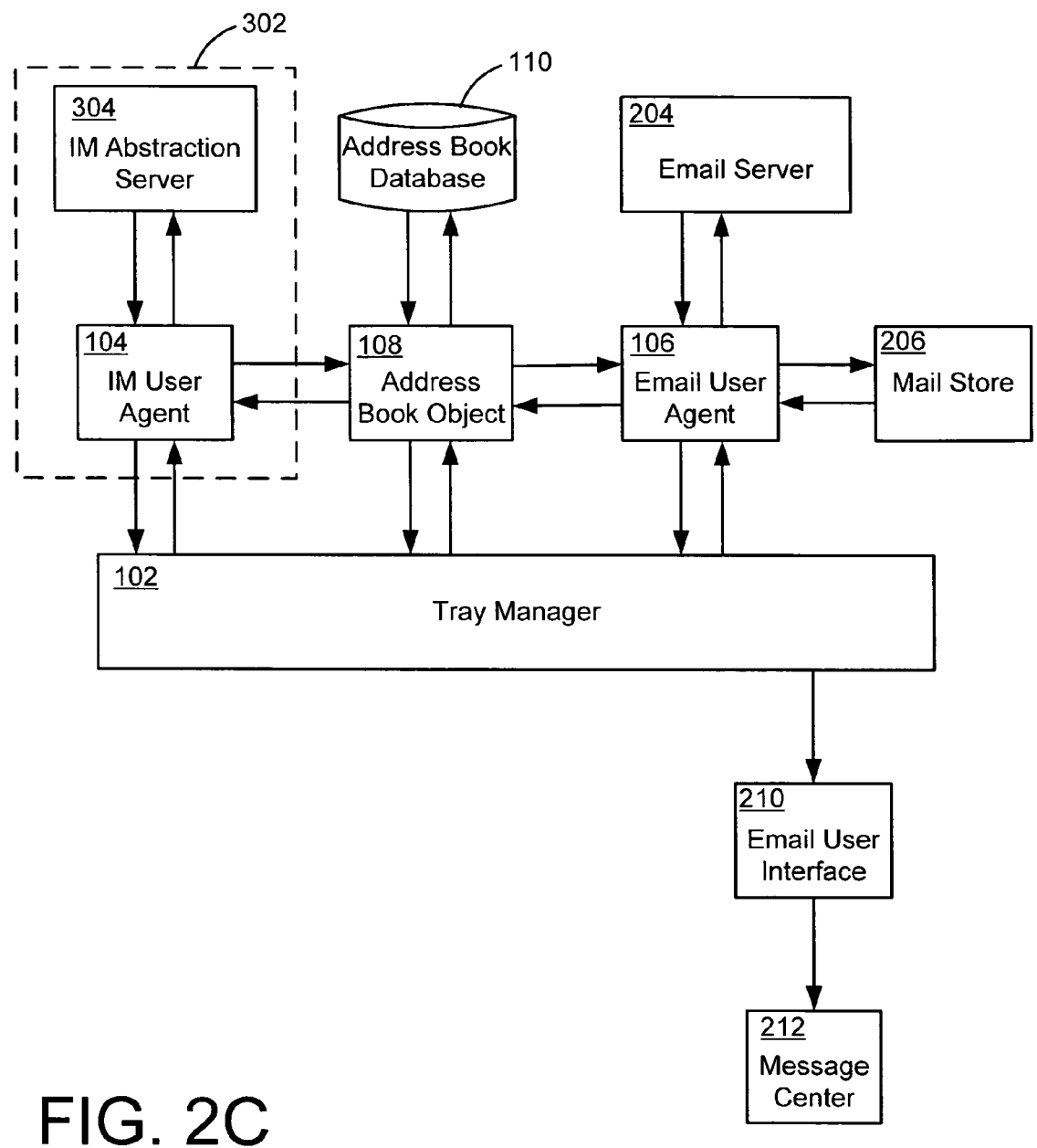
Figure 3A:
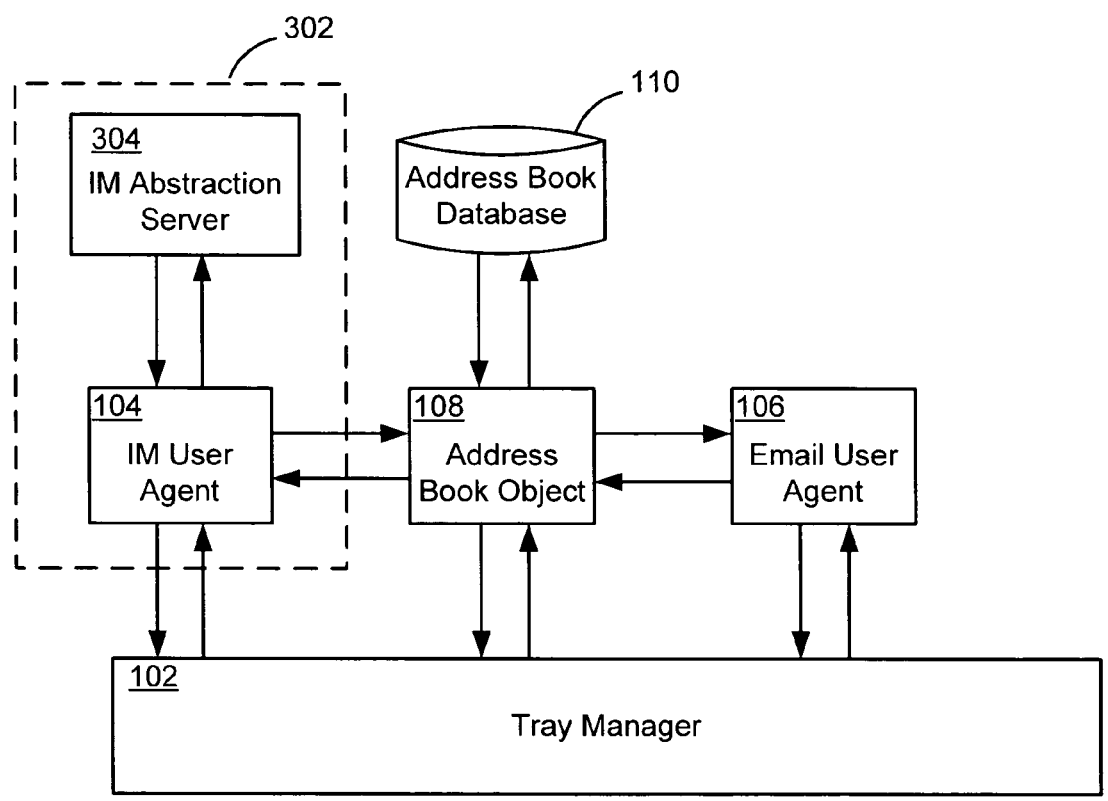
FIGS. 3A through 3C are block diagrams showing one embodiment of component architecture related to IM services.
Figure 3B:
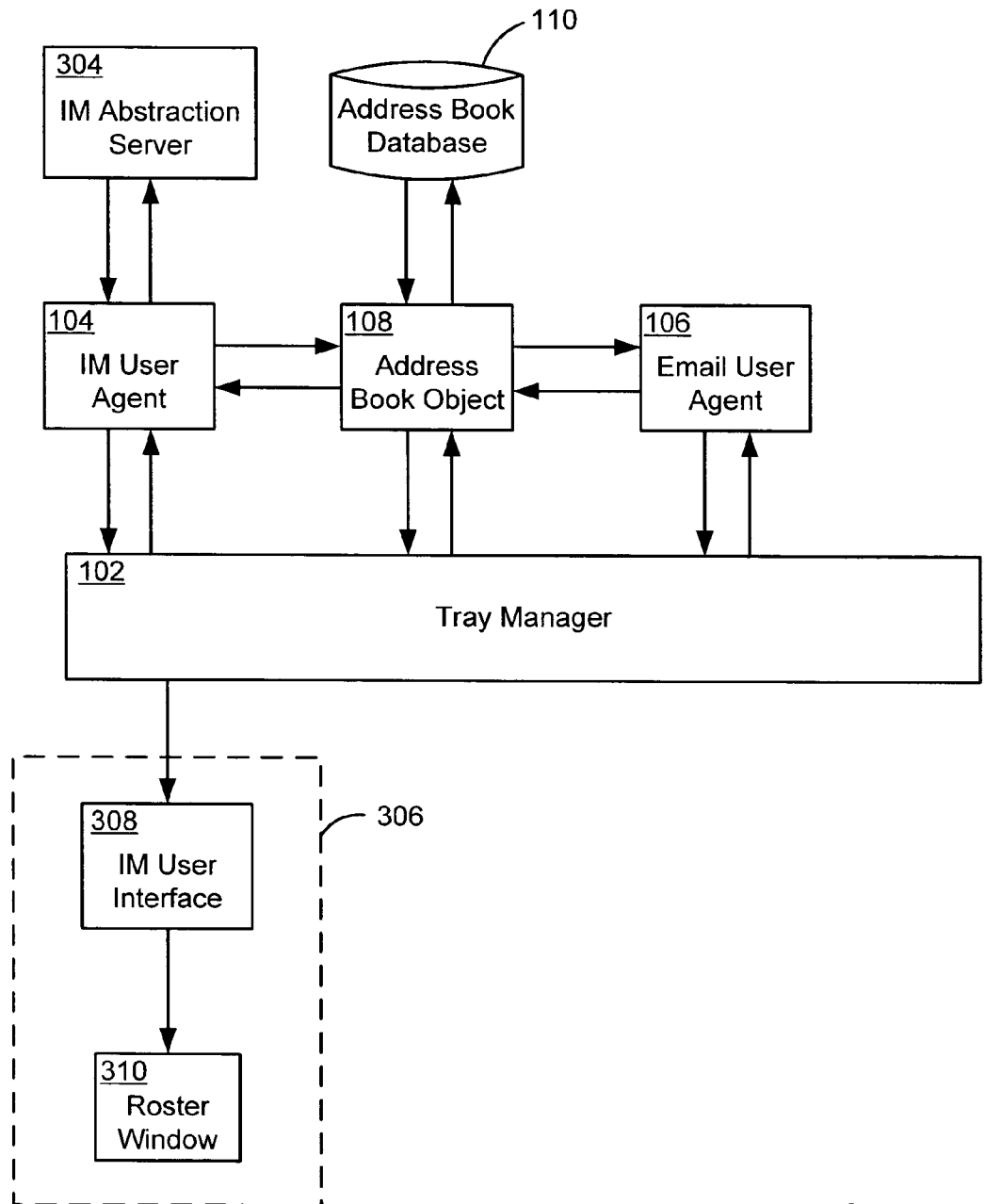
Figure 3C:
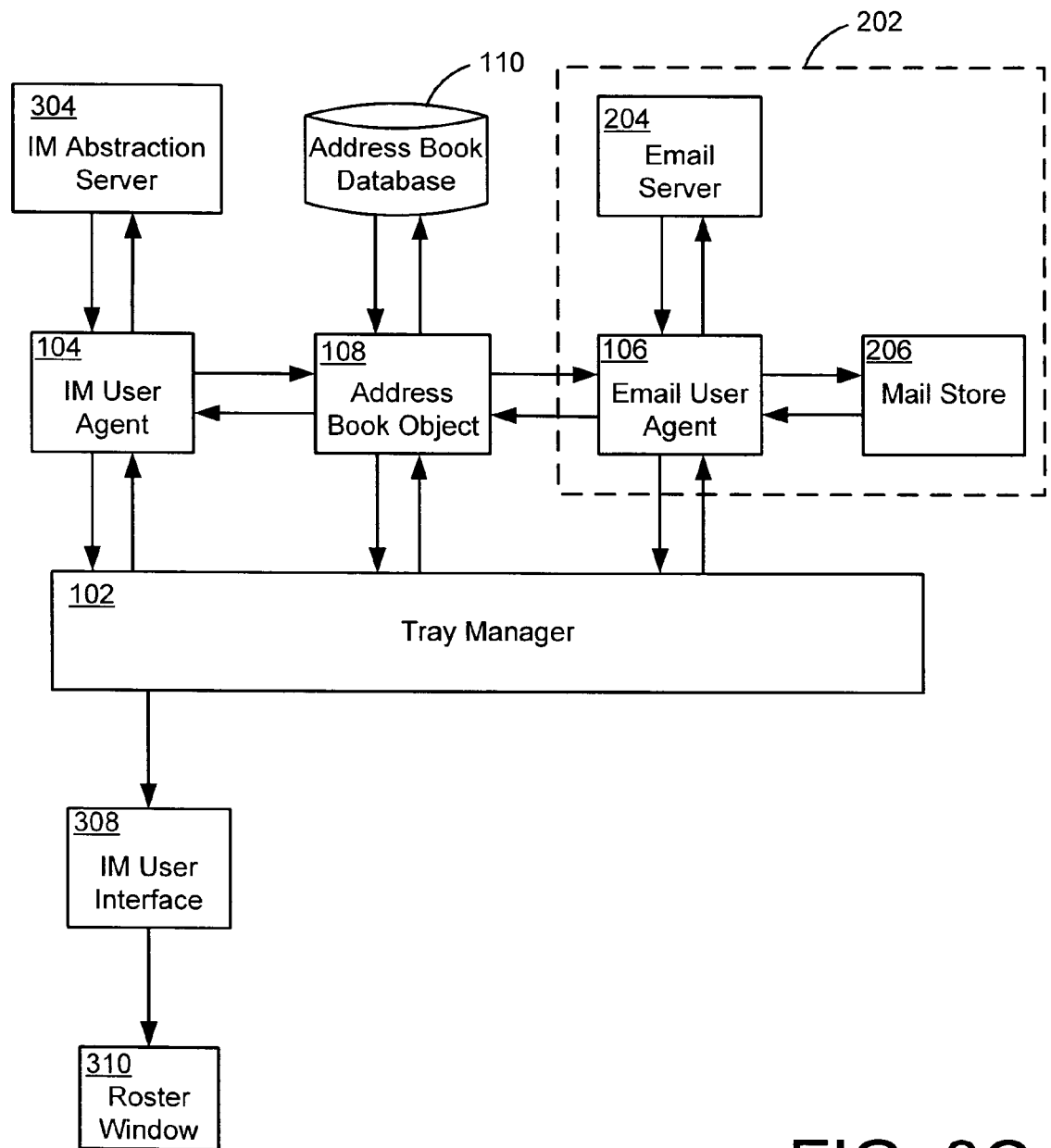

Regardless of whether the various components 104, 106, 108, 110 are launched as software modules or instantiated as distributed objects, once the various components 104, 106, 108, 110 are running as background processes, the tray manager 102 launches a user interface (not shown), which requests the user to select either an IM interface (not shown in FIG. 1) or an email interface (not shown in FIG. 1). FIGS. 2A through 2C are block diagrams showing component architecture associated with the user selecting the email interface (not shown in FIG. 1), while FIGS. 3A through 3C are block diagrams showing component architecture associated with the user selecting the IM interface (not shown in FIG. 1).

FIGS. 2A through 2C are block diagrams showing one embodiment of component architecture related to email services when the user selects the email user interface 210. As described above, the tray manager 102 queries the user for the selection of the IM or email interface. If the user selects the email interface, then the tray manager 102 receives the selection of the email user interface 210 and retrieves the login names and passwords, which were previously stored during installation of the software modules, from the login database. The email login names and passwords are conveyed to the email user agent 106, which receives the login names and passwords.

Upon receiving the login names and passwords of all of the user's email accounts, the email user agent 106 logs into each of the user's email accounts at the various email servers 204 using the respective login names and passwords. Upon logging into each of the user's email accounts, the email user agent 106 retrieves all of the email messages stored on the email accounts and stores them at a local mail store 206. In an example embodiment, the user's email accounts are simple mail transfer protocol (SMTP) email accounts. Additionally, the user's email account may be post office protocol version 3 (POP3) compatible.

Since the logging into email accounts, retrieving email messages, and storing email messages at local mail stores is discussed in greater detail with reference to FIGS. 30 and 31, further discussion of the logging into email accounts, retrieving email messages, and storing email messages is omitted here. However, it is worthwhile to note that the email user agent 106 and address book object 108 of FIG. 2A permit the automatic retrieval of multiple email messages from multiple email accounts, and the storage of the retrieved email messages according to their respective originating email accounts.

Upon retrieving multiple email messages from multiple email accounts and storing them at the mail store 206, the email user agent 106 generates a command to the tray manager 102 to launch or instantiate an email user interface 210 to display the retrieved email messages to the user. This is shown in greater detail in FIG. 2B. As shown in FIG. 2B, upon receiving the command to launch or instantiate the email user interface 210, the tray manager 102 instantiates the email user interface 210, which, in turn, instantiates a message center 212 for displaying the retrieved email messages. The email user agent 106 retrieves the stored email messages from the mail store 206 and conveys the email messages to the tray manager 102. The tray manager 102 further conveys the email messages to the email user interface 210, which displays the email messages at the message center 212. Thus, at this point, all of the email messages from all of the user's email accounts are available to the user at the message center 212. In another embodiment, the message center 212 may be instantiated with a pointer to the mail store 206, thereby permitting direct retrieval of the email messages from the mail store 206 by the message center 212.

In addition to logging into the various email accounts, the tray manager 102 initiates a login to each of the user's IM accounts. This is shown in FIG. 2C. As described above with reference to FIG. 1, the tray manager 102 retrieves the login names and passwords. The tray manager 102 conveys the IM login names and passwords to the IM user agent 104.

Upon receiving the login names and passwords of all of the user's IM accounts, the IM user agent 104 logs into each of the user's IM accounts through an IM abstraction server 304 using the respective login names and passwords. The logging into various IM accounts through the IM abstraction server 304 is described in detail in U.S. provisional patent application Ser. Nos. 60/411,336 and 60/419,613, and U.S. patent application Ser. Nos. 10/274,408, 10/274,478, and 10/274,405, which are incorporated herein by reference as if set forth in their entireties. Also, a similar login process is shown with reference to FIGS. 30 and 31 for email accounts. Thus, further discussion of logging into various IM accounts through the IM abstraction server 304 is omitted here.

Upon logging into the various IM accounts, the IM user agent 104 obtains Internet presence information for all of the user's IM contacts as described in U.S. provisional patent application Ser. Nos. 60/411,336 and 60/419,613, and U.S. patent application Ser. Nos. 10/274,408, 10/274,478, and 10/274,405.

As seen from the component architecture of FIG. 1 and FIGS. 2A through 2C, the launching of the tray manager 102 results in retrieval of all of the user's email messages and all of the contacts' IM Internet presence information.

FIGS. 3A through 3C are block diagrams showing one embodiment of component architecture related to IM services when the user selects the IM interface 308. As described above, the tray manager 102 queries the user for a selection of the IM or email interface. If the user selects the IM interface, then the tray manager 102 instantiates the IM user interface 308, which queries the user for the user's IM login name and password. Thus, unlike the email login process, which automatically retrieves login names and passwords without further input from the user, the IM login process requires, in this embodiment, the input of a user login name and password.

As shown in FIG. 3A, the IM user agent 104 receives the login name and password and looks up the login database (not shown) to determine whether or not the login name and password are valid (i.e., whether or not the login name and password are located in the login database). If the login name and password are valid, then the IM user agent 104 retrieves login names and passwords for all of the user's IM accounts.

Upon retrieving the login names and passwords of all of the user's IM accounts from the login database, the IM user agent 104 logs into each of the user's IM accounts through an IM abstraction server 304 using the respective login names and passwords for each of the user's IM accounts. The logging into various IM accounts through the IM abstraction server 304 is described in detail in U.S. provisional patent application Ser. Nos. 60/411,336 and 60/419,613, and U.S. patent application Ser. Nos. 10/274,408, 10/274,478, and 10/274,405, which are incorporated herein by reference as if set forth in their entireties. Also, similar processes related to email are described with reference to FIGS. 30 and 31. Thus, further discussion of logging into various IM accounts through the IM abstraction server 304 is omitted here.

Upon logging into the various IM accounts, the IM user agent 104 obtains Internet presence information for all of the user's IM contacts as described in U.S. provisional patent application Ser. Nos. 60/411,336 and 60/419,613, and U.S. patent application Ser. Nos. 10/274,408, 10/274,478, and 10/274,405.

Upon logging into the user's various IM accounts and retrieving the Internet presence information of the user's contacts, the IM user agent 104 generates a command to the tray manager 102 to display the retrieved IM information. This is shown in greater detail in FIG. 3B. As shown in FIG. 3B, upon receiving the command to display the retrieved IM information, the tray manager 102 requests the IM user interface 308 to instantiate a roster window 310 for displaying the user's contacts and the contacts' respective IM Internet presence information. The IM user agent 104 conveys the IM information having the contacts' names and the contacts' IM Internet presence information to the tray manager 102. The tray manager 102 further conveys the IM information to the IM user interface 104, which displays the IM contact names and their respective IM Internet presence information to the user at the roster window 310. Thus, at this point, all of the contacts and their respective IM Internet presence information is available to the user at the roster window 310.

In addition to logging into the various IM accounts, the tray manager 102 initiates a login to each of the user's email accounts. As shown in FIG. 3C, the tray manager 102 receives the login name and password from the IM user agent 104 and conveys the login name and password to the email user agent 106. The email user agent 106 receives the login name and password and looks up the login database (not shown) to determine whether or not the login name and password are valid (i.e., whether or not the login name and password are located in the login database). If the login name and password are valid, then the email user agent 106 retrieves login names and passwords for all of the user's email accounts.

Upon retrieving the login names and passwords of all of the user's email accounts from the address book database 110, the address book object 108 conveys the login names and passwords to the email user agent 106. The email user agent 106 logs into each of the user's email accounts at the various email servers 204 using the respective login names and passwords. Upon logging into each of the user's email accounts, the email user agent 106 retrieves all of the email messages stored on the email accounts and stores them at a local mail store 206. In an example embodiment, the user's email accounts are simple mail transfer protocol (SMTP) email accounts. Additionally, the user's email accounts may also be POP3 compatible.

Since the logging into email accounts, retrieving email messages, and storing email messages at local mail stores is discussed in greater detail with reference to FIGS. 30 and 31, further discussion of the logging into email accounts, retrieving email messages, and storing email messages is omitted here. However, it is worthwhile to note that the instantiating of an IM user interface results in the automatic retrieval and storage of all of the user's email messages and the storage of the retrieved email messages according to their originating email account. Additionally, as seen from the component architecture of FIG. 1 and FIGS. 3A through 3C, the input of a single login name and password to the IM user agent 104 results in retrieval of all of the user's contacts' IM Internet presence information. Furthermore, as seen from FIGS. 1 through 3C, the address book object 108 and the address book database 110 provide an interface between the IM user agent 104 and the email user agent 106, thereby providing integration of IM and email.

Figure 4A:
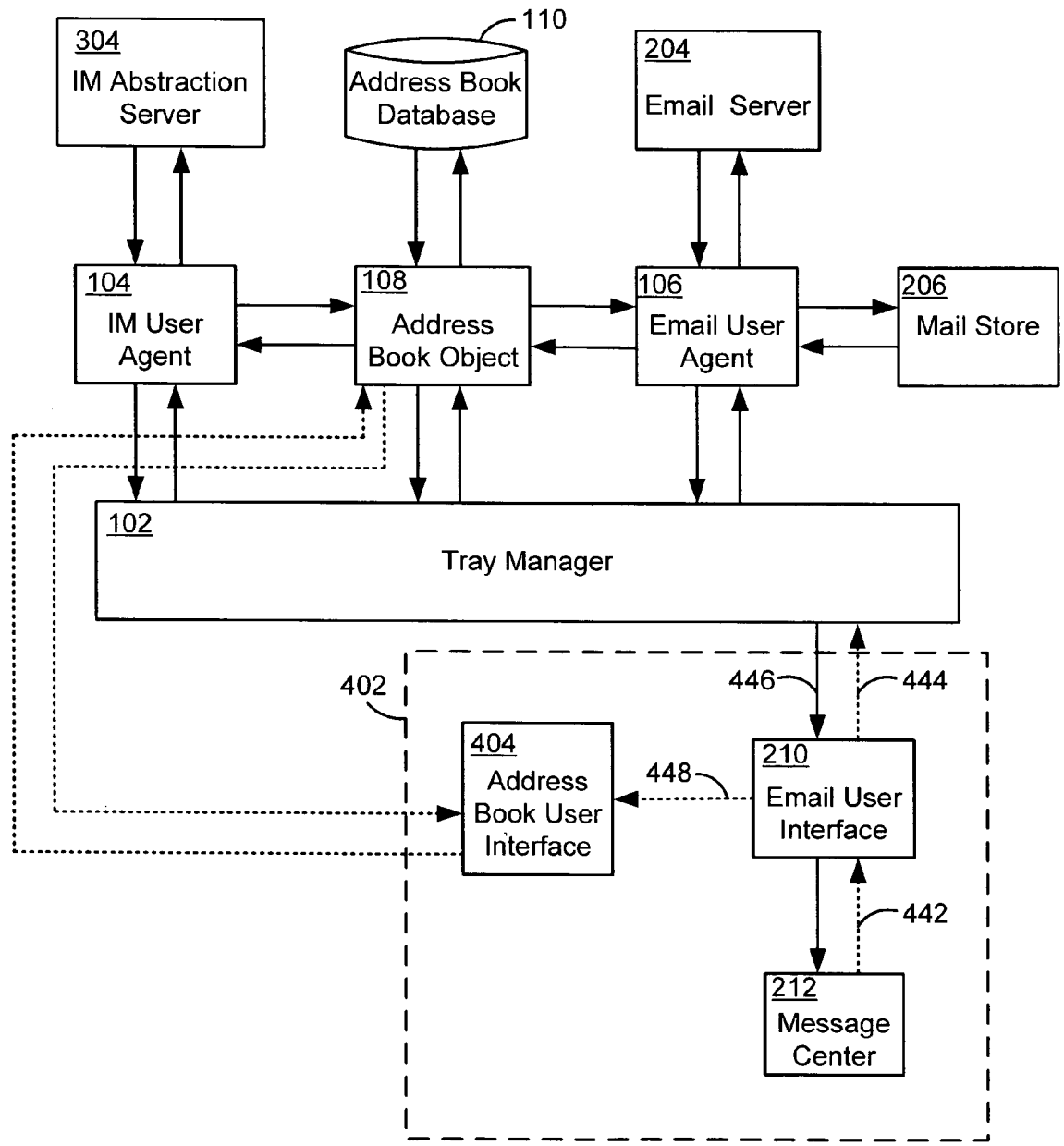
FIGS. 4A through 4C are block diagrams showing instantiation of various email components in one embodiment of the system.
Figure 4B:
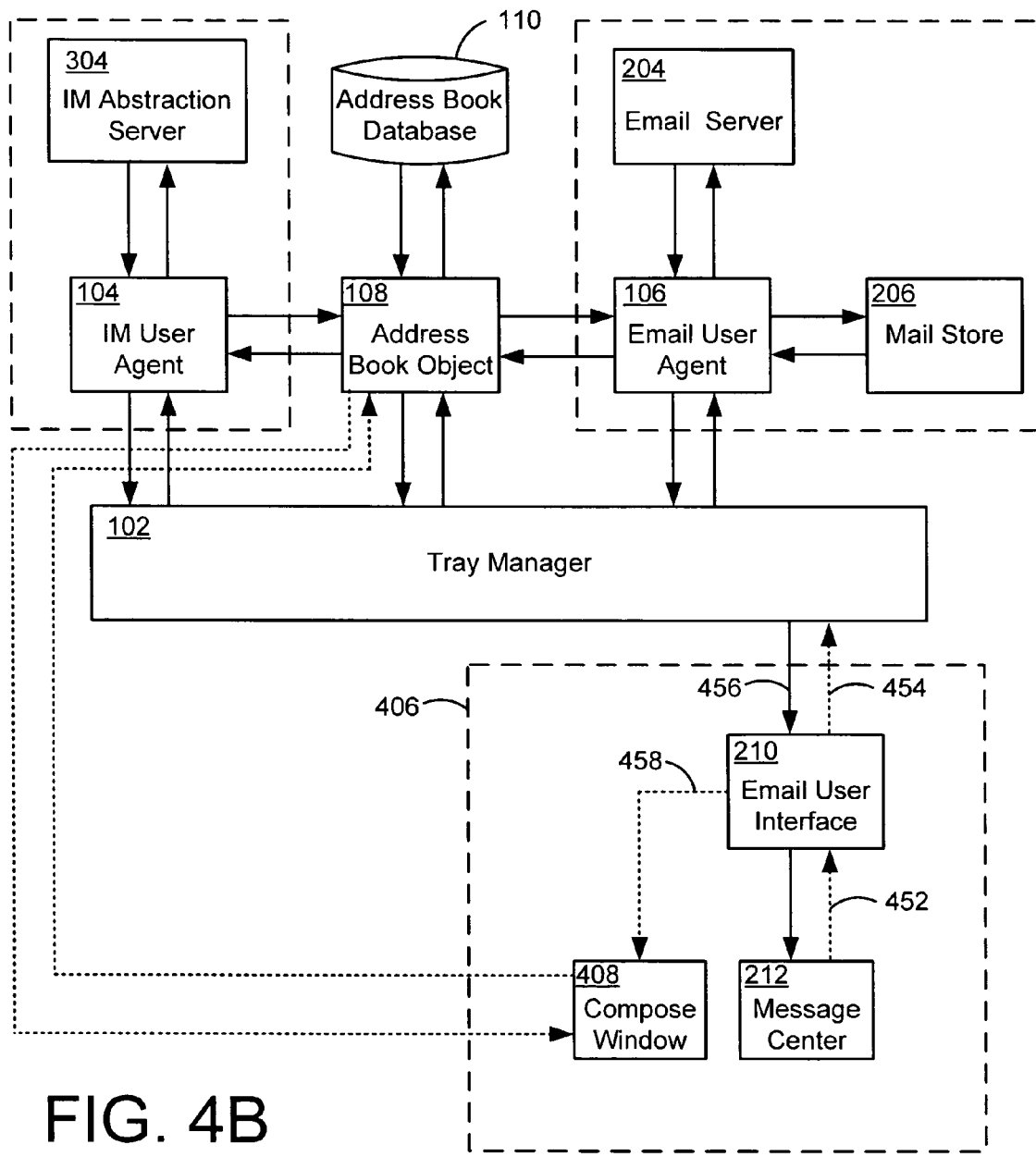
Figure 4C:
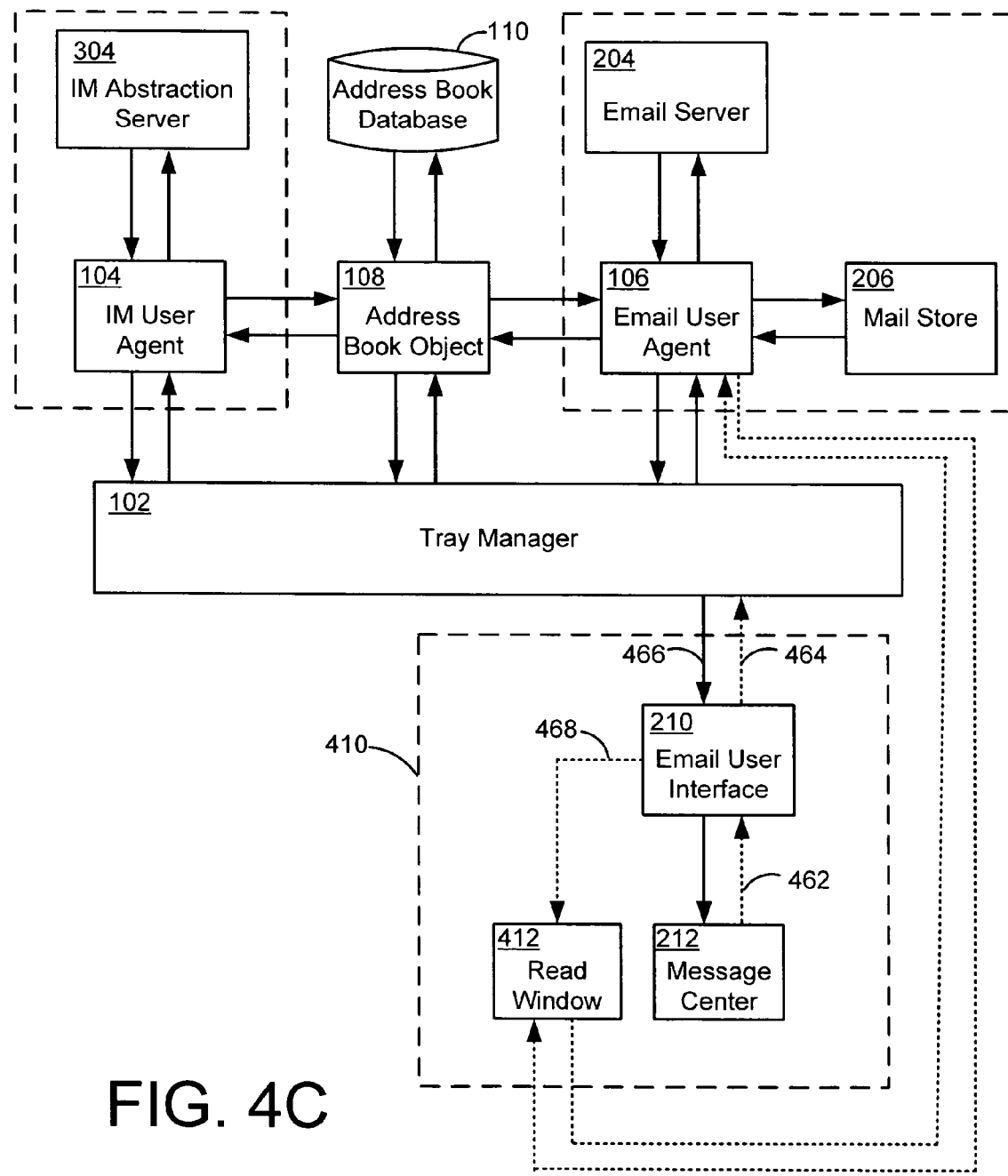

FIGS. 4A through 4C are block diagrams showing instantiation of various email components in one embodiment of the system. While one embodiment of the message center 212 is shown in greater detail with reference to FIG. 9, a discussion of the functionality of the message center 212 is described below with reference to FIGS. 4A through 4C. As described with reference to FIGS. 2A through 2C, upon receiving a single login name and password, the tray manager 102 automatically logs the user into all of the user's IM accounts as well as all of the user's email accounts.

One option that is provided to the user at the message center 212 is the option to edit entries in the address book database 110. This is shown in FIG. 4A. If the user selects the option to edit the address book database 110, then the message center 212 generates a request 442 to the email user interface 210 to generate an address book user interface 404. The email user interface 210 conveys the request 444 to the tray manager 102, which receives the request and generates a command 446 to the email user interface 210 to instantiate the address book user interface 404. The command 446 includes a pointer to the address book object 108, which eventually permits the address book user interface 404 to modify the address book database 110 through the address book object 108. The email user interface 210, in response to the command 446 from the tray manager 102, instantiates the address book user interface 404 with direct access to the address book object 108. Since editing of address book databases are well known in the art, further discussion of editing address book databases is omitted here. However, it is worthwhile to note that, unlike prior systems, the address book user interface 404 permits a user to edit the address book database 110 by adding and removing both email and IM contact information for contacts having various IM and email accounts (e.g., America On-Line (AOL), Microsoft Network (MSN), Yahoo, BellSouth, etc.).

Another option that is provided to the user at the message center 212 is the option to compose a new email message to a contact. This is shown in FIG. 4B. If the user selects the option to compose a new email message, then the message center 212 generates a request 452 to the email user interface 210 to generate a compose window 408. The email user interface 210 conveys the request 454 to the tray manager 102, which receives the request and generates a command 456 to the email user interface 210 to instantiate the compose window 408. The command 456 includes a pointer to the address book object 108, which eventually permits the compose window 408 to access the address book database 110 through the address book object 108, thereby permitting retrieval of email addresses of contacts. The email user interface 210, in response to the command 456 from the tray manager 102, instantiates the compose window 408 with direct access to the address book object 108. Since composing new messages is well known in the art, further discussion of composing new messages is omitted here.

Yet another option that is provided to the user at the message center 212 is the option to read an email message from a contact. This is shown in FIG. 4C. In operation, all of the user's email messages are displayed to the user at the message center 212. Upon receiving a selection of one of the displayed email messages for reading by the user, the message center 212 generates a request 462 to the email user interface 210 to generate a read window 412. The request 462 includes information related to the selected email message, such as a globally-unique identifier (GUID) associated with the selected email message. The email user interface 210 conveys the request 464 to the tray manager 102, which receives the request 464 and generates a command 466 to the email user interface 210 to instantiate the read window 412. The command 466 includes a pointer to the address book object 108 and a pointer to the email user agent 106. The pointer to the address book object 108 eventually permits the read window 412 to access the address book database 110 through the address book object 108. This is shown in greater detail with reference to FIG. 5. The email user interface 210, in response to the command 466 from the tray manager 102, instantiates the read window 412. Upon being instantiated, the read window 412 issues a request to the email user agent 106 to retrieve the selected email message. The email user agent 106 receives the request and retrieves the selected email message from the mail store 206. The retrieved email message is conveyed from the email user agent 106 to the read window 412 and displayed to the user at the read window 412. While reading of email messages is well known in the art, it is worthwhile to note that, unlike prior systems, the system of FIG. 4C permits a user to read email messages from any of the user's email accounts (e.g., a BellSouth email account, an AOL email account, a Yahoo email account, an MSN email account, etc.).

Figure 5:
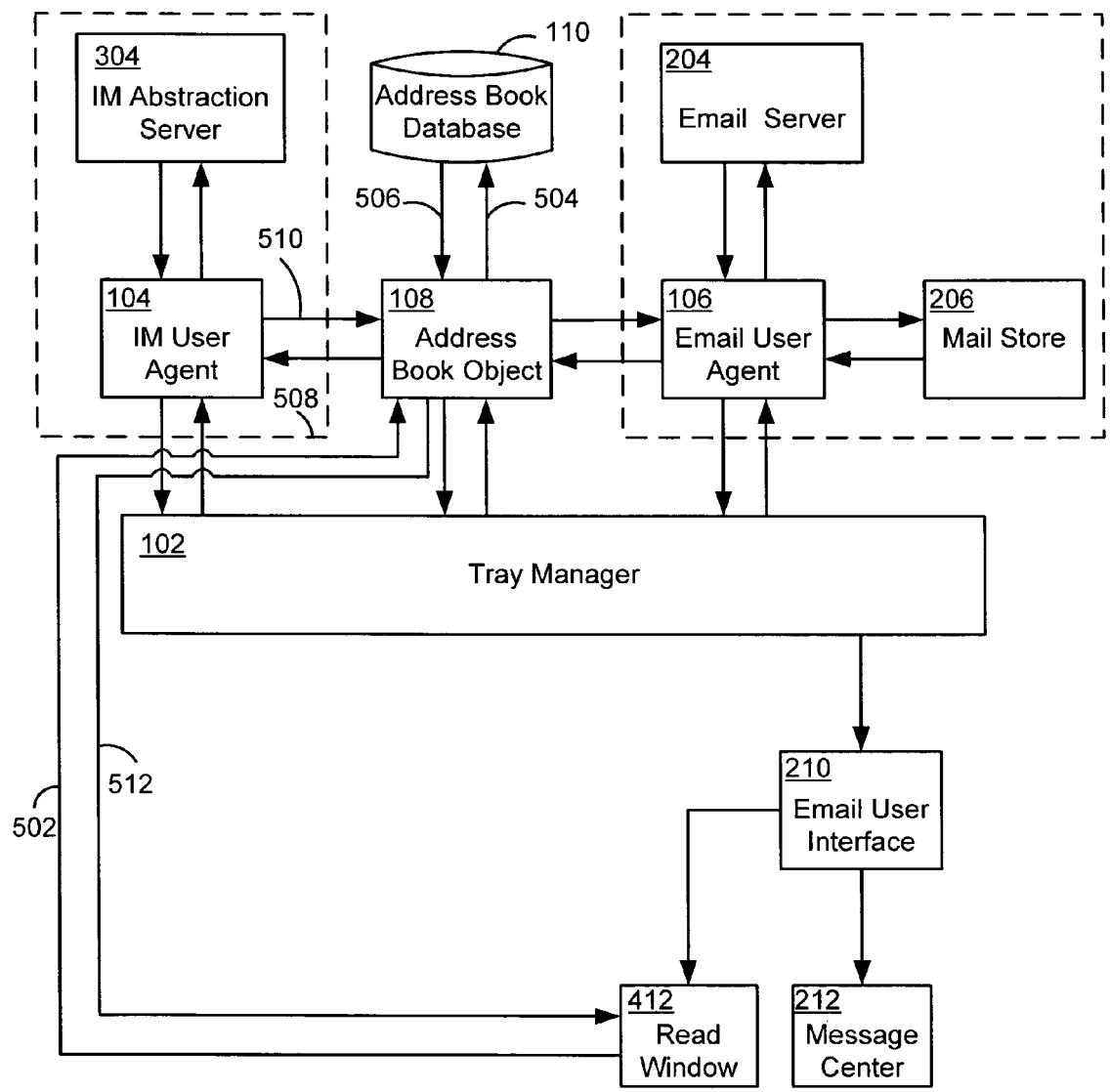
FIG. 5 is a block diagram showing functionality of the read window of FIG. 4C.

FIG. 5 is a block diagram showing another aspect of the read window of FIG. 4C. While one embodiment of the read window 412 is shown in detail with reference to FIG. 10, the functionality of the read window 412 is described below with reference to FIG. 5. As shown in FIG. 5, the read window 412 is instantiated by the email user interface 210 so that the read window 412 has direct access to the address book object 108. In this regard, any information that is available to the address book object 108 may also be available to the read window 412. In operation, upon receiving the selected email message from the email user agent 106, the read window 412 extracts all of the email addresses in the email message. For example, the sender's email address is extracted from the email message. Similarly, if courtesy copies (cc) of the email message were sent to other recipients, then the email addresses of the other recipients are also extracted from the email message. Upon extracting all of the email addresses from the email message, the read window 412 generates a request 502 to the address book object 108 for IM Internet presence information of the contacts at the extracted email addresses. In this regard, the request 502 includes the extracted email addresses.

Upon receiving the request 502, the address book object 108 generates a query 504 to the address book database 110 to request all IM addresses that are correlated to the extracted email addresses. If an extracted email address is not found in the address book database 110, then an error message is returned to the address book object 108 to indicate that no IM Internet presence information is available for that email address. Similarly, if an extracted email address is not correlated to any IM address, then an error message is returned to the address book object 108 to indicate that no IM Internet presence information is available for that email address. If, on the other hand, the extracted email address is found in the address book database 110, and the extracted email address is correlated to at least one IM address, then the IM address associated with the extracted email address is retrieved from the address book database 110 by the address book object 108. This process is repeated for each of the extracted email addresses until either an error message or at least one IM address is returned for each of the extracted email addresses.

If an error message is returned to the address book object 108 for an extracted email address, then the error message is conveyed by the address book object 108 to the read window 412, which displays to the user that no IM Internet presence information is available for that extracted email address. If, on the other hand, an IM address is returned, then the address book object 108 queries the IM user agent 104, using the IM address, for IM Internet presence information of the contact at the retrieved IM address. The IM user agent 104, already having the IM Internet presence information of all of the user's contacts (see FIGS. 2A through 3C), receives the query 508 and returns IM Internet presence information for the retrieved IM address to the address book object 108. The IM Internet presence information 512 is then conveyed by the address book object 108 to the read window 412. The read window 412 subsequently displays the IM Internet presence information next to its respective email address, thereby providing the user with a contact's IM Internet presence information at the email read window 412.

As seen from the embodiment of FIG. 5, by having the address book object 108 interface the IM user agent 104, the address book database 110, and the email read window 412, the embodiment of FIG. 5 permits a user to determine IM Internet presence information directly from an email read window 412. Also, since IM is integrated with email, it is now possible to launch an IM chat session with an email contact directly from the read window 412. This is described in greater detail with reference to FIG. 10.

Figure 6A:
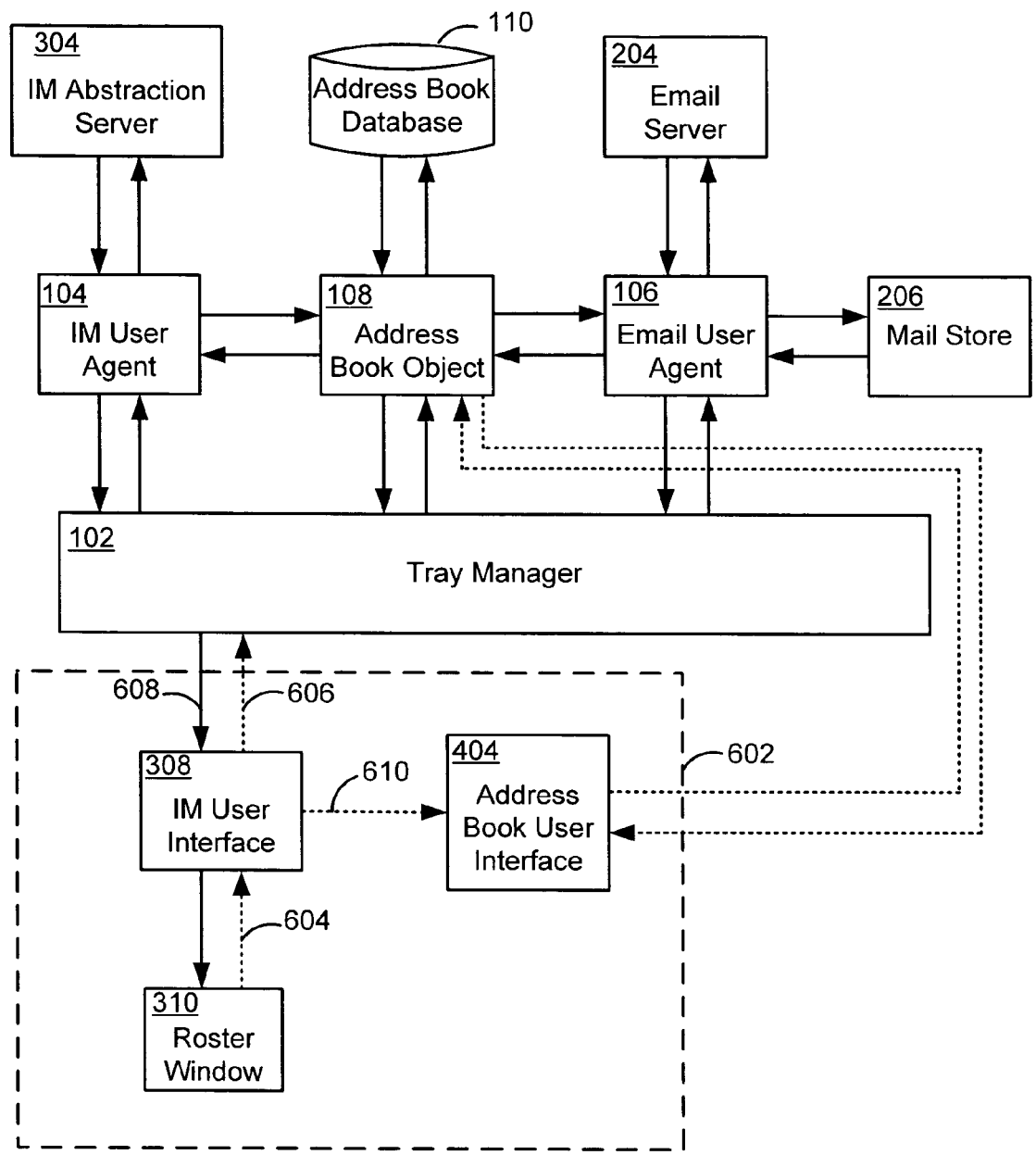
FIGS. 6A through 6C are block diagrams showing instantiation of various IM components in one embodiment of the system.
Figure 6B:
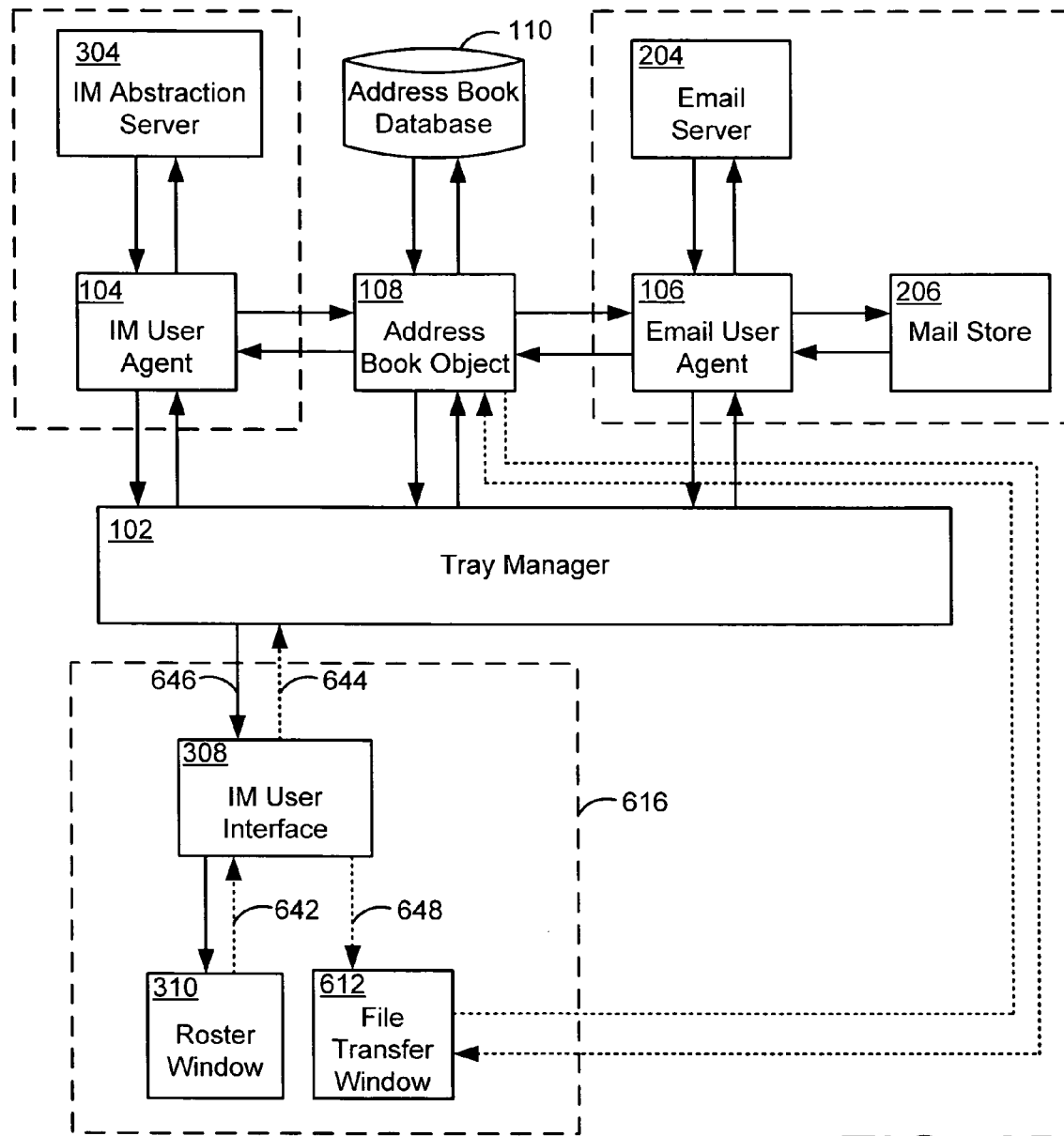
Figure 6C:
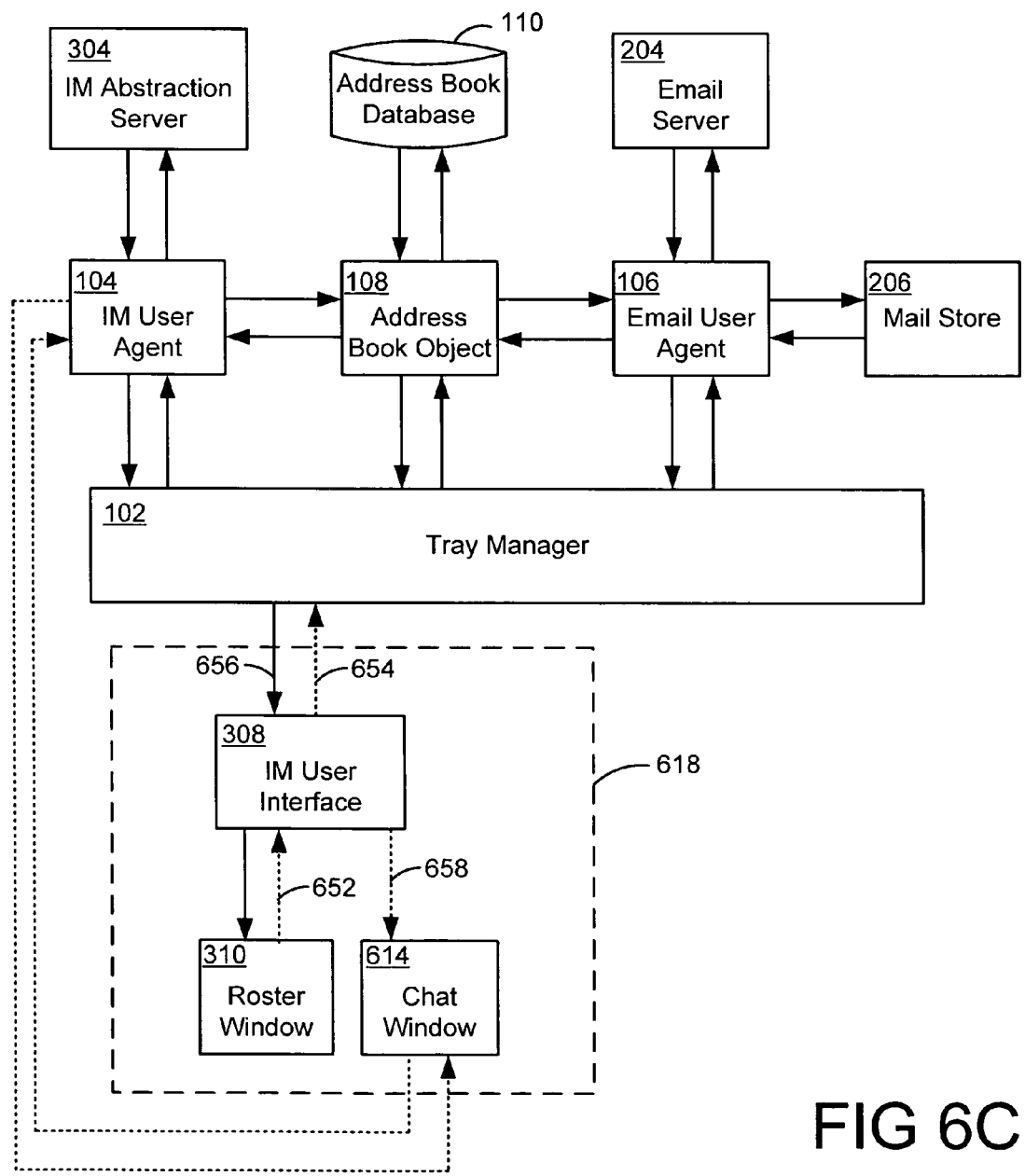

FIGS. 6A through 6C are block diagrams showing instantiation of various IM components in one embodiment of the system. While the roster window 310 is shown in greater detail with reference to FIG. 14, the functionality of the roster window 310 is described with reference to FIGS. 6A through 6C. As shown in FIG. 6A, one option that is provided to the user at the roster window 310 is the option to edit entries in the address book database 110. If the user selects the option to edit the address book database 110, then the roster window 310 generates a request 604 to the IM user interface 308 to generate an address book user interface 404. The IM user interface 308 conveys the request 606 to the tray manager 102, which receives the request and generates a command 608 to the IM user interface 308 to instantiate the address book user interface 404. The command 608 includes a pointer to the address book object 108, which eventually permits the address book user interface 404 to modify the address book database 110 through the address book object 108. The IM user interface 308, in response to the command 608 from the tray manager 102, instantiates the address book user interface 404, which is instantiated with direct access to the address book object 108. Since editing of address book databases are well known in the art, further discussion of editing address book databases is omitted here. However, it is worthwhile to note that, unlike prior systems, the address book user interface 404 permits a user to edit the address book database 110 by adding and removing both email and IM contact information for contacts having various IM and email accounts (e.g., AOL, MSN, Yahoo, BellSouth, etc.).

As shown in FIG. 6B, another option that is provided to the user at the roster window 310 is the option to transfer files to a contact. If the user selects the option to transfer a file, then the roster window 310 generates a request 642 to the email user interface 210 to generate a file transfer window 612. The email user interface 210 conveys the request 644 to the tray manager 102, which receives the request and generates a command 646 to the email user interface 210 to instantiate the file transfer window 612. The command 646 includes a pointer to the address book object 108, which eventually permits the file transfer window 612 to access the address book database 110 through the address book object 108, thereby permitting retrieval of email addresses and IM addresses of the contacts. The email user interface 210, in response to the command 646 from the tray manager 102, instantiates the file transfer window 612 with direct access to the address book object 108. Since transferring files from IM roster windows is well known in the art, further discussion of transferring files from IM roster windows is omitted here. However, it is worthwhile to note that, unlike prior systems, the system of FIG. 6B permits file transfers to contacts at various IM services (e.g., AOL IM, MSN IM, Yahoo IM, BellSouth IM, etc.) and at various email services (e.g., AOL email, MSN email, Yahoo email, BellSouth email, etc.), regardless of the contacts' IM or email service provider.

As shown in FIG. 6C, yet another option that is provided to the user at the roster window 310 is the option to chat with a contact. In operation, all of the user's IM contacts and their respective IM Internet presence information are displayed to the user at the roster window 310. Upon receiving a selection of one of the IM contacts by the user, the roster window 310 generates a request 652 to the user interface 308 to generate a chat window 614. The request 652 includes information related to the selected contact. The user interface conveys the request 654 to the tray manager 102, which receives the request 654 and generates a command 656 to the IM user to instantiate the chat window 614. The command 656 includes a pointer to the IM user agent 104. The IM user interface 308, in response to the command 656 from the tray manager 102, instantiates the chat window 614. Upon being instantiated, the chat window 614 issues a request to the IM user agent 104 to establish a chat session with the selected contact. Since the initiation of chat sessions at chat windows is well known in the art, further discussion of initiating chat sessions at chat windows is omitted. However, it is worthwhile to note that, unlike prior systems, the system of FIG. 6C permits a user to initiate a chat session and engage in a chat session with any of the contacts regardless of the contacts' IM account (e.g., BellSouth IM account, AOL IM account, Yahoo IM account, MSN IM account, etc.). Greater details related to IM chatting with various contacts at various IM accounts may be found in U.S. provisional patent application Ser. Nos. 60/411,336 and 60/419,613, and U.S. patent application Ser. Nos. 10/274,408, 10/274,478, and 10/274,405, which are incorporated herein by reference in their entireties.

As seen from the embodiments of FIGS. 6A through 6C, by having the address book object 108 interface the IM user agent 104, the address book database 110, and the email user agent 106, greater integration between IM and email is provided.

Figure 7:
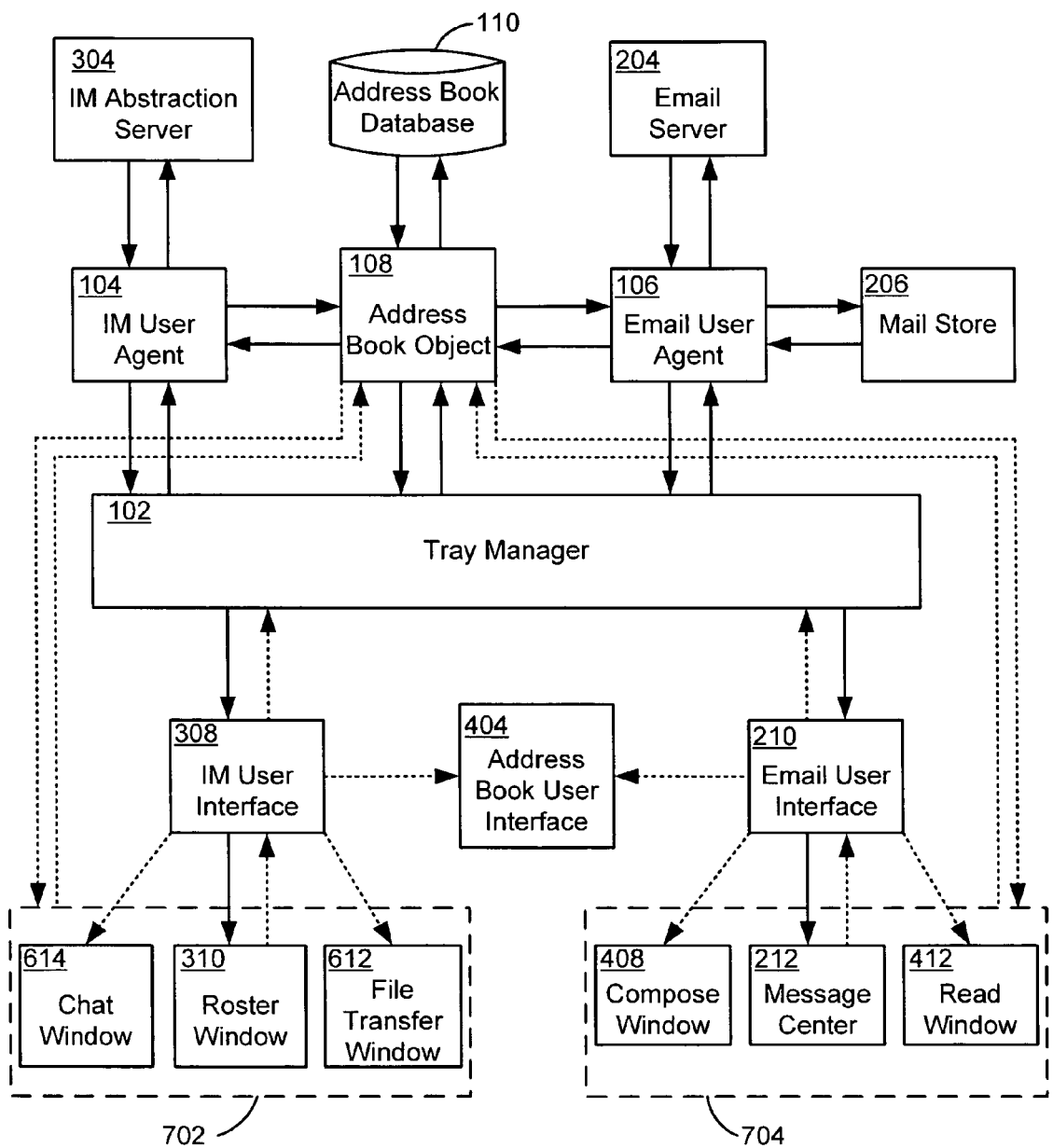
FIG. 7 is a block diagram showing an overview of component architecture related to both IM and email services.

FIG. 7 is a block diagram showing an overview of component architecture related to both IM and email services. Since the various components have been described in detail with reference to FIGS. 1, 2A through 2C, 3A through 3C, 4A through 4C, 5, and 6A through 6C, only a truncated discussion of each of the IM and email components is presented here. As shown in FIG. 7, the address book object 108, the address book database 110, the address book user interface 404, and the tray manager 102 provide an interface between the various email components 106, 204, 206, 210, 212, 412, 408 and the various IM components 104, 304, 308, 310, 614, 612. In other words, integration of email and IM may be achieved by having a central address book database 110 that is accessible through an address book object 108 to both the various IM components 104, 304, 308, 310, 614, 612 and the various email components 106, 204, 206, 210, 212, 412, 408. The mechanism for sorting the various email messages into their respective folders is shown with reference to FIGS. 30 and 31.

Figure 8:
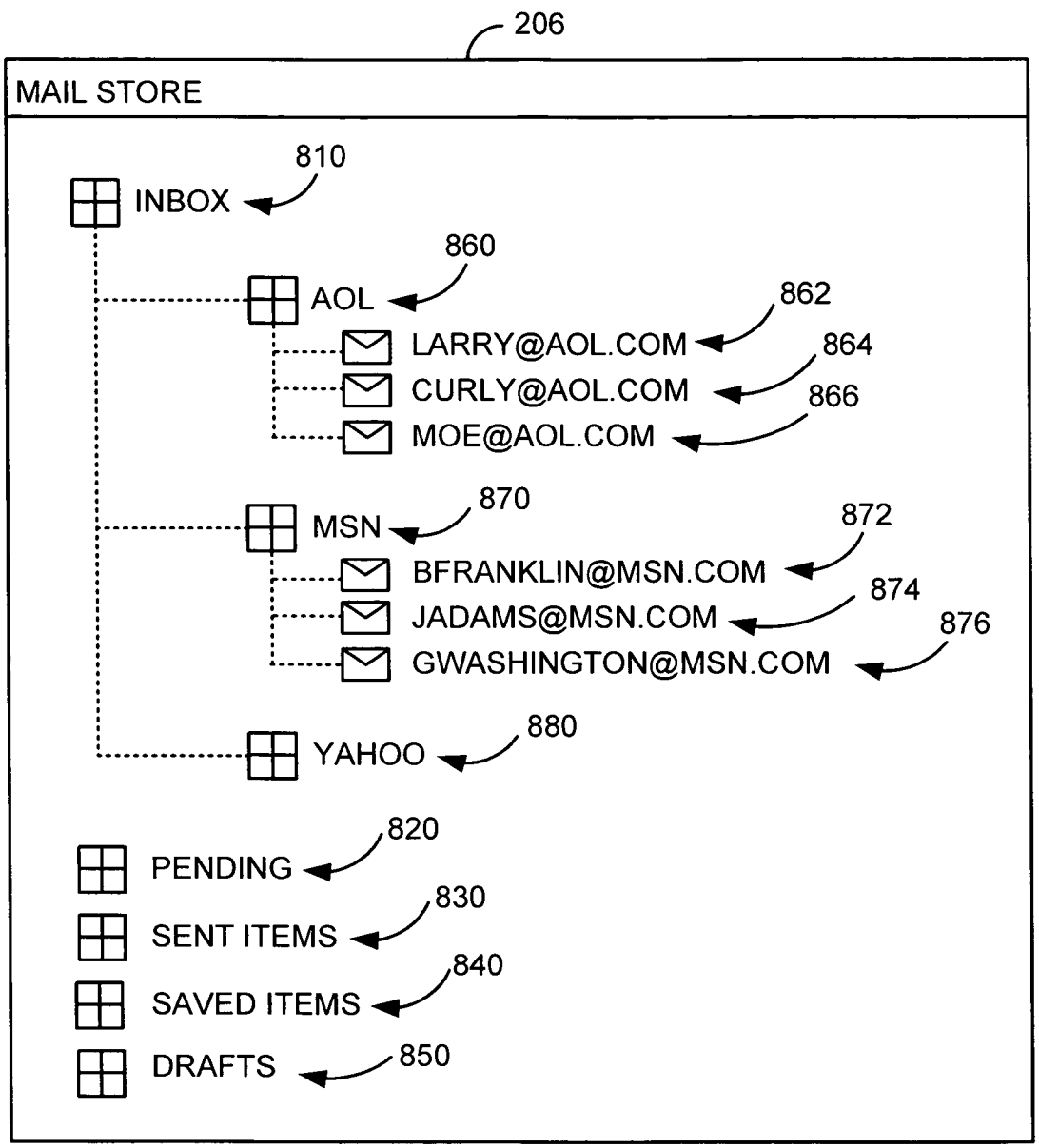
FIG. 8 is a diagram showing one embodiment of the mail store of FIG. 7 in greater detail.

FIG. 8 is a diagram showing one embodiment of the mail store 206 of FIG. 7 in greater detail. As shown in FIG. 8, the mail store 206 comprises several folders such as, for example, an inbox folder 810, a pending email folder 820, a sent items folder 830, a saved items folder 840, and a drafts folder 850. As described with reference to FIGS. 1 through 3C, email messages from all of the user's email accounts are retrieved and stored at the mail store 206. The inbox folder 810 stores all of the received email messages from the various email accounts. Thus, for example, if a user has an AOL email account, an MSN email account, and a Yahoo email account, then the received email messages are retrieved from these various accounts and stored at the mail store 206. In an example embodiment, all of the email messages that are retrieved from the user's AOL email account are stored in an AOL folder 860; all of the email messages that are retrieved from the user's MSN account are stored in an MSN folder 870; and all of the email messages that are retrieved from the user's Yahoo account are stored in a Yahoo folder 880. Similarly, any pending email, sent item, saved item, or drafts of emails may be saved in similar sub-folders (not shown) in their respective folders 820, 830, 840, 850.

In another embodiment, if the user receives an email message from an AOL contact, then the system 202 (FIG. 2A) is configured so that any reply to that AOL contact is directed through the user's AOL account. Similarly, if the user receives an email message from an MSN contact, then the system is configured so that any reply to that MSN contact is directed through the user's MSN account. Thus, for example, if an email message 862 from Larry@AOL.com is retrieved from the user's AOL email account, then any reply to that email from the user will be, by default, directed through the user's AOL email account. Thus, when Larry@AOL.com receives a reply from the user, the reply will appear to Larry@AOL.com as if it was sent from the user's AOL email account. Similarly, if an email message 874 from JAdams@MSN.com is retrieved from the user's MSN email account, then any reply to that email from the user will be, by default, directed through the user's MSN email account. Thus, when JAdams@MSN.com receives a reply from the user, the reply will appear to JAdams@MSN.com as if it was sent from the user's MSN email account. In another embodiment, the user may override the default settings and select a different mail server through which to send an email message. This process is described in greater detail with reference to FIGS. 30 and 31.

The mail store 206 of FIG. 8, unlike prior systems, comprises email messages from various email accounts (e.g., AOL, MSN, Yahoo), which are now accessible to the user through a single consolidated mail store 206. This permits the user to access all of the user's emails from all of the user's various email accounts without the inconvenience of having to manually access multiple separate email accounts.

Figure 9:
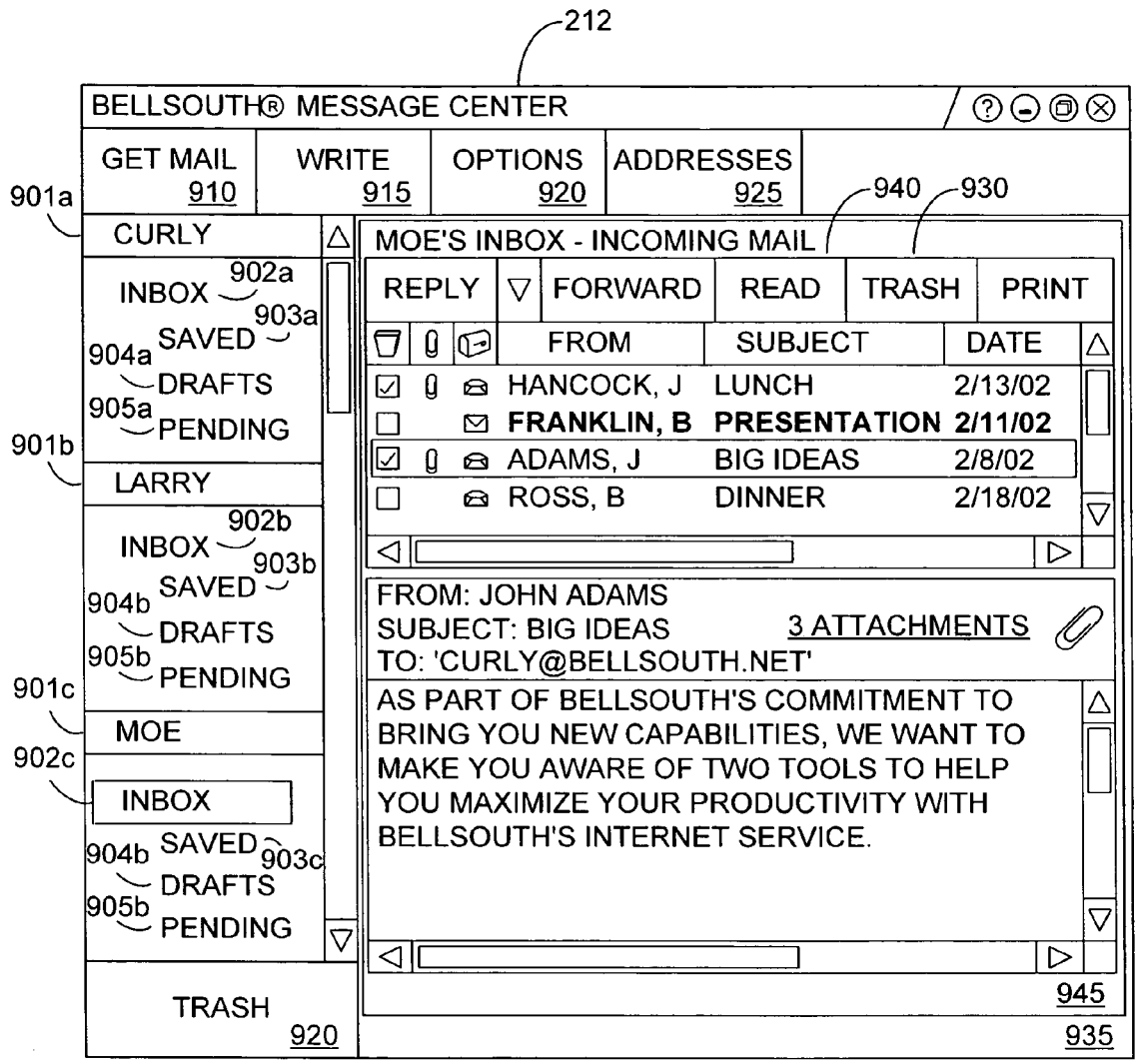
FIG. 9 is a diagram showing one embodiment of a user interface for the message center of FIG. 7 in greater detail.

FIG. 9 is a diagram showing one embodiment of a user interface 935 for the message center 212 of FIG. 7 in greater detail. As shown in FIG. 9, the user interface 935 comprises a get mail (or read) selection button 910, a write (or compose) selection button 915, an options selection button 920, and an address book database selection button 925. If a user selects the address book database selection button 925, then an address book user interface 404 is launched or instantiated as described with reference to FIG. 4A. If the user selects the write (or compose) selection button 915, then a compose window 408 is launched or instantiated as described with reference to FIG. 4B. Similarly, if the user selects the get mail (or read) selection button 910, then a read window 412 is launched or instantiated as described with reference to FIG. 4C.

In addition to the selection buttons 910, 915, 920, 925, the message center 212 includes a display screen 945, which displays received email messages and displays a preview pane having a preview of a selected email message. The display screen 945 also includes message response options such as replying to the email, forwarding the email, reading the full email (rather than merely previewing the email in the preview pane), deleting the email, or printing the email. Also, the message center 212 includes a folder list having a plurality of folders 901a, 901b, 901c, 920, which have various email messages that are organized in similar fashion to the mail store 206 of FIG. 8. Thus, for example, the folders may be organized according to the user's various email accounts (e.g., MSN, AOL, Yahoo, etc.), and each of these folders may be further organized into sub-folders such as, for example, inbox sub-folders 902, saved items sub-folders 903, drafts sub-folders 904, pending items sub-folders 905, etc.

In an example embodiment, the user may organize the various folders and sub-folders according the user's particular needs or desires. Since the organization and display of folders is well known in the art, further discussion of organization and display of folders is omitted here. However, it is worthwhile to note that, unlike prior systems, the message center 212 of FIG. 9 permits a user to view a listing of all of the user's email messages from all of the user's email accounts at a single central location. Thus, the message center 212 removes the inconvenience of manually accessing multiple email accounts to retrieve all of the user's email messages.

Figure 10:
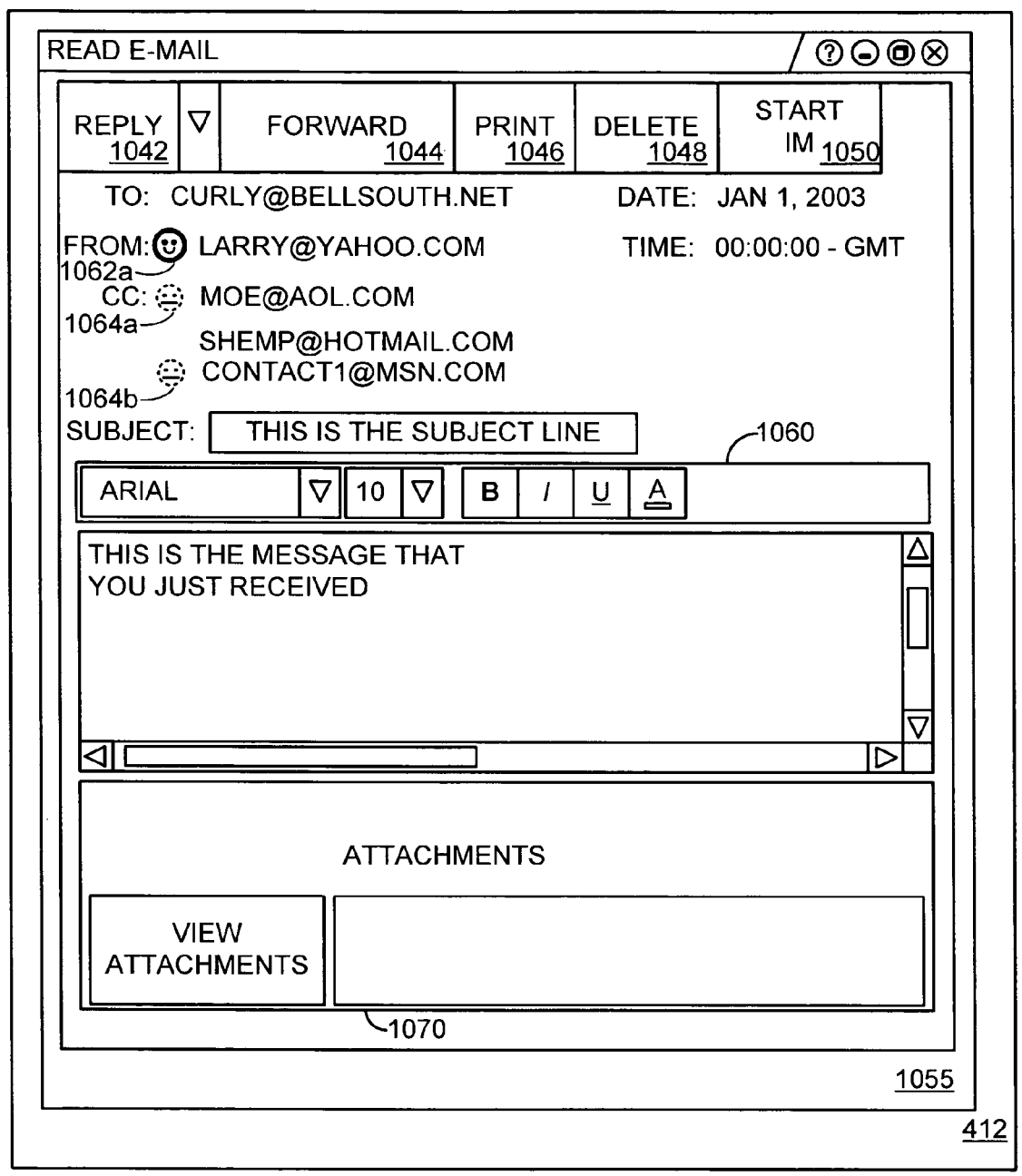
FIG. 10 is a diagram showing one embodiment of a user interface for the read window of FIG. 7 in greater detail.

FIG. 10 is a diagram showing one embodiment of a user interface 1055 for the read window 412 of FIG. 7 in greater detail. As shown in FIG. 10, one embodiment of the read window 412 comprises several selection options that a user may select. For example, a user may select an email reply button 1042, an email forward button 1044, a print button 1046, a delete button 1048, or an IM start button 1050 from the email read window 412. If the user selects the email reply button 1042 or the email forward button 1044, then an email compose window 408 is launched or instantiated as described with reference to FIG. 4B. If the user selects the print button 1046, then the email is printed to a local or network printer (not shown). If the user selects the delete button 1048, then the email message is deleted. Since these functions are well known in the art, further discussion of email reply, email forward, print, and delete functions are omitted here. However, it is worthwhile to note that, unlike prior systems, the selection of the reply button 1042, in one embodiment, permits the user to reply to the email message using the particular email account through which the email message was received. Thus, for example, if the email message is received through the user's BellSouth email account, then the reply to the email would be transmitted through the user's BellSouth email account. This is discussed in greater detail with reference to FIGS. 30 and 31.

In addition to the conventional selection buttons 1042, 1044, 1046, 1048, the read window 412 comprises an IM start button 1050. The IM start button 1050 permits a user to launch an IM session with various contacts from the read window 412. As described with reference to FIG. 5, the read window 412 provides IM Internet presence information for each of the email addresses shown on the read window 412. Thus, for example, if a user receives an email message from Larry@yahoo.com, and the email message is cc'd to Moe@AOL.com, Shemp@hotmail.com, and contact1@MSN.com, then an IM Internet presence indication is displayed by each of the email addresses. Thus, for the contacts shown in FIG. 10, the email address and at least one corresponding IM address was found in the user's address book database 110 for Larry@Yahoo.com, Moe@AOL.com, and contact1@MSN.com. Conversely, either the email address or a corresponding IM address was not found for Shemp@hotmail.com. Additionally, as shown in FIG. 10, the retrieved IM Internet presence information for Larry@Yahoo.com, Moe@AOL.com, and contact1@MSN.com indicated that Larry@Yahoo.com was present while Moe@AOL.com and contact1@MSN.com were not present.

Thus, as shown in the read window 412, an icon 1062 is displayed next to Larry@Yahoo.com to indicate that Larry@Yahoo.com is present; a different icon 1064 is displayed next to Moe@AOL.com and contact1@MSN.com to indicate that Moe@AOL.com and contact1 MSN.com are not present; and no icon is displayed next to Shemp@hotmail.com to indicate that no IM Internet presence information could be obtained for Shemp@hotmail.com. As shown in FIG. 10, the read window 412 displays the IM Internet presence information for all of the email addresses shown in the email message.

Since it is indicated that Larry@Yahoo.com is present, if the user selects Larry@Yahoo.com and selects the IM start button 1050, then an IM session with Larry@AOL.com is launched from the user's read window 412. On the other hand, if the user selects Moe@AOL.com, Shemp@hotmail.com, or contact1@MSN.com and selects the IM start button 1050, then an error message is displayed to the user to indicate that the selected contacts are either not present, or that no IM session may be initiated with the selected contacts (e.g., no email address found in the address book database 110, or no corresponding IM address found in the address book database 110).

If a contact is present, and the user has selected to initiate an IM session with the contact, then the read window 412 generates a request to the address book object 108 to initiate an IM session with the selected contact. The address book object 108 receives the request and forwards the request to the IM user agent 104. The IM user agent 104 receives the request and instantiates an IM session between the user and the selected contact. In this regard, the IM user agent 104 issues an IM session invitation to the selected contact, and awaits an IM session acceptance of the IM session invitation. Upon receiving the IM session acceptance, the IM session is established. Since the initiation of IM sessions is described in detail in U.S. provisional patent application Ser. Nos. 60/411, 336 and 60/419,613, and U.S. patent application Ser. Nos. 10/274,408, 10/274,478, and 10/274,405, further discussion of IM session instantiation is omitted here. However, it is worthwhile to note that, unlike prior systems, the read window 412 of FIG. 10 permits a user to directly launch or initiate an IM session with a contact from the read window 412, thereby providing greater integration between email and IM.

As shown with reference to FIG. 10, the read window 412 displays to the user a received email message from a contact having IM Internet presence information related to that contact. Similarly, the read window 412 displays to the user the IM Internet presence information related to any other contact that may have been cc'd on the displayed email message. Furthermore, if it is indicated that the contact is present, then the read window 412 permits a user to launch or initiate an IM session with the contact. Thus, by providing IM Internet presence information and the ability to initiate an IM session, the email read window 412 of FIG. 10 provides for greater IM and email integration. In another embodiment, the IM Internet presence information and the launching of the IM session may be available to the user at the preview pane of FIG. 9.

FIG. 11 is a diagram showing one embodiment of the address book user interface 404 of FIG. 7 in greater detail. As shown in FIG. 11, the address book user interface 404 comprises a list of contacts 1110. In an example embodiment, the list of contacts comprises the first and last names of the contacts. If the contact has an email address 1115, then this email address 1115 is listed beside its respective contact 1110. Additional details 1120 are also available for each contact 1110. In addition to having the list of contacts 1110, the list of email addresses 1115, and corresponding detailed information 1120 for the contacts, the address book user interface 404 also comprises a write (or compose) selection button 1125, a new contact selection button 1130, an new email list selection button 1135, a delete selection button 1140, an edit selection button 1145, and a cancel selection button 1150.

The write (or compose) selection button 1125 permits the user to compose an email message to a selected contact. Thus, in operation, if the user selects a contact from the list of contacts 1110 and selects the write (or compose) selection button 1125, then the address book user interface 404 issues a request to the address book object 108 to launch or instantiate a compose window 408. Since the launching or instantiating of the compose window 408 is described with reference to FIG. 4B, further discussion of launching or instantiating the compose window 408 is omitted here.

The new contact selection button 1130 permits the user to add new contact information to the address book database 110. Thus, in operation, if the user selects the new contact selection button 1130, the address book user interface 404 issues a request to the address book object 108 to launch or instantiate a user interface for adding new contact information. The user interface for adding new contact information is discussed in greater detail with reference to FIG. 12. Similarly, the selection of the new email list selection button 1135 launches or instantiates a user interface for creating a new email list.

If the user selects a contact or a group of contacts from the list of contacts 1110 and selects the delete selection button 1140, then the delete selection is conveyed from the address book user interface 404 to the address book object 108. Upon receiving the delete selection, the address book object 108 deletes the selected contact or group of contacts from the address book database 110.

The edit selection button 1145 is similar to the new contact selection button 1130 in that a user interface for editing a contact is launched or instantiated in response to the selection of the edit selection button 1145. Thus, in operation, if a user selects a contact or a group of contacts from the list of contacts 1110 and selects the edit selection button, then the address book user interface 404 issues a request to the address book object 108 to retrieve information related to the contact or the group of contacts from the address book database 110. Upon retrieving the information, the address book object 108 launches or instantiates an edit window (not shown) having the contact information, thereby permitting the user to edit the information. Once the information has been edited, the address book user interface 404 conveys the changes to the address book object 108, which stores the changes in the address book database 110.

The cancel selection button 1150 closes the address book user interface 404.

As shown with reference to FIG. 11, the address book user interface 404 permits a user to add new contact information and edit presently existing contact information. Since adding new contact information and editing contact information are well known in the art, further discussion of adding new contact information and editing new contact information is omitted here. However, it is worthwhile to note that, unlike prior systems, the address book user interface 404 permits the user to add and edit information related to both email and IM from a single address book user interface 404.

FIG. 12 is a diagram showing one embodiment of a user interface 1235 for adding new contact information. As shown in FIG. 12, the user interface 1235 comprises a name input box 1260, which permits a user to input a name of a contact. In addition to the name input box 1260, the user interface 1235 comprises an email address input box 1265, which permits a user to input one or more email addresses associated with the contact. The user interface 1235 further comprises an email list input box 1270, which permits the user to place the contact in a specified email list created by the user. Similarly, the user interface 1235 comprises an IM address input box 1280, which permits the user to input one or more IM addresses associated with the contact. In an example embodiment, the email addresses and IM addresses are sorted according to priority. The priority sorting of IM addresses and email addresses is shown in greater detail with reference to FIGS. 13A and 13B.

Likewise, street addresses, phone numbers, and other detailed information may be entered at the user interface 1235 at the address input box 1285, the phone number input box 1275, and the description input box 1290, respectively. Once the user has entered information related to the contact into their respective boxes 1260, 1265, 1270, 1275, 1280, 1285, 1290, the user interface 1235 conveys the information to the address book object 108, which stores the information in the address book database 110.

Figure 13A:
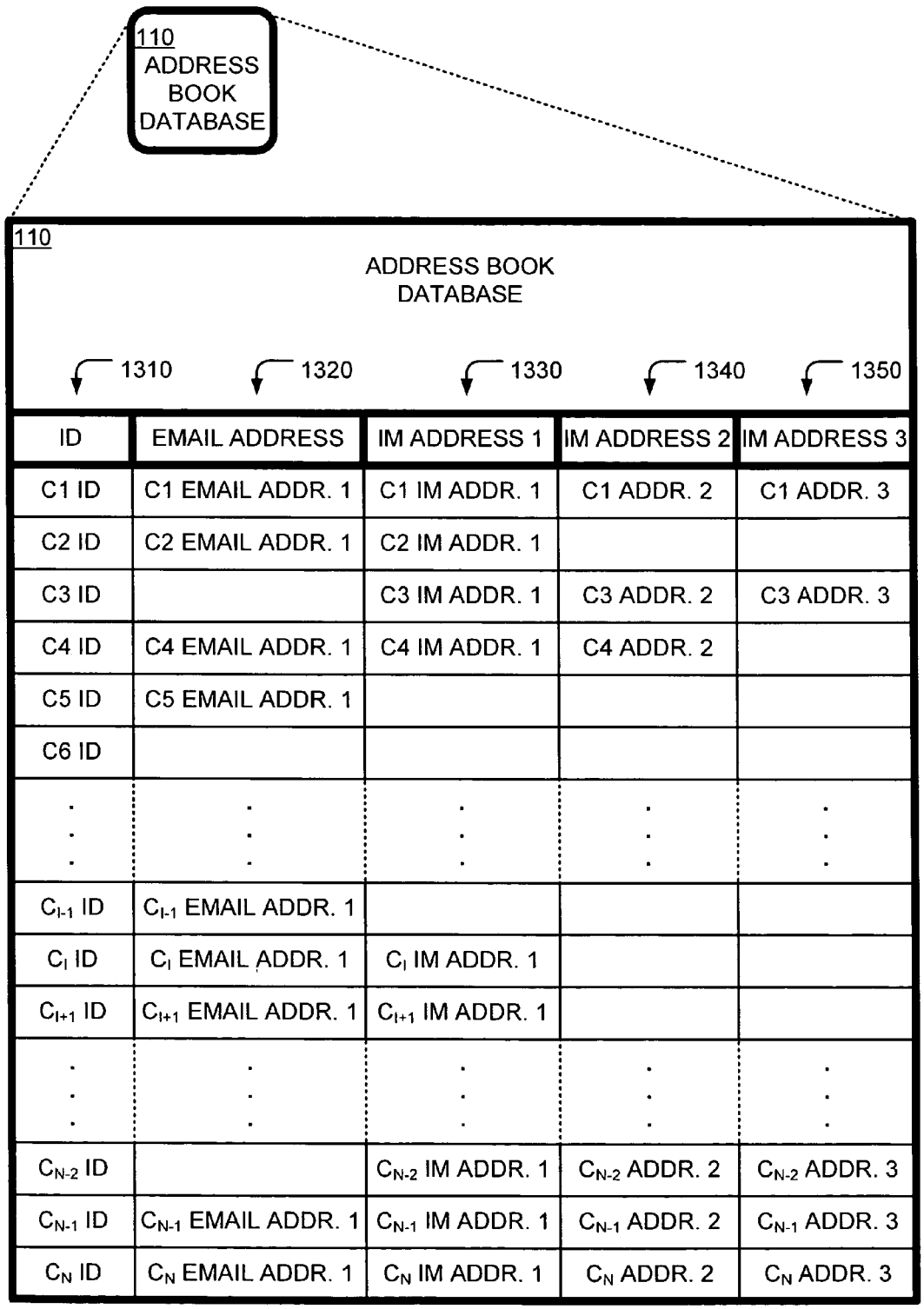
FIGS. 13A and 13B are diagrams showing one embodiment of the address book database of FIG. 7 in greater detail.
Figure 13B:
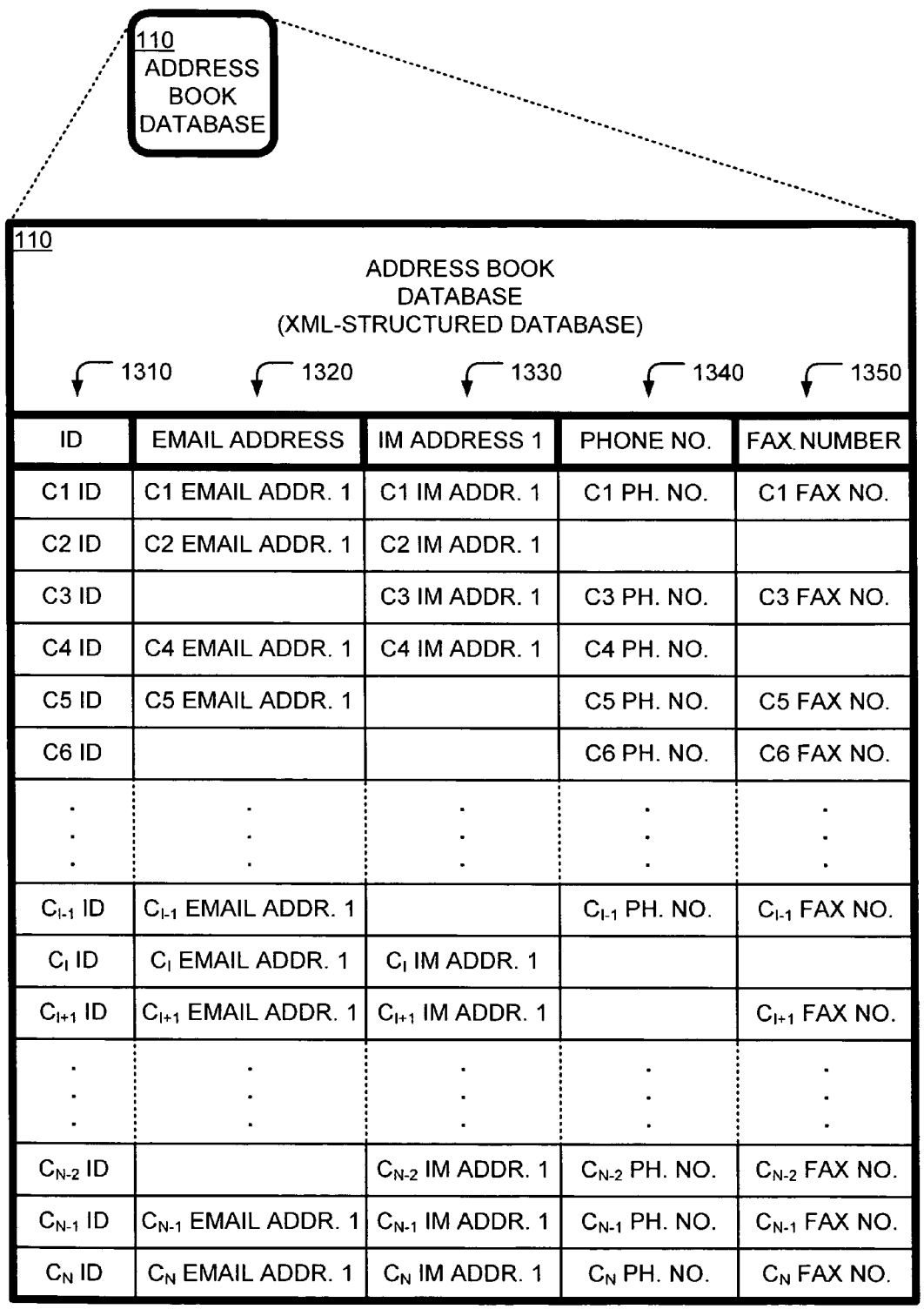

FIGS. 13A and 13B are diagrams showing one embodiment of the address book database 110 of FIG. 7 in greater detail. As described with reference to FIG. 10, once information associated with a contact has been entered by the user, this information is stored in the address book database 110. As described with reference to FIGS. 1 through 3C, the address book database 110 is one component through which email and IM integration is achieved.

The address book database 110 comprises entries that are sorted according to contact identifiers 1310. In one embodiment, the contact identifier 1310 is an identification number that is unique to each contact. Thus, no two contacts share the same contact identifier 1310. In another embodiment, the contact identifier 1310 is the name of the contact.

In any event, every piece of information related to a specific contact is correlated to the contact identifier 1310, thereby permitting a lookup of information based on the contact identifier 1310. Thus, as shown in FIGS. 13A and 13B, if an email address for a contact is entered as described with reference to FIG. 12, then this email address 1320 is stored in the address book database 110 so that it is correlated to the contact identifier 1310 for that contact. Similarly, if an IM address 1330, 1340, 1350 is entered for the contact, then the IM address 1330, 1340, 1350 is stored in the address book database 110 so that it is correlated to the contact identifier 1310 for that contact. Phone numbers 1340, fax numbers 1350, etc. are similarly stored in the address book database 110. Thus, the address book object 108 may determine any information associated with a particular contact by accessing the address book database 110 and looking up the contact identifier 1310 of the contact.

For example, in operation, if the address book object 108 is provided an email address, as described with reference to FIG. 5, the address book object 108 may access the address book database 110 using the email address to determine a corresponding contact identifier 1310 for that email address. Once the corresponding contact identifier 1310 is determined, the address book object 108 may retrieve the IM address of the contact from the address book object 108 using the contact identifier 1310. Thus, as described with reference to FIG. 5, if the email address corresponds to one or more IM addresses, then these IM addresses may be returned to the address book object 108, thereby permitting the address book object 108 to query the IM user agent 104 for IM Internet presence information associated with the contact identifier.

In an example embodiment, the IM addresses 1330, 1340, 1350 are stored in order of priority. In other words, if a user prefers to engage in an IM session with a contact at a particular IM address (e.g., Yahoo IM address, AOL IM address, MSN IM address, BellSouth IM address, etc.), then the particular IM address is stored as the first IM address 1330. Similarly, if the contact has multiple IM addresses, then the user may arrange each IM address in the order of the user's preference. Thus, in operation, if a user launches an IM session with a contact from the read window 412, as described with reference to FIGS. 5 and 9, then the address book object 108 issues an IM session invitation to the first IM address 1330 stored in the address book database 110. If the contact is not present at the first IM address 1330, then the address book object 108 issues an IM session invitation to the second IM address 1340. The address book object 108 continues in a "round-robin" fashion until an IM session acceptance is received from one of the IM addresses. Since the address book object 108 issues invitations in order of priority as stored in the address book database 110, an IM session will be established using a higher priority IM address or a more preferred IM address before being established using a lower priority IM address.

Figure 14:
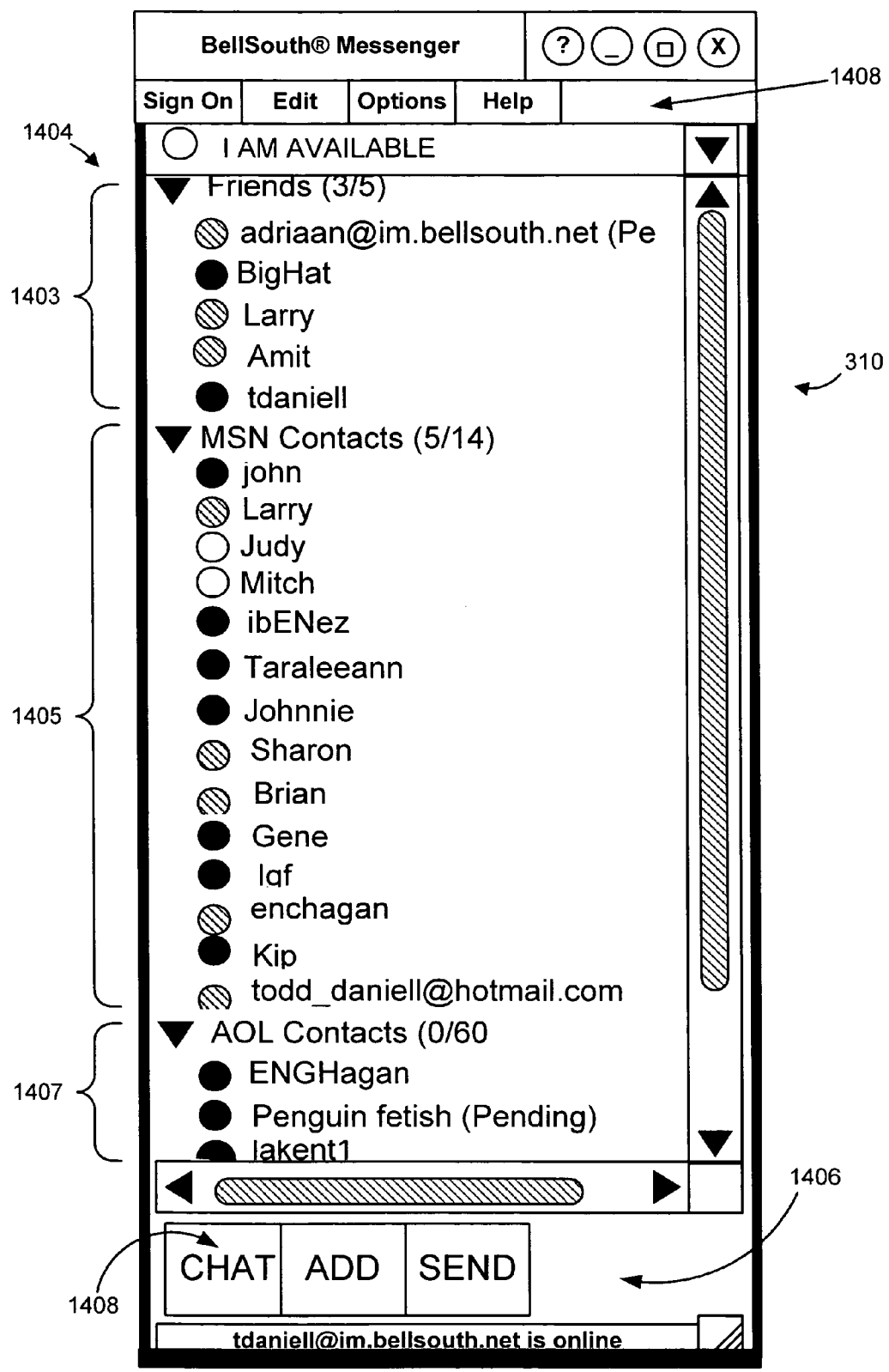
FIG. 14 is a diagram showing one embodiment of the roster window of FIG. 7 in greater detail.

FIG. 14 is a diagram showing one embodiment of the roster window 310 of FIG. 7 in greater detail. As shown in FIG. 7, the roster window 310 comprises a list of contacts 1404, which may be sub-divided according to their respective IM accounts. Thus, for example, if the user's contacts have MSN IM accounts and AOL IM accounts, then the contacts having MSN accounts 1405 are grouped together while the contacts having AOL accounts 1407 are grouped together. Since the roster window 310 is described in detail in U.S. provisional patent application Ser. Nos. 60/411,336 and 60/419,613, and U.S. patent application Ser. Nos. 10/274,408, 10/274,478, and 10/274,405, further discussion of the roster window 310 is omitted here. However, it is worthwhile to note that, unlike prior systems, the roster window 310 of FIG. 14 permits a user to initiate an IM session with contacts at various IM addresses without manually logging into multiple IM accounts.

Figure 15:
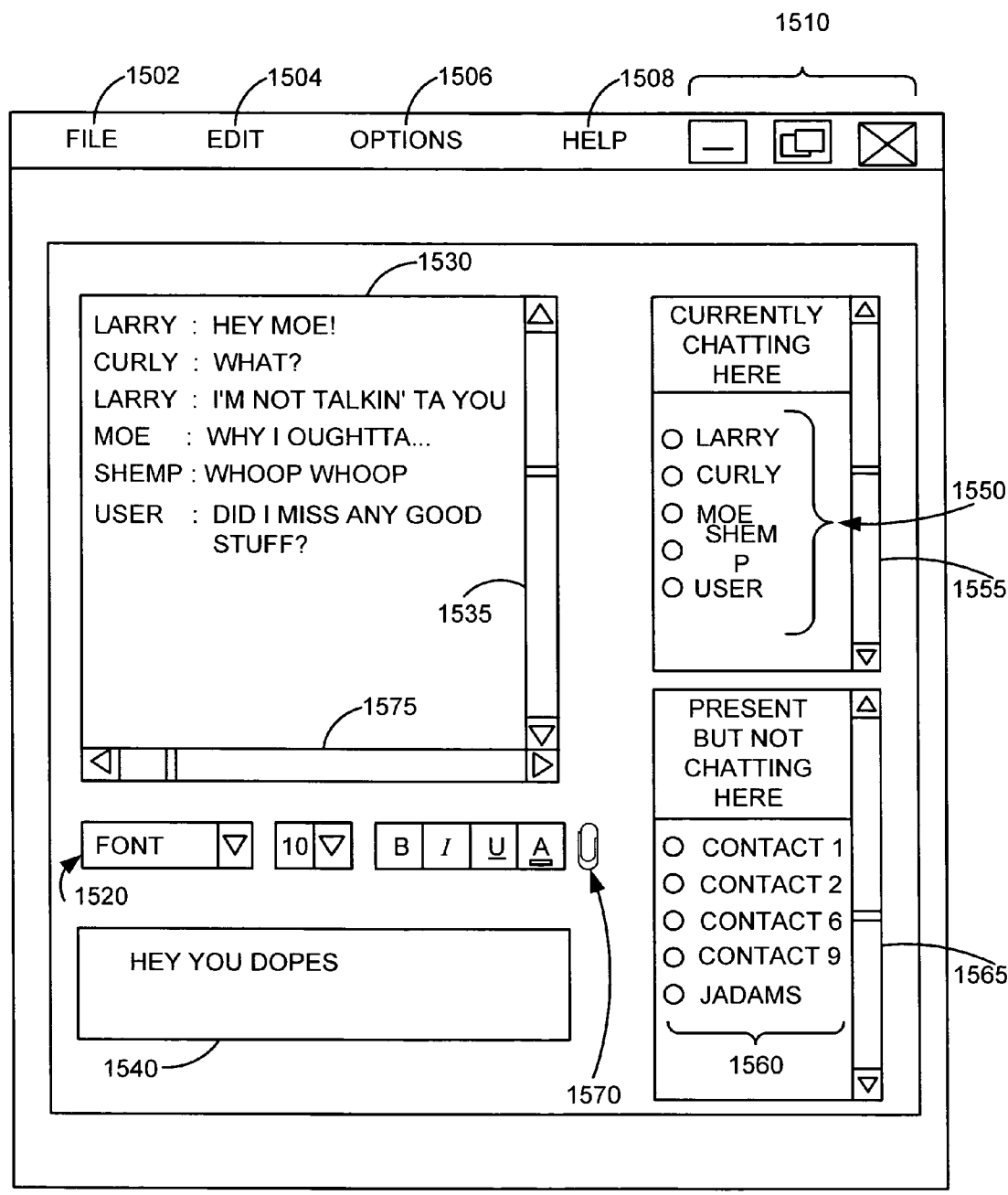
FIG. 15 is a diagram showing one embodiment of the chat window of FIG. 7 in greater detail.

FIG. 15 is a diagram showing one embodiment of the chat window 614 of FIG. 7 in greater detail. As shown in FIG. 15, the chat window 614 comprises a transcript display window 1530, a user input window 1540, a first roster window 1555, and a second roster window 1565. The transcript display window 1530 displays IM messages that are typed by all of the participants in the IM chat session. Thus, if Larry, Curly, Moe, Shemp, and the user are engaged in an IM chat session, then each of the messages typed by the participants is displayed in the transcript display window 1530. The user input window 1540 displays the IM messages that are being typed by the user.

The first roster window 1555 shows all of the contacts that are currently chatting in the chat window 614, while the second roster window 1565 displays all of the contacts that are present on the Internet but not chatting in the chat window 614. If the user chooses to invite a contact from the second roster window 1565 to the current chat session in the chat window 614, then the user may select the contact from the second roster window 1565 and "drag and drop" that contact into the first roster window 1555, thereby effectively inviting that contact into the current chat session. Similarly, if the user wishes to remove a currently chatting contact from the IM chat session, then the user may "drag and drop" that contact from the first roster window 1555 to the second roster window 1565. Thus, as shown with reference to FIG. 15, each of the participants of the IM session may invite or remove participants from the current IM chat session by moving the contacts from one roster window to the other roster window.

Although chatting between multiple participants from a common IM service is known in the art, the embodiment of FIG. 15 permits chatting between multiple participants from different IN services. Thus, for example, Larry (in FIG. 15) may be using a Yahoo IM service, while Curly is using an AOL IM service, while Moe and Shemp may each be using an MSN IM service.

In operation, when the user types an IM message at the user input window 1540, the typed message is translated into the native protocol associated with each of the other participants' IM services. Thus, any message typed by the user is displayed to each of the other participants in the IM chat session. Similarly, when the other participants type messages from their native IM windows, these messages are translated from the native protocols to an abstraction protocol, and the translated messages are displayed to the user at the IM chat window 614. Since translations to and from native protocols is described in detail in U.S. provisional patent application Ser. Nos. 60/411,336 and 60/419,613, and U.S. patent application Ser. Nos. 10/274,408, 10/274,478, and 10/274,405, further discussion of translations into native protocols is omitted here.

Additionally, one embodiment of the system of FIG. 15 provides a mechanism by which the other participants from the various other IM services may also engage in the IM session with the other participants. In other words, even if Larry only has a Yahoo IM account and Moe only has an MSN account, it is possible for Larry to engage in an IM chat session with Moe through the user's IM chat window 614.

In this regard, the system of FIG. 15 is configured so that when Larry sends an IM message to the user, the message is received by the user's system, reformatted for Moe's IM service, and conveyed to Moe. Ordinarily, if the user's system merely conveys the message to Moe, then Moe will see that the message originates from the user, rather than from Larry. Thus, in order to seamlessly provide Moe with Larry's IM message, the user's system removes the user's information for all of Larry's IM messages, and substitutes Larry's information in place of the user's information. In this regard, when Moe receives an IM message from Larry through the user's IM account, the message will appear as if it were directly sent to Moe, rather than being cascaded through the user's IM account.

In one embodiment, the user's IM address is removed from the IM message by inserting an appropriate number of delete characters into the text stream adjacent to the user's IM address. Thus, for example, if the user's IM address is ten characters in length, then, by inserting ten delete characters adjacent to the user's IM address, the user's IM address will be deleted from the text stream. Similarly, if the user's IM address is 25 characters, then the insertion of 25 delete characters effectively removes the user's IM address from the forwarded text stream. Thus, regardless of the originator of the IM message, the user's system may remove the user's information from the IM message prior to forwarding the IM message to the other IM participants, thereby seamlessly interfacing the various IM services to one another through the user's IM account.

As described with reference to FIG. 15, one embodiment of the system provides for an IM session with multiple participants from multiple different IM services. Thus, in addition to seamlessly integrating email and IM, one embodiment of the system permits seamless integration of IM services across multiple different IM platforms.

Figure 16:
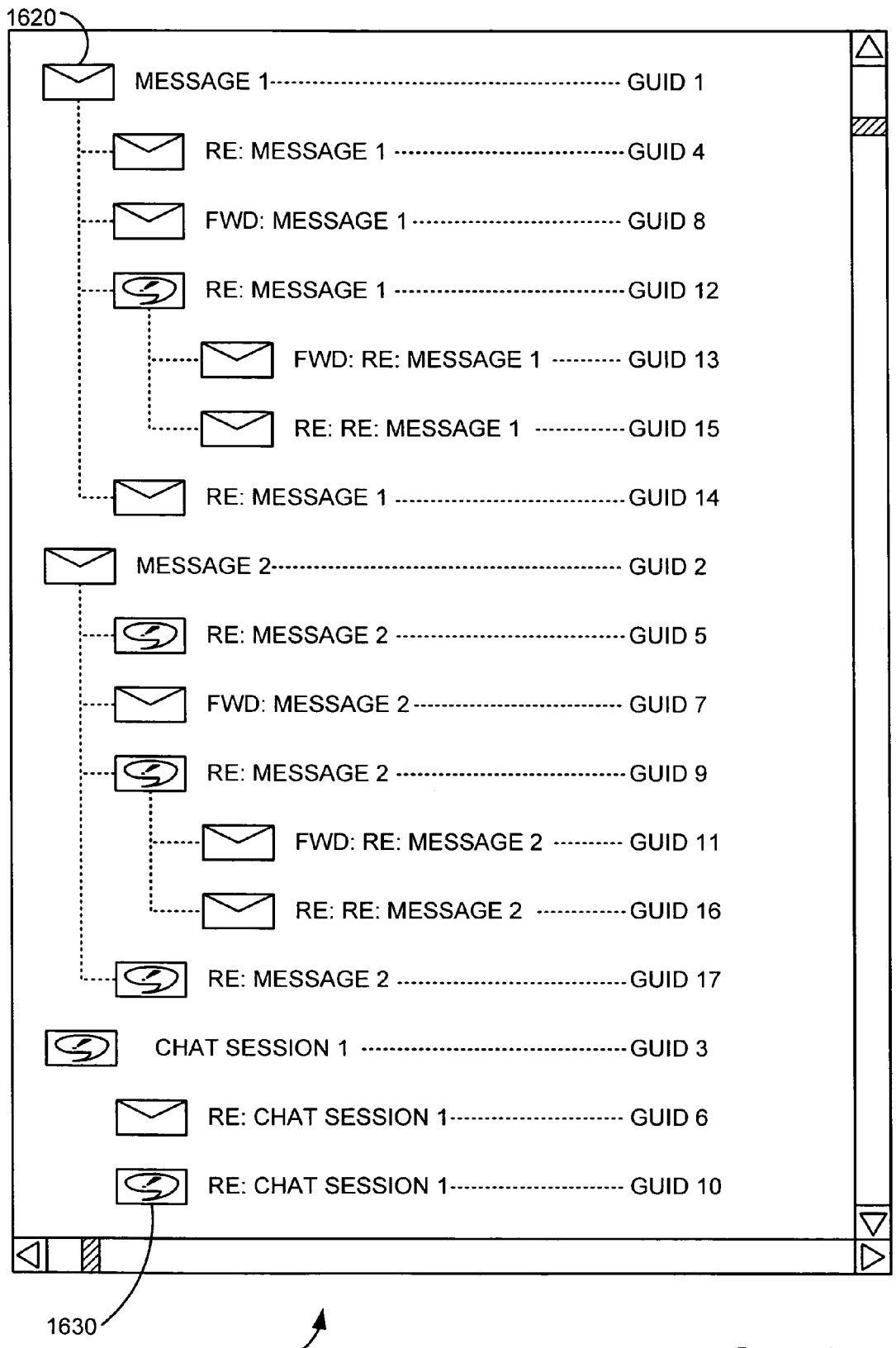
FIG. 16 is a diagram showing a thread history database in accordance with one embodiment of the invention.

FIG. 16 is a diagram showing a thread history database 1610 in accordance with another embodiment of the invention. As described with reference to FIGS. 5 and 10, a user may launch an IM session directly from an email read window 412. Thus, unlike prior systems, an email message may be threaded to an IM chat session. In this regard, when an IM chat session is launched from an email read window, the IM chat session is tagged with a pointer to the email message.

Similarly, a participant in a chat session may email another participant in the chat session, thereby threading an email message to a chat session. In this regard, when an email message is launched from an IM chat session, the email message is tagged with a pointer to the IM chat session. In order to track threads across IM and email, a thread history database 1610 is maintained. For simplicity, the email message or IM session from which a subsequent email message or IM session is launched is referred to as the "parent," and the email message or IM session that is launched from the parent is referred to as the "child."

In operation, when a child email message is generated from a parent IM chat window 614 (or a parent compose window 408), a globally unique identifier (GUID) is generated along with the child email message. Similarly, for each reply or forwarded email message, a GUID is generated. A pointer to the generated GUID is also created in the parent IM chat window, thereby linking the parent IM chat session to the child email message. Similarly, a pointer to the GUID of the parent IM chat session is created in the child email message, thereby linking the child email message to the parent IM chat session. In an example embodiment, the GUID is a 128-bit number that is unique to that message. Since GUID generation is well known in the art, further discussion of GUID generation is omitted here.

Likewise, when an IM chat session is established (see FIG. 6C), a corresponding chat session transcript is generated for that IM chat session. Similar to the generation of GUIDs for email messages, a GUID is generated for each chat session transcript. Thus, regardless of whether an email message is generated or whether a chat session is initiated, each message or transcript is associated with a GUID. Additionally, when a child IM chat session is established or launched from a parent email window, a pointer to the GUID of the child IM chat session is created in the parent email message, thereby linking the child IM chat session to the parent email message. Similarly, a pointer to the GUID of the parent email message is created in the child IM chat session, thereby linking the child IM chat session to the parent email message.

Each of the email messages or chat transcripts are stored in the thread history database 1610, along with its GUID, in a tree structure. As shown in FIG. 16, each email message is displayed with an email icon 1620, while each IM chat transcript is displayed with an IM icon 1630, thereby distinguishing email threads from chat threads.

In operation, when a user selects one of the email messages in the thread history, the selected email message is displayed to the user in an email read window 412. The email read window 412 also includes the pointer to the parent email message (or parent IM chat session) so that the user may track the history of the message. Similarly, the email read window 412 includes the pointer to any child email message (or child IM chat session) so that the user may track subsequent email messages (or subsequent IM chat sessions) that were launched from the displayed email message.

Likewise, when the user selects one of the IM chat sessions in the thread history, a transcript of the selected IM chat session is displayed to the user in an IM chat window 614. The IM chat window 614 also includes a pointer to the parent email message (or parent IM chat session) so that the user may track the history of the IM chat session. Similarly, the IM chat window 614 includes the pointer to any child email message (or child IM chat session) so that the user may track subsequent email messages (or subsequent IM chat sessions) that were launched from the displayed IM chat session transcript.

Since storing of thread histories, generally, is known in the art, further discussion of storing thread histories is omitted here. However, it is worthwhile to note that, unlike prior systems, the integration of email and IM as shown in the embodiments of FIGS. 1 through 15 permits threading of both email and IM messages.

In another embodiment, the thread history database 1610 permits the user to access any related message, whether email-related or IM-related, from the tree-structure. Thus, for example, if a user wishes to view an IM chat transcript associated with a particular email message, then the user may select the IM chat transcript from the thread history database 1610 and open the IM chat transcript for viewing. Upon opening the IM chat transcript, an IM chat window may be provided to the user, thereby permitting the user to continue the IM chat session in the IM chat window. Similar to opening of the IM transcript, if the user wishes to view an email message associated with a particular IM chat session, the email message may be selected from the thread history database 1610 for viewing by the user.

In some embodiments, the IM chat transcript may be stored in response to a user input. In other words, an IM client may be configured to prompt the user at the end of each IM chat session. The prompt would query the user to determine whether or not the user wishes to store the IM chat transcript. In some embodiments, the query may be implemented as an alert window or a dialogue box that provides user selectable options. For example, the dialogue box may prompt the user with the question "save IM chat transcript?" Along with the question, two user-selectable icons (e.g., "yes" and "no") may be provided to the user so that the user may indicate whether or not the IM chat transcript should be saved.

For those embodiments that provide user-selectable icons, if the user chooses to save the IM chat transcript, then the IM client saves the IM chat transcript with an appropriate link to the parent email message or IM chat message. In other words, if the IM chat session is a child of a parent message (email or IM), then the IM chat transcript is threaded to the parent message.

In some embodiments, the IM chat transcript may be saved as a text file having a log of the events (e.g., text IM messages, file transfers, etc.) associated with the IM chat session. In this regard, the text file may be structured in such a fashion so that it may be exported to other programs, such as Microsoft® Outlook. In some embodiments, the IM chat transcript may be converted to an email message and saved as an email message. By saving the IM chat transcript as an email message, the thread history may be directly exported to email programs, such as Microsoft® Outlook.

In other embodiments, the system may be configured such that the prompting mechanism may optionally be enabled or disabled by the user. For example, when the prompting mechanism is enabled, the system may display a prompt to the user as described above. Alternatively, when the prompting mechanism is disabled, the system may be configured so that the IM chat transcript is saved for all IM chat sessions. Also, when the prompting mechanism is disabled, the system may be configured so that none of the IM chat session is saved. In this regard, when the prompting mechanism is disabled, the IM chat transcript may be optionally automatically saved or disregarded.

As shown with reference to FIG. 16, by having a thread history database 1610 having both IM-related transcripts and email-related messages, a user may track each message or transcript according to the thread history.

As shown in FIGS. 1 through 16, several embodiments of systems for integrating email and IM services is shown. The several embodiments of the invention, however, may also be seen as providing methods for integrating email and IM services. Several embodiments of methods for integrating email and IM services is shown with reference to FIGS. 17 through 27.

Figure 17:
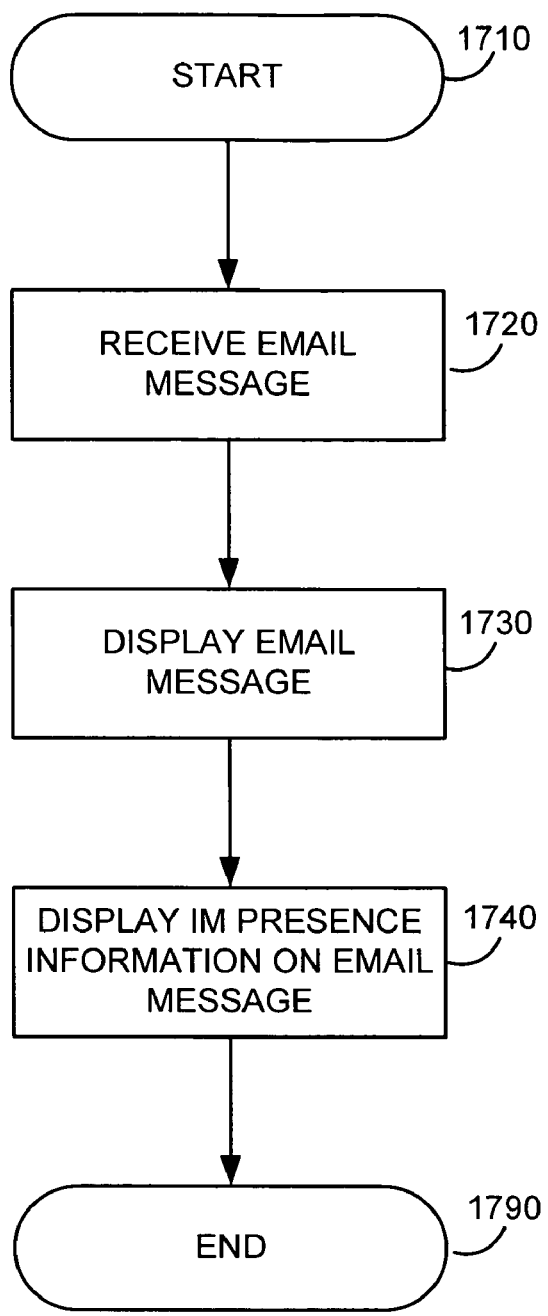
FIG. 17 is a flowchart showing one embodiment of a method for integrating email and IM services in which IM Internet presence information is displayed on an email read window.

FIG. 17 is a flowchart showing one embodiment of a method for integrating email and IM services in which IM Internet presence information is displayed on an email read window. As shown in FIG. 17, one embodiment of the method begins when an email message is received (1720) from a contact. The received (1720) email message has an email address of the contact. The received (1720) email message is displayed (1730) to a user. Additionally, IM presence information is displayed (1740) on the email message. In an example embodiment, the method of FIG. 17 may be performed by the system as described with reference to FIGS. 1 through 5 and FIGS. 9 and 10. Thus, in an example embodiment, the IM presence information is displayed (1740) adjacent to the email address of the contact. In another embodiment, the email message has email addresses of multiple contacts to whom the email message was directed. In that embodiment, the IM presence information is displayed (1740) on the email message adjacent to each of the contacts' email addresses.

Figure 18:
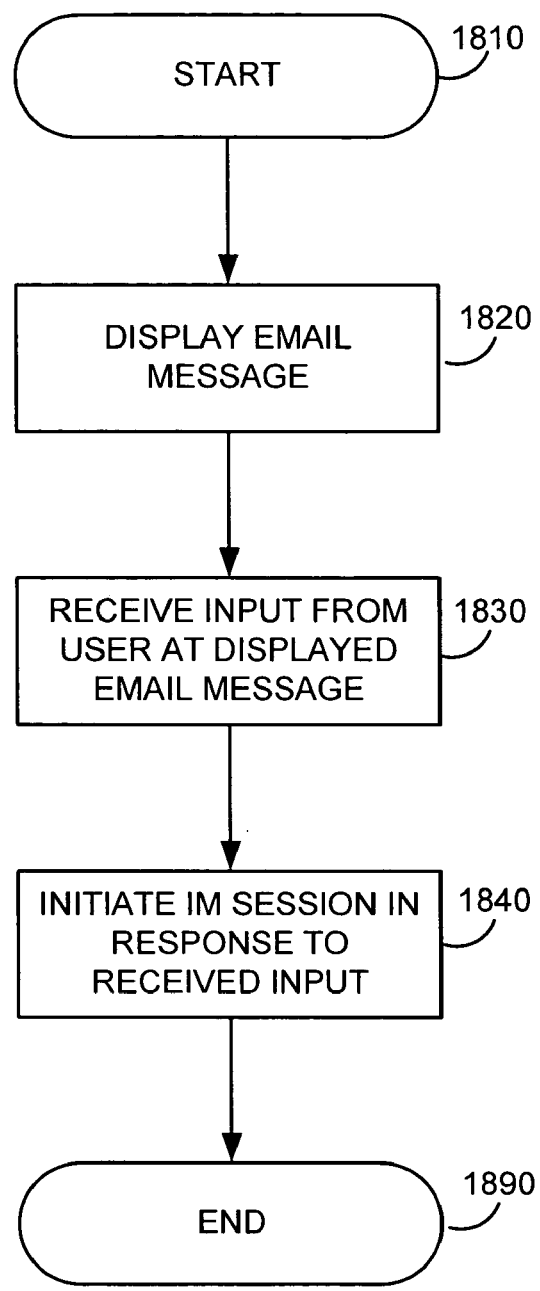
FIG. 18 is a flowchart showing another embodiment of a method for integrating email and IM services in which an IM session may be initiated from an email read window.

FIG. 18 is a flowchart showing another embodiment of a method for integrating email and IM services in which an IM session may be initiated from an email read window. As shown in FIG. 18, another embodiment of the method begins when an email message from a contact is displayed (1820) to the user at an email read window. The email message includes an email address of the contact. Upon displaying (1820) the email message to the user, the system awaits user input. When the user provides the user input, the user input is received (1830) at the displayed email message. In response to the received (1830) user input, an IM session is initiated (1840) between the user and the contact. In another embodiment, the email message includes email addresses of multiple contacts to whom the email message was directed. In that embodiment, the user input is a selection of one or more of the email addresses of the multiple contacts. Thus, for that embodiment, an IM session is initiated (1840) between the user and one or more of the multiple contacts. In an example embodiment, the method of FIG. 18 may be performed by the systems described with reference to FIGS. 1 through 5 and FIGS. 9 and 10.

Figure 19:
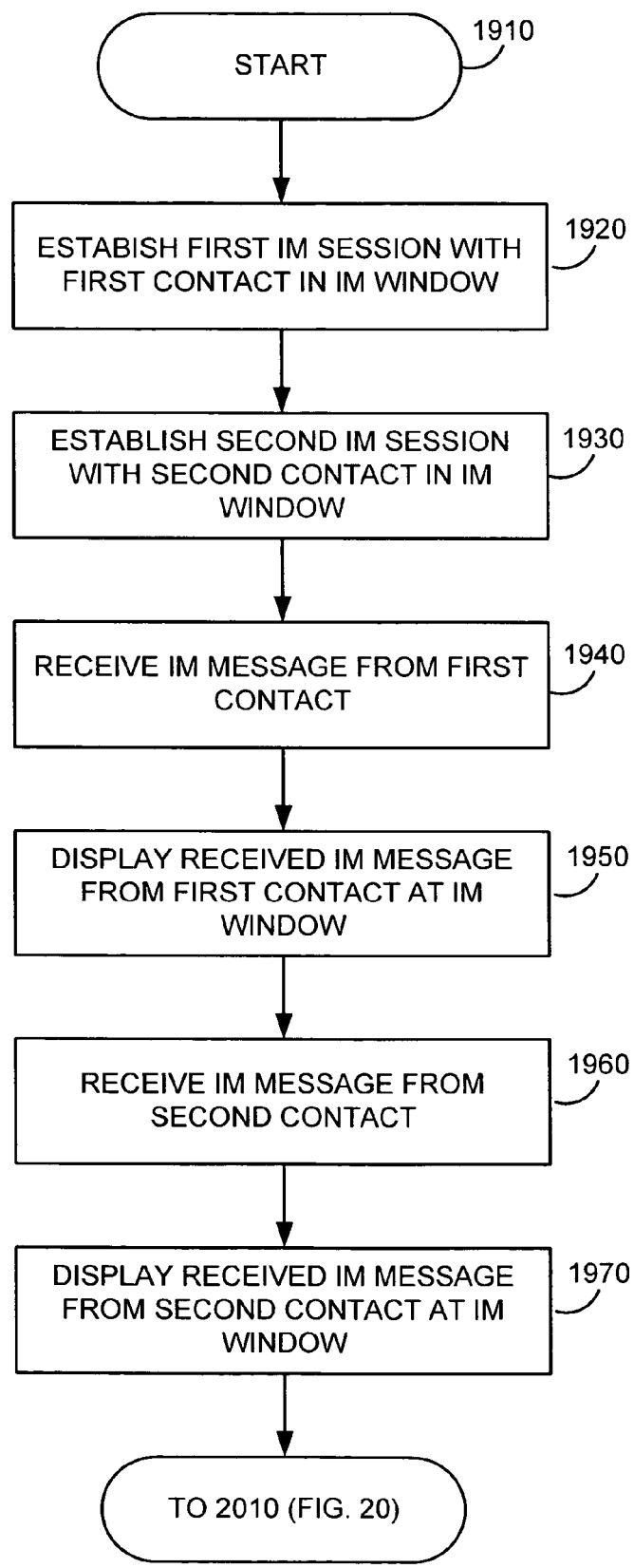
FIGS. 19 and 20 are flowcharts showing another embodiment of a method for integrating email and IM services in which IM sessions with multiple contacts is established at a single IM window.
Figure 20:
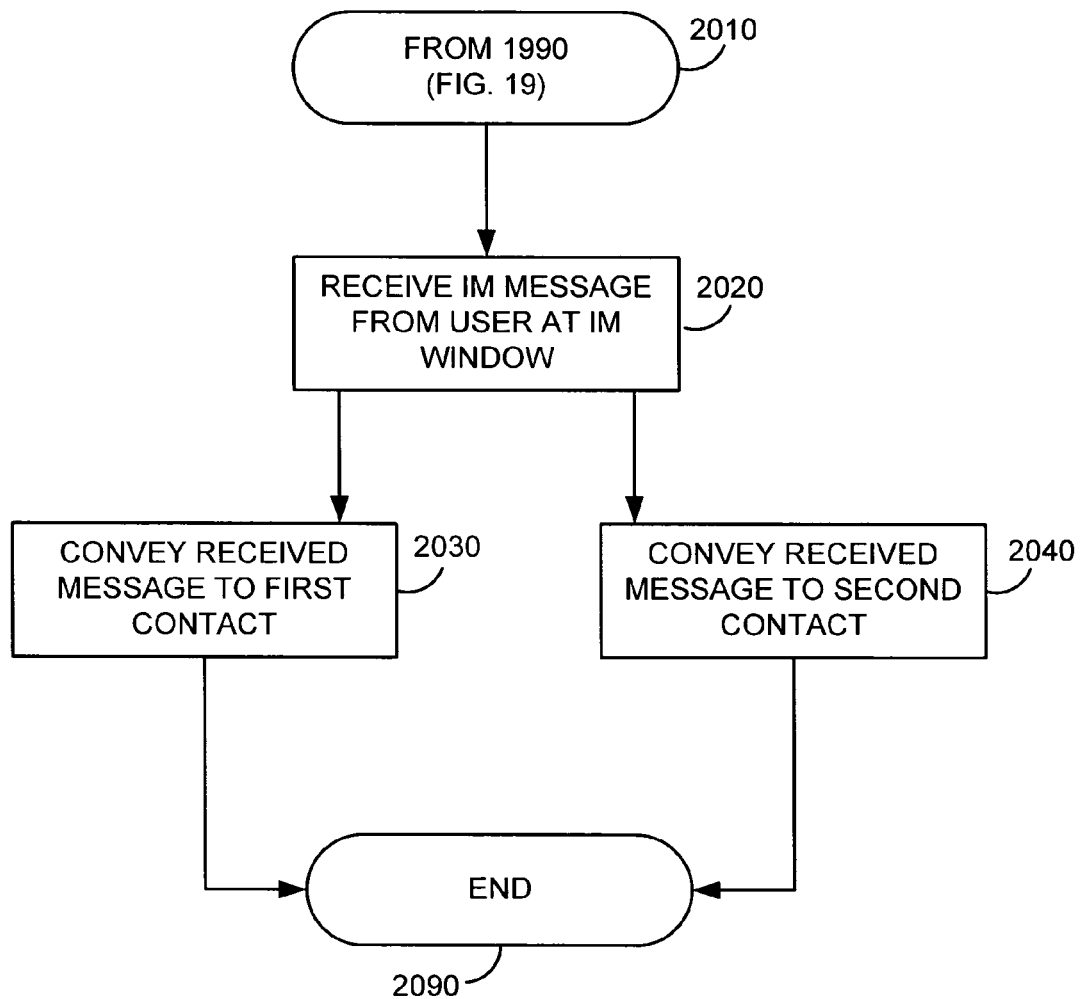

FIGS. 19 and 20 are flowcharts showing another embodiment of a method for integrating email and IM services in which IM sessions with multiple contacts is established at a single IM window. As shown in FIG. 19, a first IM session is established (1920) between the user and a first contact at an IM window. Upon establishing (1920) the first IM session with the first contact in the IM window, a second IM session is established (1930) with a second contact in the same IM window. Once the first IM session with the first contact is established (1920), the user receives (1940) IM messages from the first contact. The received (1940) IM messages are displayed (1950) to the user at the IM window. Similarly, once the second IM session with the second contact is established (1930), the user receives (1960) IM messages from the second contact. The received (1960) messages are displayed (1970) to the user at the IM window.

When the user types an IM message to the first and second contacts, this IM message is received (2020) at the IM window. After receiving (2020) the IM message typed by the user, the IM message is conveyed (2030) to the first contact. Similarly, the IM message is also conveyed (2040) to the second contact. In an example embodiment, the method of FIGS. 19 and 20 may be performed by the systems described in FIGS. 1 through 5 and FIG. 15.

Figure 21:
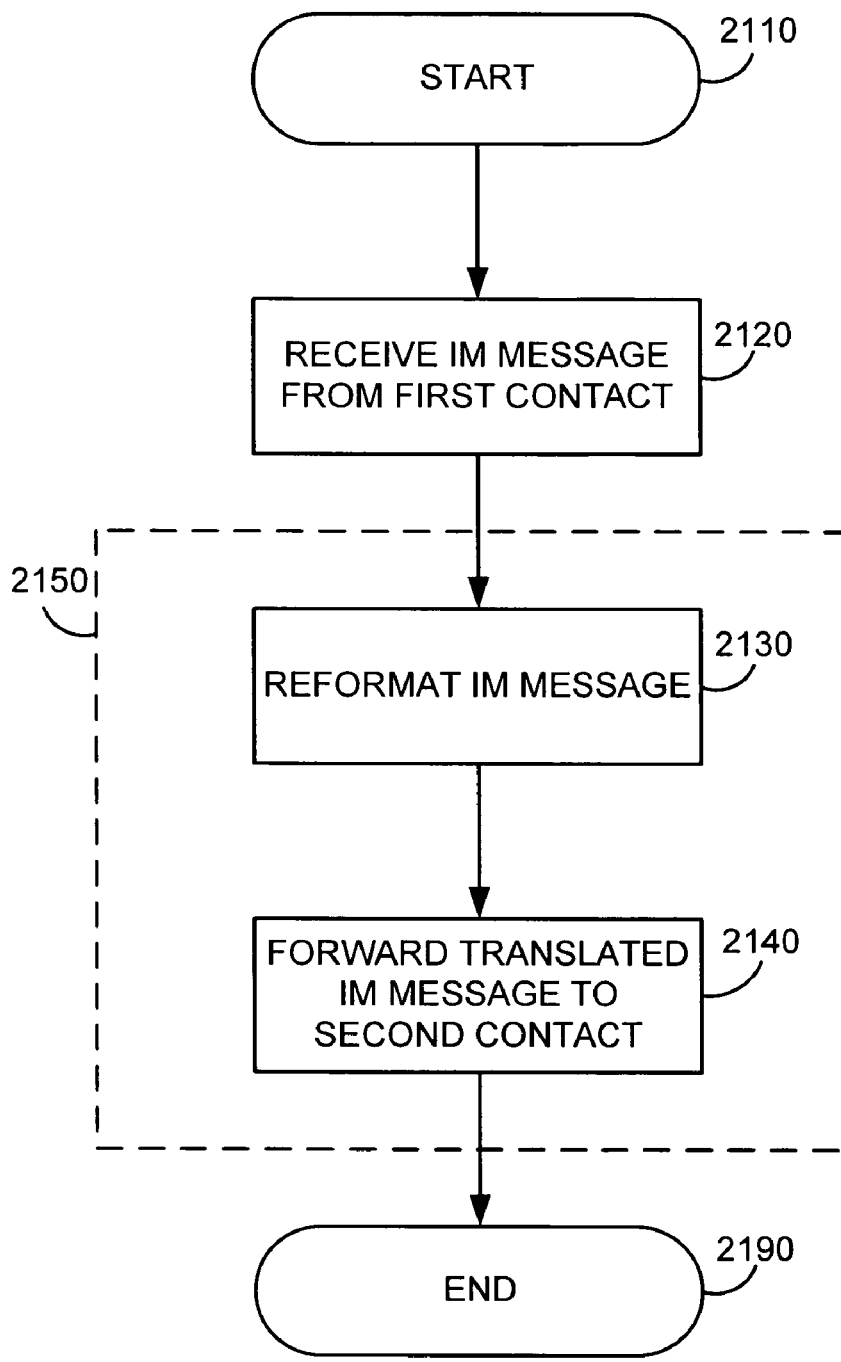
FIG. 21 is a flowchart showing another embodiment of a method for integrating email and IM services in which IM messages from two disparate IM services is bridged by the user's IM service.

FIG. 21 is a flowchart showing another embodiment of a method for integrating email and IM services in which IM messages from two disparate IM services is bridged by the user's IM service. As shown in FIG. 21, an IM message is received (2120) from a first contact. The IM message received (2120) from the first contact is transmitted by the first contact using a first IM protocol. Upon receiving (2120) the IM message, the IM message is reformatted (2130) and forwarded (2140) to a second contact. The second contact receives the IM message using a second IM protocol. The reformatting (2130) and forwarding (2140) of the IM message may be seen, in the aggregate, as a conveying (2150) of the IM message to the second contact. In an example embodiment, the method of FIG. 21 may be performed by the systems described in FIGS. 1 through 5 and FIG. 15.

Figure 22:
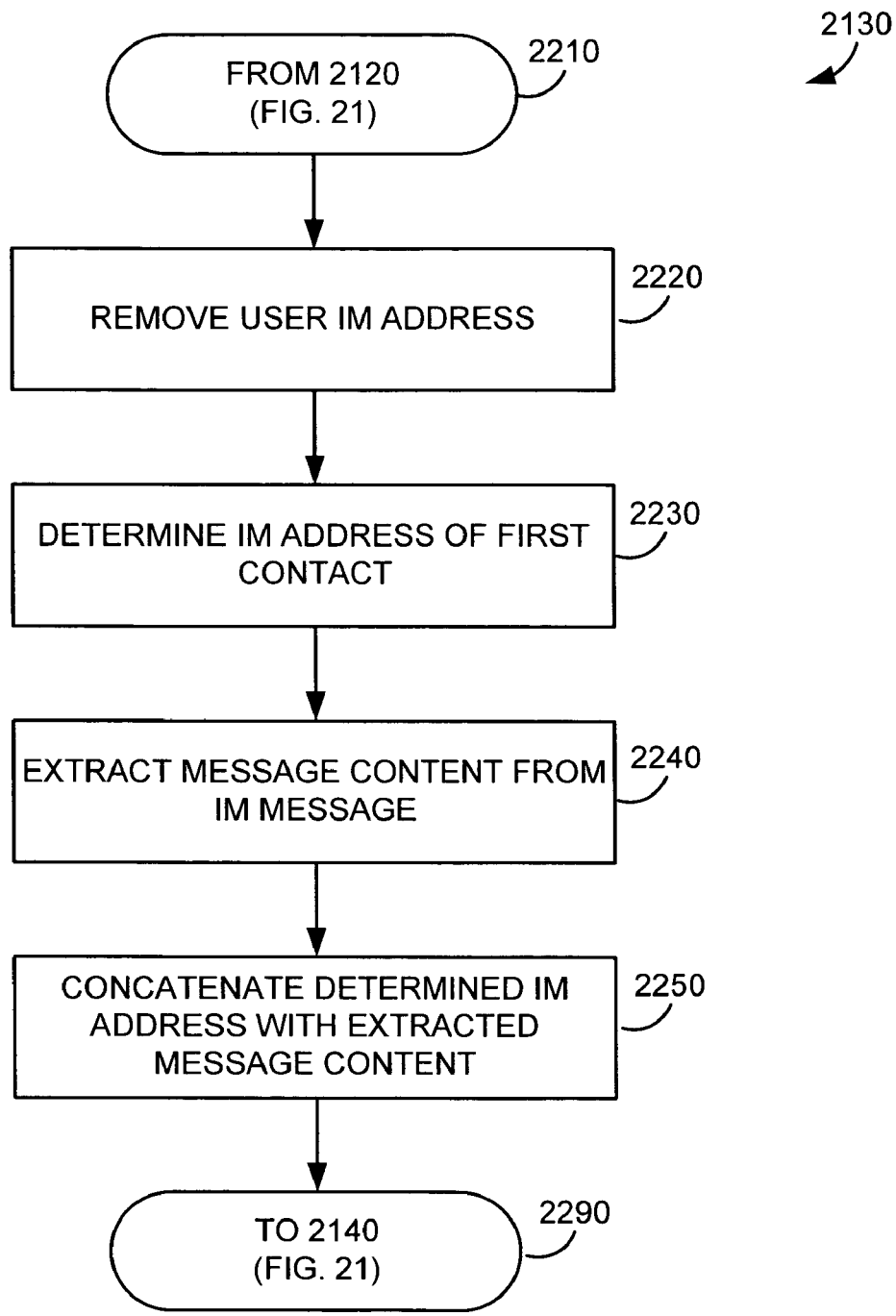
FIG. 22 is a flowchart showing, in greater detail, the reformatting of the IM message shown in FIG. 21.

FIG. 22 is a flowchart showing, in greater detail, the reformatting (2130) of the IM message shown in FIG. 21. As shown in FIG. 22, the reformatting (2130) may be seen as comprising the removal (2220) of the user's IM address. Upon removing (2220) the user's IM address, the IM address of the first contact is determined (2230). Once the IM address of the first contact is determined (2230), the message content from the IM message is extracted (2240). The extracted (2240) message content is then concatenated (2250) with the determined IM address of the first contact. As shown in the embodiment of FIG. 22, by removing the user's IM address from the message, the IM message is forwarded to the recipient as if it were directly sent to the recipient, rather than being cascaded through the user's system.

Figure 23:
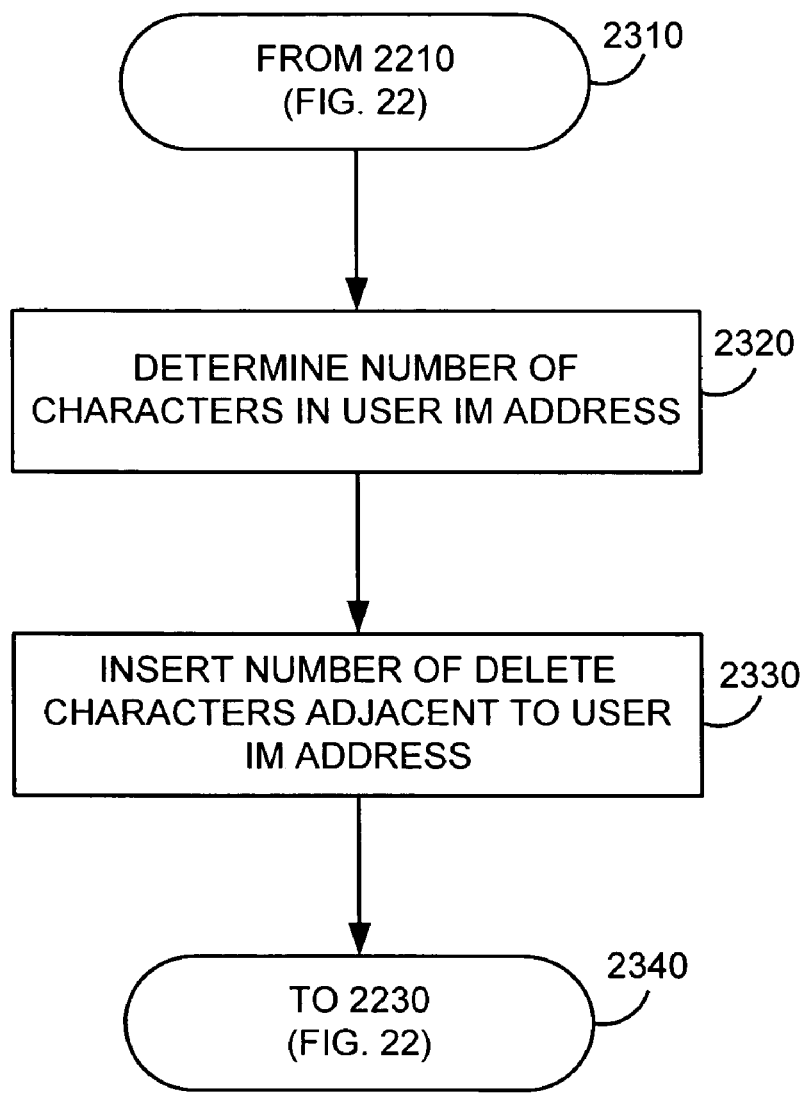
FIG. 23 is a flowchart showing, in greater detail, the removing of the user IM address from the IM message as shown in FIG. 22.

FIG. 23 is a flowchart showing, in greater detail, the removing (2220) of the user IM address shown in FIG. 22. The removing (2220) of the user's IM address may be seen as a two-step process. Thus, as shown in FIG. 23, the removing (2220) of the user's IM address begins with determining (2320) a number of characters in the user's IM address. Upon determining (2320) the number of characters in the user's IM address, the same number of delete characters is inserted (2330) adjacent to the user's IM address. Thus, in effect, the inserted delete characters removes the user's IM address from the message stream.

Figure 24:
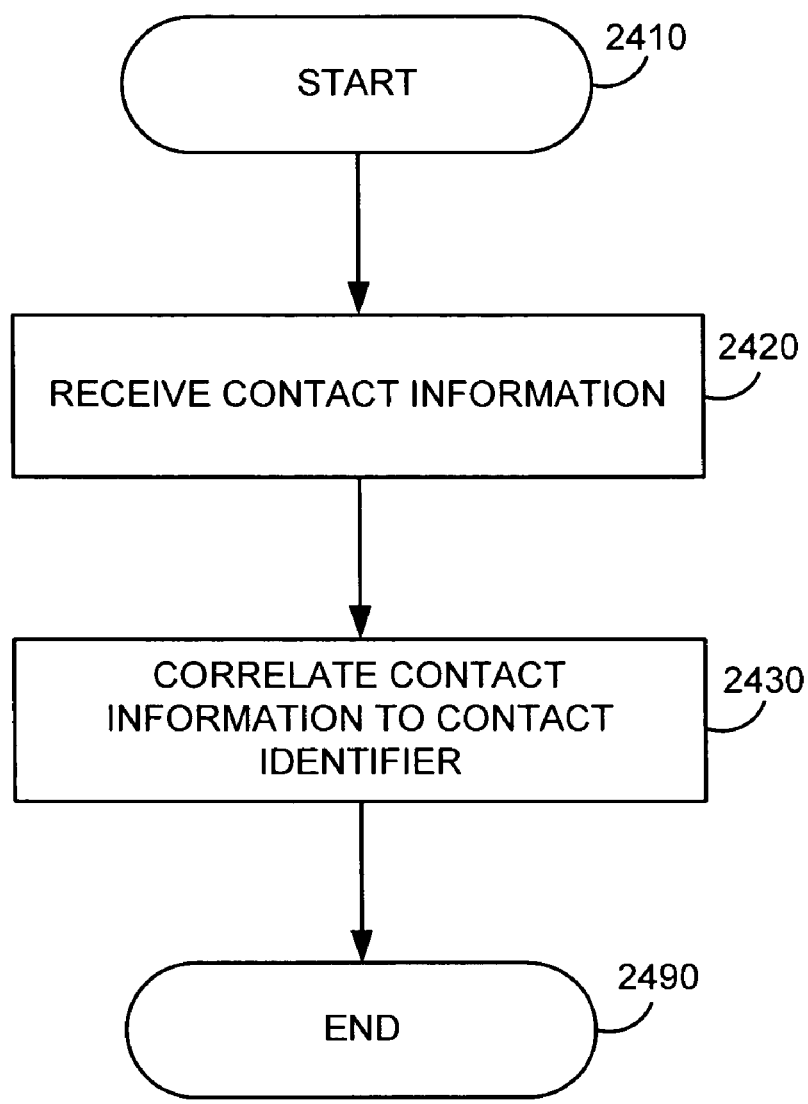
FIG. 24 is a flowchart showing one embodiment of a method for integrating email and IM services in which contact information is correlated to a contact identifier associated with a particular contact.

FIG. 24 is a flowchart showing one embodiment of a method for integrating email and IM services in which contact information is correlated to a contact identifier associated with a particular contact. As shown in FIG. 24, one embodiment of the method begins with receiving (2420) of contact information. Upon receiving (2420) the contact information, the received (2420) contact information is correlated (2430) to a contact identifier. As described with reference to FIGS. 12 through 13B, the contact information may comprise a full name, one or more email addresses, one or more IM addresses, one or more phone numbers, one or more mailing addresses, and other detailed information related to the contact.

Figure 25:
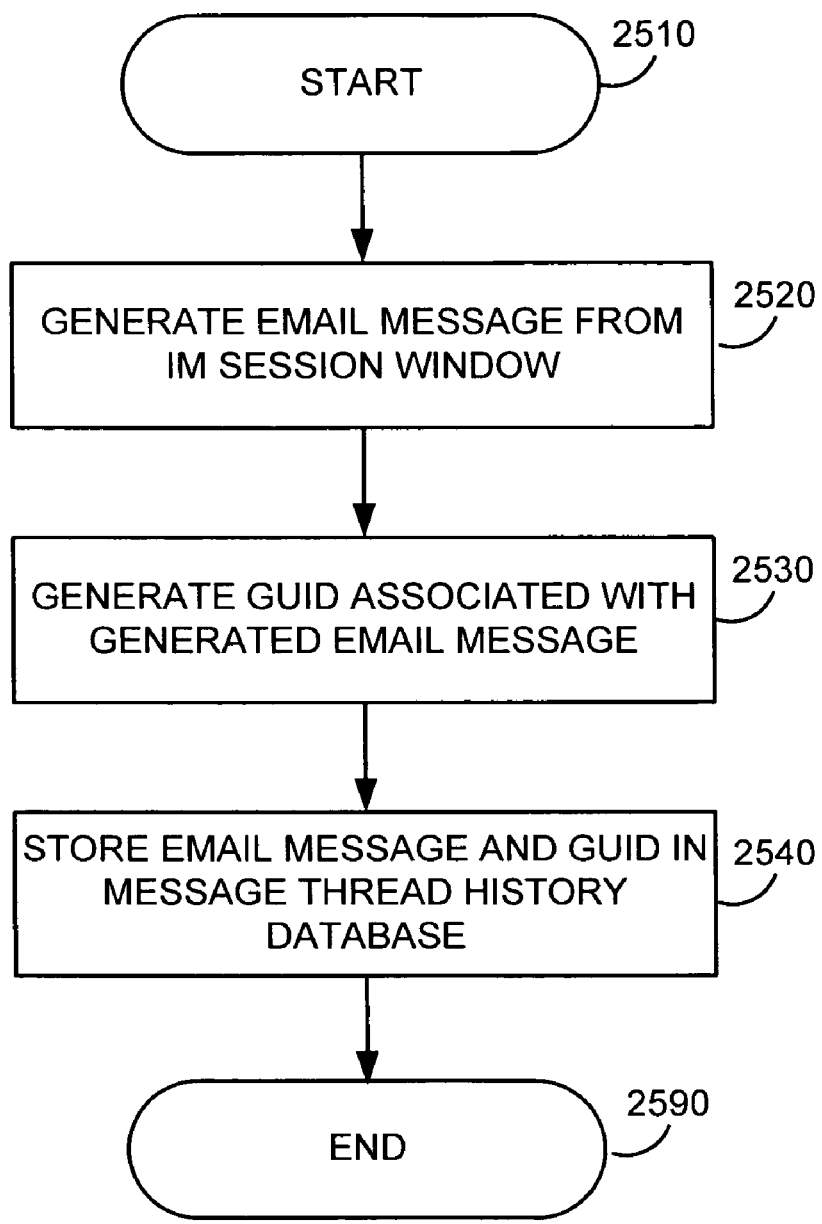
FIG. 25 is a flowchart showing one embodiment of a method for integrating email and IM services in which an email thread history is stored in a single thread history database.
Figure 26:
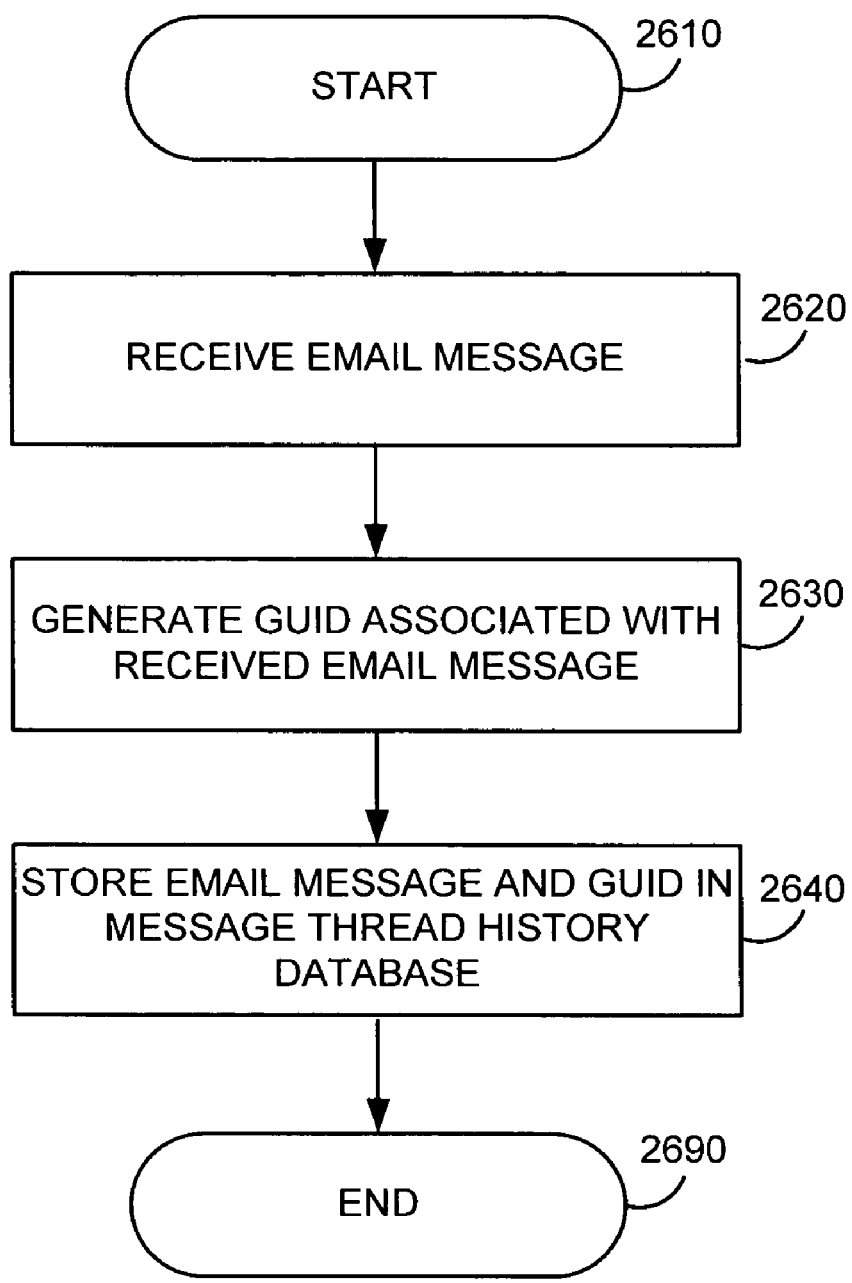
FIG. 26 is a flowchart showing one embodiment of a method for integrating email and IM services in which an email thread history is stored in a single thread history database.
Figure 27:
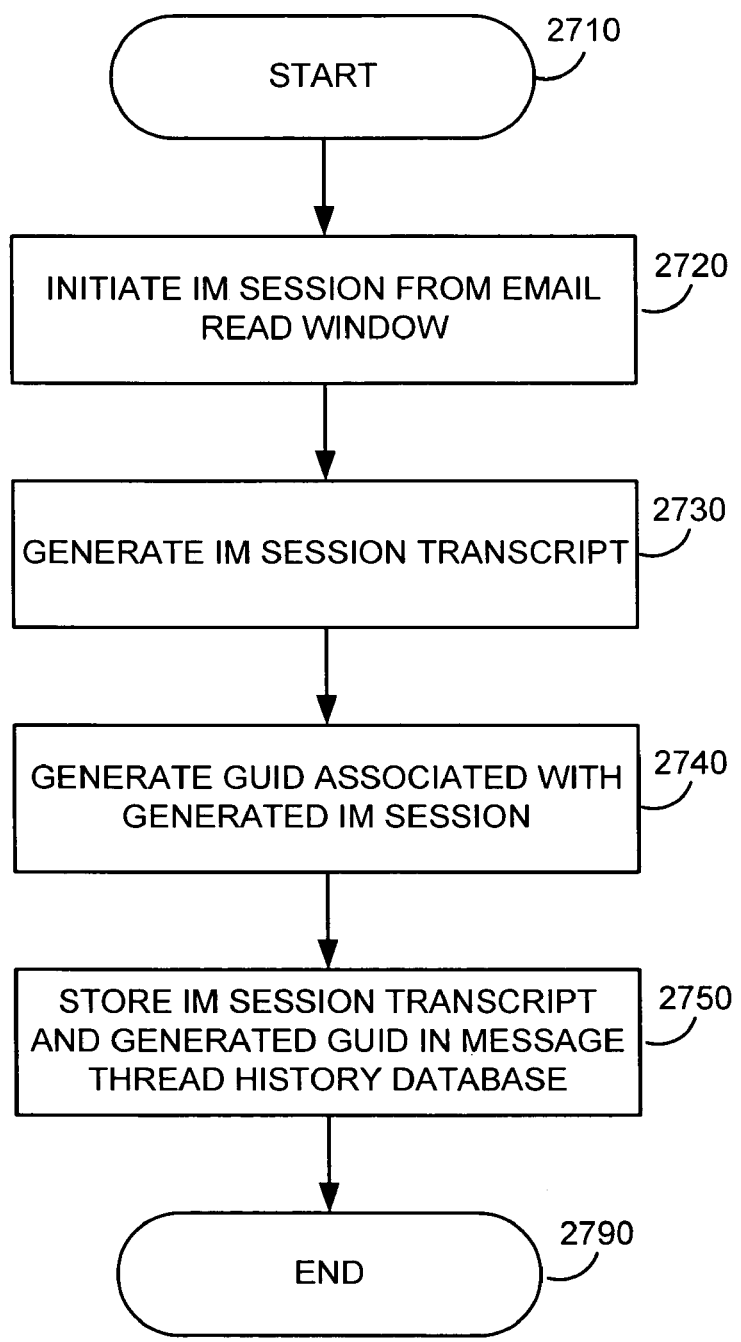
FIG. 27 is a flowchart showing one embodiment of a method for integrating email and IM services in which an IM thread history is stored in a single thread history database.

FIGS. 25 through 27 are flowcharts showing several embodiments of methods for integrating email and IM services in which email thread history and IM thread history are stored in a single thread history database. As shown in FIG. 25, one embodiment may be seen as comprising the generating (2520) of an email message from an IM session window. In addition to generating (2520) the email message from the IM session window, a globally unique identifier (GUID) associated with the generated email message is also generated (2530). Both the email message and the GUID are then stored (2540) in a message thread history database. Similarly, as shown in FIG. 26, when an email message is received (2620), a GUID associated with the received (2620) email message is generated (2630). The received (2620) email and the generated (2630) GUID are stored (2640) in the message thread history database. Also, when an IM session is initiated (2720) from an email read window, a session transcript is generated (2730). In addition to the session transcript, a GUID associated with the session transcript is also generated (2740). The IM session transcript and the GUID are stored (2750) in the thread history database. Thus, as shown in FIGS. 25 through 27, both IM and email thread histories may be stored in a single thread history database, thereby permitting a user to access any IM transcript or email message associated with a particular thread. In an example embodiment, the thread history database may be similar to the database shown in FIG. 16.

Figure 27A:
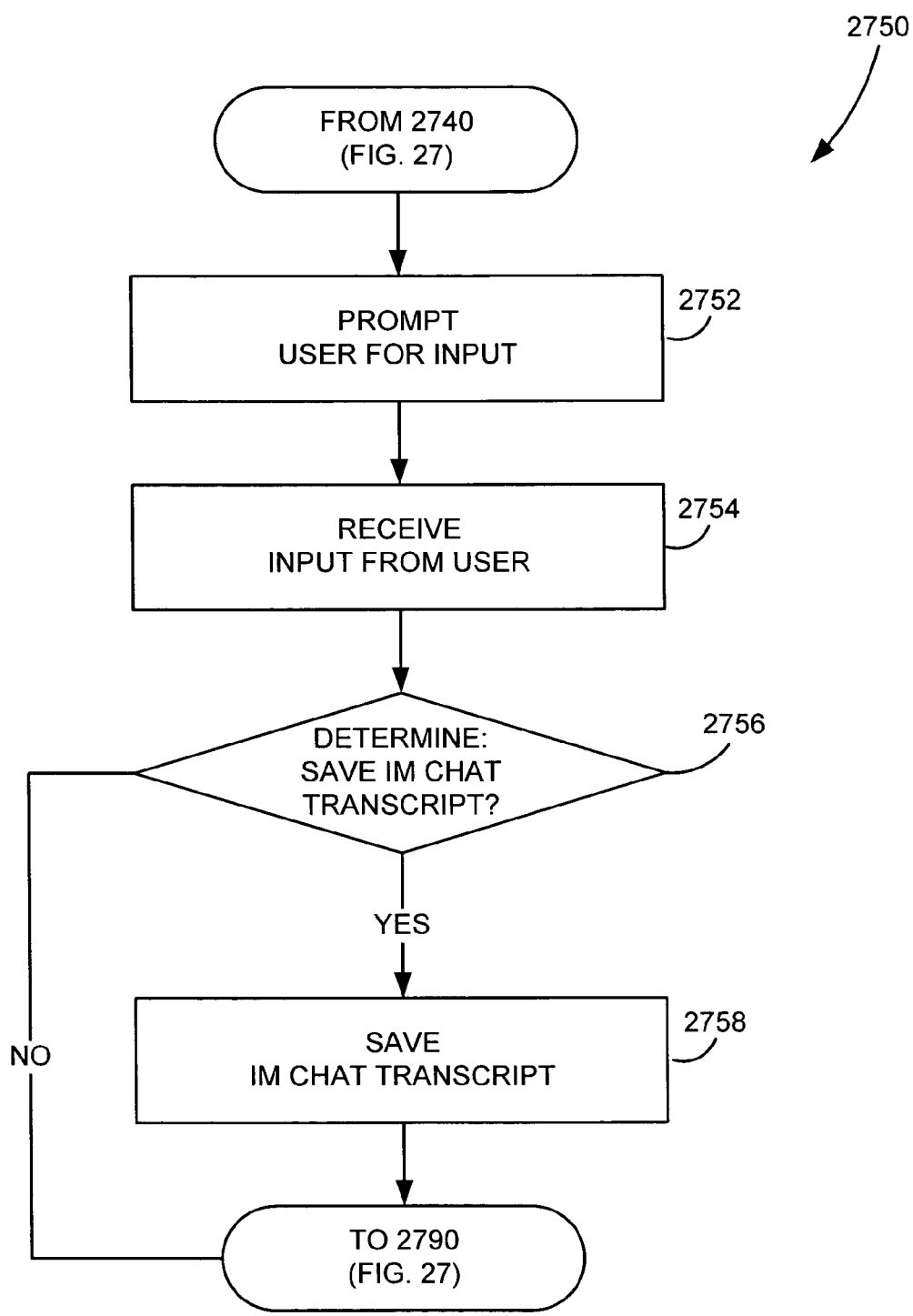
FIG. 27A is a flowchart showing an embodiment of the storing step of FIG. 27 in greater detail.

In another embodiment, the IM session transcript and GUID may be stored in response to user input. In another embodiment, the IM session transcript and GUID may be stored in response to user input. In this regard, the step of storing (2750) the IM session transcript may be seen as comprising the steps shown in FIG. 27A. As shown in FIG. 27A, a user may be prompted (2752) for input. In some embodiments, the prompt may be implemented as an alert window or a dialogue box that provides user-selectable options. For example, the dialogue box may prompt the user with the question "save IM chat transcript?" Along with the question, two user-selectable icons (e.g., "yes" and "no") may be provided to the user so that the user may indicate whether or not the IM chat transcript should be saved. When the system receives (2754) input from the user in response to the prompt, the system determines (2756) whether or not the IM chat transcript should be saved, based on the user's input. If the system determines that the IM chat transcript should not be saved, then the process ends 2790 (FIG. 27). Alternatively, if the system determines that the IM chat transcript should be saved, then the IM chat transcript is saved (2758) prior to ending the process.

For those embodiments that provide user-selectable icons, if the user selects the icon indicating that the IM chat transcript is to be saved, then the IM client saves (2758) the IM chat transcript with an appropriate link to the parent email message or IM chat message. In other words, if the IM chat session is a child of a parent message (email or IM), then the IM chat transcript is threaded to the parent message. In some embodiments, the IM chat transcript may be saved as a text file having a log of the events (e.g., text IM messages, file transfers, etc.) associated with the IM chat session. In this regard, the text file may be exported to other programs, such as Microsoft® Outlook. In other embodiments, the IM chat transcript may be converted to an email message and saved as an email message. By saving the IM chat transcript as an email message, the thread history may be directly exported to email programs, such as Microsoft® Outlook. Alternatively, if the user selects the icon indicating that the IM chat transcript is not to be saved, then the process ends 2790 (FIG. 27) without saving the IM chat transcript.

If the IM chat transcript has been saved, then the user may access the transcript through the hierarchical tree structure similar to that shown in FIG. 16.

FIGS. 28A through 28E are data flow diagrams corresponding to FIGS. 2A through 2C. In this regard, FIGS. 28A through 28E show the data flow subsequent to installation of software components. As shown in FIG. 28A, the tray manager 102 receives (2902) a selection of an email user interface 210 by the user. Upon receiving the selection of the email user interface 210, the tray manager 102 requests (2804) login names and passwords for all of the user's email and IM accounts from the login database 3050. The login names and passwords for all of the user's email and IM accounts is received (2806) by the tray manager 102 in response to the request (2804). The email login names and passwords are then conveyed (2808) by the tray manager 102 to the email user agent 106, which logs into (2810) each of the user's email accounts using the email login names and passwords. Upon logging into (2810) each of the user's email accounts, the email user agent 106 requests (2812) email messages from the email server 204. In response to the request (2812), the email user agent 106 receives (2814) the email messages from the email server 204. The process of retrieving email messages is described in greater detail with reference to FIGS. 30 and 31 and is, therefore, not discussed further here. Upon receiving (2814) the email messages, the email user agent 106 stores conveys the email messages to a mail store 206 for storing (2816).

In addition to retrieving email messages, a user interface is instantiated to display the retrieved email messages. This process is shown in FIG. 28B. As shown in FIG. 28B, the email user agent 104 generates a command to instantiate a user interface. The command is conveyed (2818) to the tray manager 102, which instantiates (2820) the email user interface 210. The email user interface 210 further instantiates (2822) a message center. Upon instantiating (2820) the email user interface 210 and the message center, the email user agent 106 issues a request (2824) to the mail store 206 for all of the stored email messages. The email messages are received (2826) by the email user agent 106 in response to the request. The email user agent 106 conveys (2828) the email messages to the tray manager 102, which, in turn, conveys (2830) the email messages to the email user interface 210 for display.

As shown in FIG. 28C, in a substantially parallel process as the retrieval of the email messages, the tray manager 102 conveys (2832) the IM login names and passwords to the IM user agent 104. The IM user agent 104 logs into (2834) each of the user's IM accounts using the received IM login names and passwords. Upon logging into (2834) each of the IM accounts, the IM user agent obtains (2836) the IM Internet presence information for each of the IM contacts as described in U.S. provisional patent application Ser. Nos. 60/411,336 and 60/419,613, and U.S. patent application Ser. Nos. 10/274, 408, 10/274,478, and 10/274,405.

Thus, as shown in FIGS. 28A through 28C, if the user chooses to launch the email user interface 210, then all of the user's email messages from all of the user's email accounts is displayed to the user by launching the tray manager 102. Additionally, all of the user's contacts' IM Internet presence information is retrieved by the launching of the tray manager 102.

Figure 29D:
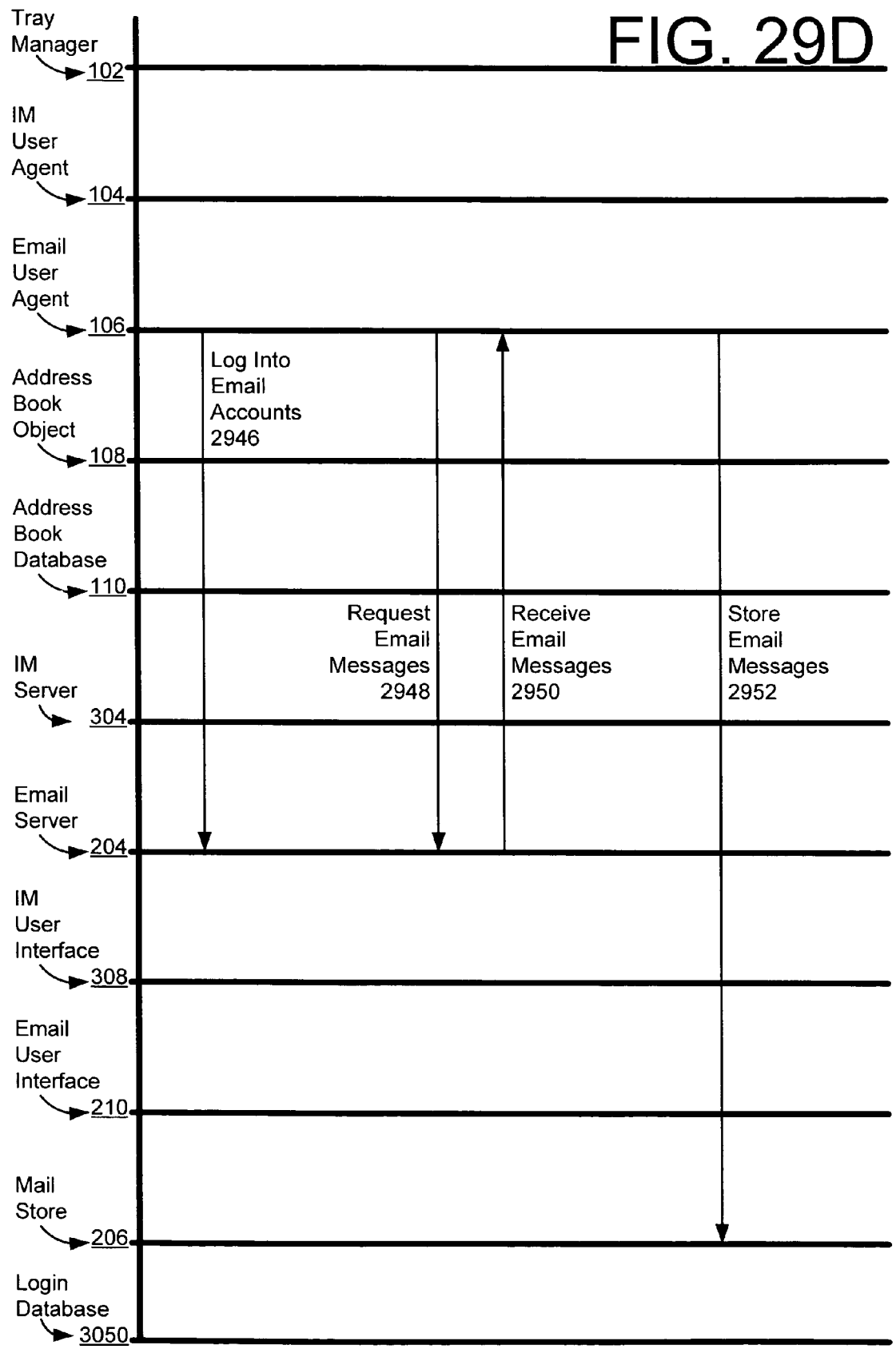

FIGS. 29A through 29E are data flow diagrams corresponding to FIGS. 3A through 3C. In this regard, FIGS. 29A through 29E show the data flow subsequent to installation of software components. As shown in FIG. 29A, the tray manager 102 receives (2902) the selection of the IM user interface. Upon receiving (2902) the selection, the tray manager 102 instantiates (2904) the IM user interface 308. The IM user interface 308 queries (2906) the user for a login name and password. Thus, unlike the selection of the email user interface 210 in FIGS. 28A through 28C, the selection of the IM user interface 308, in this embodiment, results in user input of a login name and password. The IM user interface 308 receives (2908) the login name and password entered by the user and conveys (2910) the login name and password to the IM user agent 104. The IM user agent 104 looks up (2912) the login database 3050 to determine whether or the login name and password are in the login database 3050. If the login name and password are in the login database 3050, then the IM user agent 104 receives (2914) a confirmation that the login name and password are valid. Upon receiving the confirmation, the IM user agent 104 issues a request (2916) to the login database 3050 for all IM login names and passwords. The IM login names and passwords are received (2918) in response to the request (2916).

As shown in FIG. 29B, upon receiving (2918) all of the IM login names and passwords, the IM user agent logs into (2920) each of the user's IM accounts through the IM server 304 using the IM login names and passwords. Since the login process is discussed in detail in U.S. provisional patent application Ser. Nos. 60/411,336 and 60/419,613, and U.S. patent application Ser. Nos. 10/274,408, 10/274,478, and 10/274, 405, further discussion of the login process is omitted here. Upon logging into (2920) the IM accounts through the IM server 304, the IM user agent 104 obtains (2922) the IM Internet presence information for each of the user's contacts from the IM server 304. Upon obtaining (2922) the IM Internet presence information, the IM user agent 104 issues (2924) a command to the tray manager 102 to display the IM Internet presence information for all of the user's contacts. In response to the command, the tray manager 102 issues a request (2926) to the IM user interface 308 to instantiate a roster window. The IM user interface 308 instantiates (2928) the roster window in response to the issued request by the tray manager 102. Upon instantiation (2928) of the roster window, the IM user agent 104 conveys (2930) the IM Internet presence information to the tray manager 102, which, in turn, conveys (2932) the IM Internet presence information to the roster window through the IM user interface 308. The IM Internet presence information is subsequently displayed to the user at the roster window.

As shown in FIG. 29C, in a substantially parallel process as the retrieval of the IM Internet presence information, the IM user agent 104 conveys (2934) the login name and password to the tray manager 102, which, in turn, conveys (2936) the login name and password to the email user agent 106. The email user agent 106 issues (2942) a request to the login database 3050 for all of the email login names and passwords for all of the user's email accounts. In response to the request (2942), the email user agent 106 receives (2944) the email login names and passwords from the login database 3050.

Continuing with FIG. 29D, the email user agent 106 logs into (2946) each of the user's email accounts using the email login names and passwords. The process of logging into each of the user's email accounts is shown in greater detail with reference to FIGS. 30 and 31. Upon logging into (2946) each of the email accounts, the email user agent 106 issues a request (2948) for all of the email messages at the various email accounts. The email messages are received (2950) by the email user agent 106 in response to the request (2948). Upon receiving (2950) the email messages, the email user agent 106 conveys the email messages to the mail store 206, which stores (2952) the email messages.

Thus, as shown in FIGS. 29A through 29D, if the user chooses to launch the IM user interface 308, all of the user's contacts' IM Internet presence information is retrieved and displayed to the user by inputting a single user name and password. Additionally, all of the user's email messages from all of the user's email accounts is retrieved by the inputting of the single user name and password.

Figure 30:
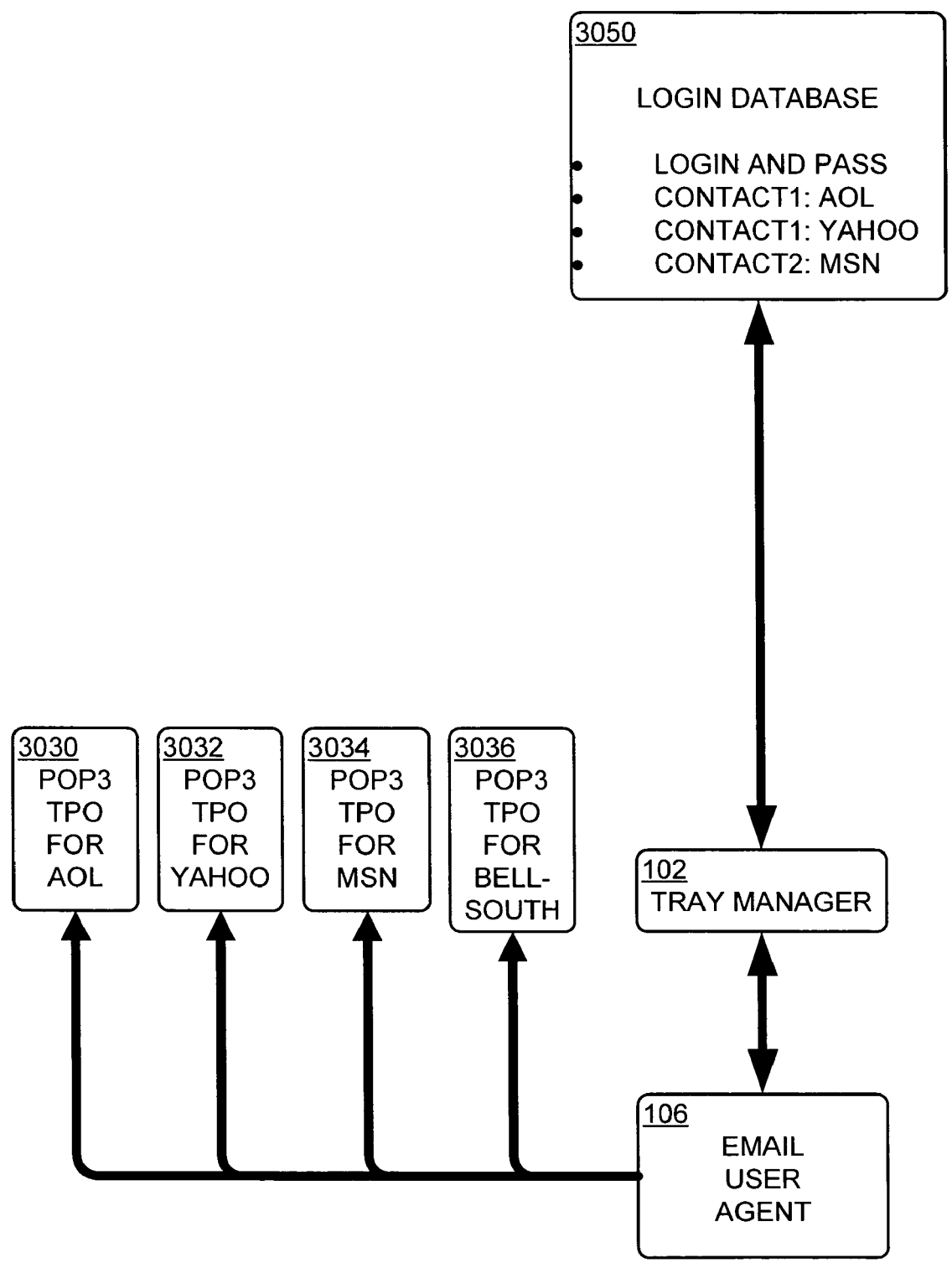
FIG. 30 is a block diagram showing one embodiment of an email user agent instantiating a plurality of post office protocol version 3 (POP3) transport protocol objects (TPOs).
Figure 31:
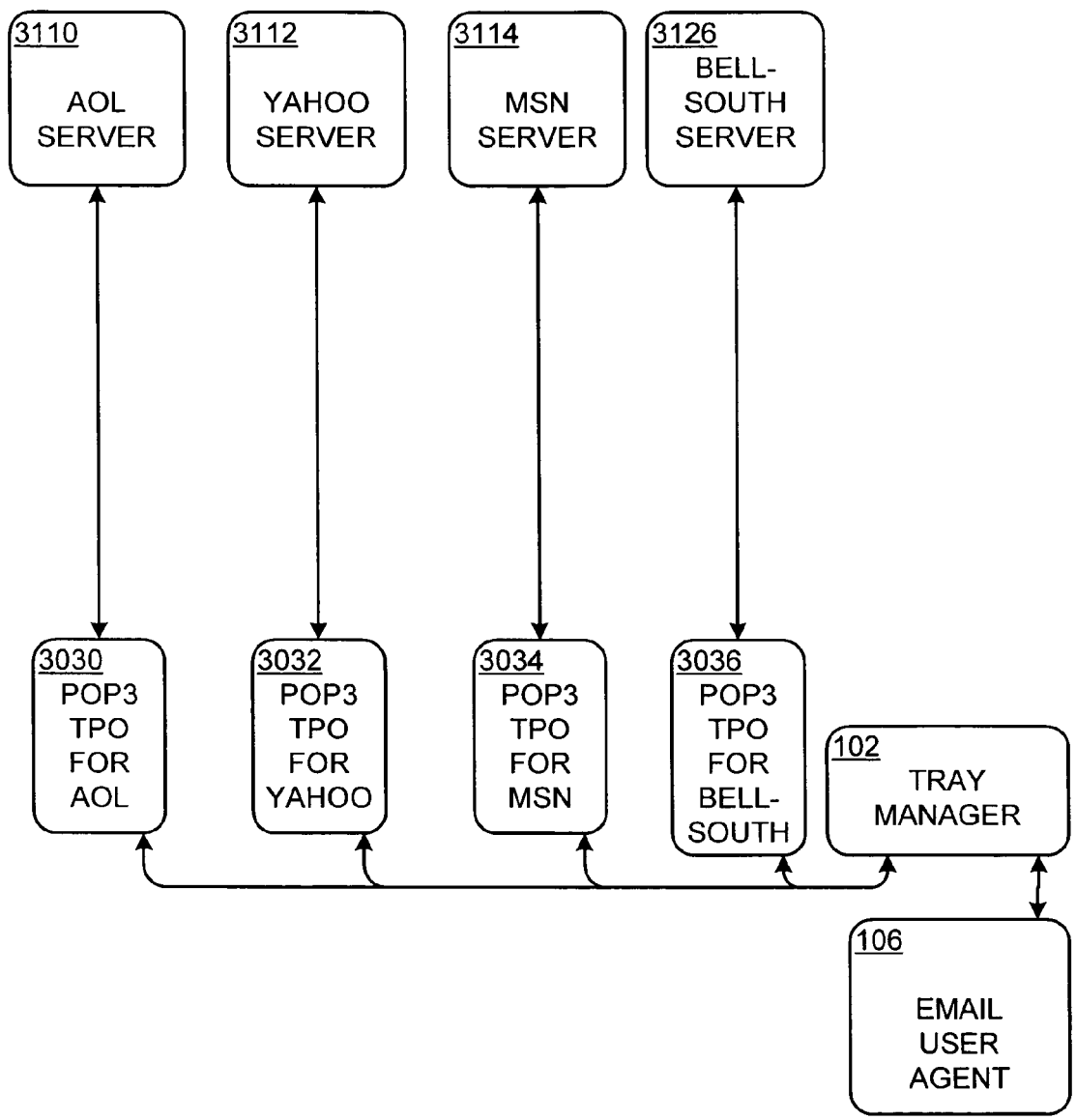
FIG. 31 is a block diagram showing one embodiment of an email user agent communicating with a plurality of email servers through the plurality of POP3 TPOs.

FIGS. 30 and 31 show an example email login process in which a specific user may log into several email accounts to retrieve email messages. In this regard, FIGS. 30 and 31 show email components that correspond to the IM components shown in U.S. provisional patent application Ser. Nos. 60/411,336 and 60/419,613, and U.S. patent application Ser. Nos. 10/274,408, 10/274,478, and 10/274,405. While the embodiments of FIGS. 30 and 31 refer to specific Internet service providers (e.g., Yahoo, Microsoft Network (MSN), America On-Line (AOL), BellSouth, etc.), it should be understood that these specific references are provided for purposes of clarity, and are not intended to limit the invention to the specifically provided examples. Since similar transport mechanisms are described in U.S. provisional patent application serial numbers 60/411,336 and 60/419,613, and U.S. patent application Ser. Nos. 10/274,408, 10/274,478, and 10/274,405, only a truncated discussion of email transport mechanisms is presented with reference to FIGS. 30 and 31.

As shown in an example embodiment in FIG. 30, after a setup process, a tray manager 102 accesses a login database 3050 to retrieve login names and passwords for each email account belonging to a user. The example of FIG. 30 shows the user as having post office protocol version 3 (POP3) email accounts on AOL, Yahoo, MSN, and BellSouth. Since POP3 is known in the art, further discussion of POP3 is omitted here. Upon retrieving the login names and passwords, the tray manager 102 generates a request to the email user agent 106, which includes information for instantiating one or more transport protocol objects (TPOs). Each of the TPOs is configured to provide an interface to each of the user's POP3 email accounts. Thus, in response to the request, the email user agent 106 instantiates POP3 TPOs 3030, 3032, 3034, 3036 for the user's AOL email account, Yahoo email account, MSN email account, and BellSouth email account. Other embodiments may include transport mechanisms launched or activated in other manners.

FIG. 31 is a block diagram showing one embodiment in which instantiated POP3 TPOs 3030, 3032, 3034, 3036 log into their respective email servers 3110, 3112, 3114, 3126 to retrieve email messages from the various email servers 3110, 3112, 3114, 3126. Upon being instantiated, each of the POP3 TPOs 3030, 3032, 3034, 3036 receives the login names and passwords for their respective email server 3110, 3112, 3114, 3126, thereby permitting the POP3 TPOs 3030, 3032, 3034, 3036 to log into the user's email accounts at their respective servers 3110, 3112, 3114, 3126. Upon logging into each of the email accounts at the various email servers 3110, 3112, 3114, 3126, each of the POP3 TPOs 3030, 3032, 3034, 3036 retrieves email messages from its respective server 3110, 3112, 3114, 3126. In this regard, for example, the AOL POP3 TPO 3030 retrieves email messages from the AOL server 3110; the Yahoo POP3 TPO 3032 retrieves email messages from the Yahoo server 3112, etc. The retrieved email messages are conveyed to the tray manager 102, which, in turn, conveys the email messages to the email user agent 106. Since the email messages are directed through different POP3 TPOs 3030, 3032, 3034, 3036, each email message may be sorted by the email user agent 106 according to its originating email account (e.g., AOL email account, Yahoo email account, MSN email account, BellSouth email account, etc.). Consequently, when the user chooses to reply to a received email message, the email user agent 106, in one embodiment, may direct the reply email message through the same POP3 TPO through which the email message was received. In other words, the reply to an email message uses the same email account from which the email message was received. Thus, for example, if the email user agent 106 receives an email message through the user's AOL email account, then the reply to that email message, in one embodiment, would be directed to the recipient through the user's AOL account. Similarly, if an email message is received through the user's BellSouth email account, then the reply to that email message would be directed to the recipient through the user's BellSouth email account.

The address book object 108, the email user agent 106, the IM user agent 104, the tray manager 102, and other objects instantiated by these components may be implemented in hardware, software, firmware, or a combination thereof. In the preferred embodiment(s), the address book object 108, the email user agent 106, the IM user agent 104, the tray manager 102, and other objects instantiated by these components is implemented in software or firmware that is stored in a memory and that is executed by a suitable instruction execution system. If implemented in hardware, as in an alternative embodiment, the address book object 108, the email user agent 106, the IM user agent 104, the tray manager 102, and other objects instantiated by these components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 32:
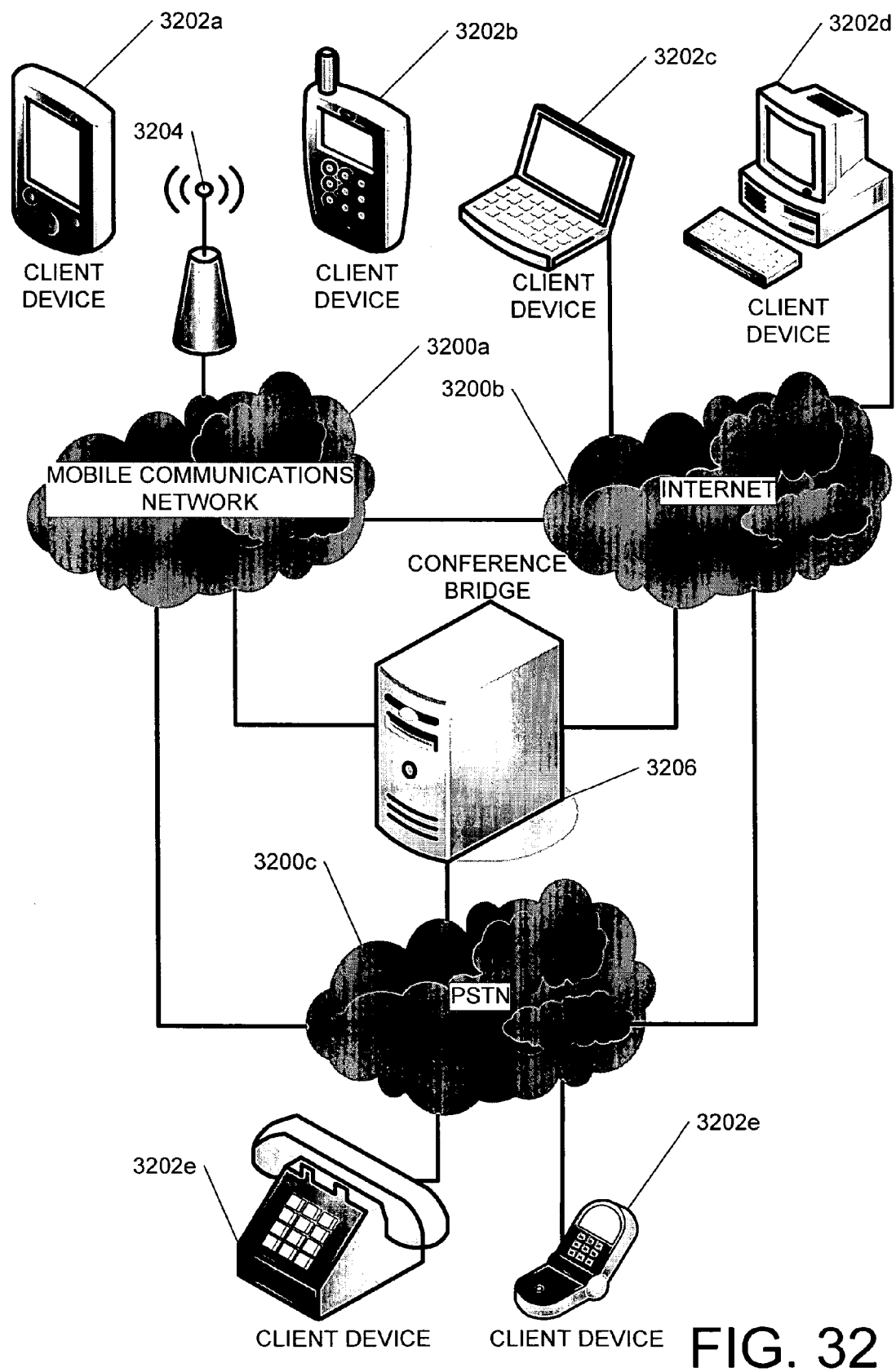
FIG. 32 is a functional diagram of an exemplary network configuration.

FIG. 32 is a functional diagram of an exemplary network configuration. As illustrated, any of a plurality of client devices 3202 can be coupled together via any of a plurality of communications networks 3200. As a nonlimiting example, mobile communications client devices 3202a and 3202b can be coupled to a mobile communications network 3200a via wireless access point 3204. Similarly, Internet client devices 3202c and 3202d can be coupled to Internet 3200b. PSTN compatible client devices 3202e and 3202f can be coupled to PSTN 3200c.

Additionally, conference bridge 3206 can further facilitate a conference call between two or more of the client devices 3202. One should note that while the conference bridge 3206 is illustrated as being coupled to each of the communications networks 3200, this is but a nonlimiting example. As one of ordinary skill in the art will understand, other configurations can provide that a conference bridge 3206 is coupled to a communications network as the client devices 3202 are coupled to a communications network 3200. In such a scenario, access to the conference bridge can occur in a similar manner as if the bridge is a client device 3202 capable of receiving simultaneous communications between multiple other client devices.

One should note that the network configuration of FIG. 32 illustrates one embodiment of a configuration for facilitating communication between users. While embodiments described above discuss email and instant messaging, these are nonlimiting examples. Other communications mediums can also be utilized to facilitate communication between users, including, but not limited to email communications, instant messaging communications, telephone conversations, voice over Internet Protocol (VoIP) communications, web conferences, etc. (or any permutation of these).

Additionally, one should note that while the client devices 3202 are illustrated as communicating via a specific communications network, this is a nonlimiting example. The devices illustrated can be configured to communicate via one or more of the communications networks 3200. Similarly, other communications that are not illustrated in FIG. 32 can also be considered as being included in this disclosure.

Figure 33:
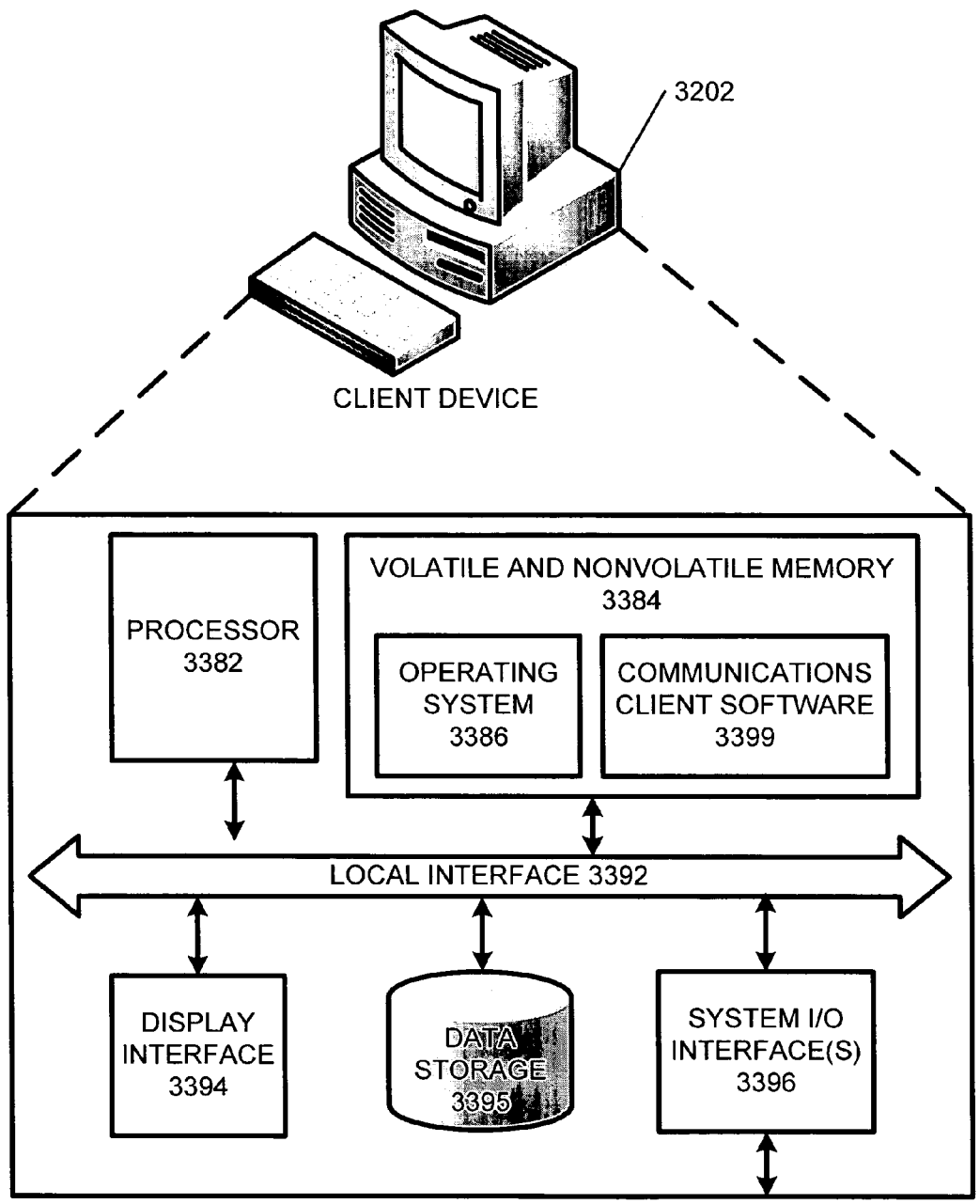
FIG. 33 is a functional diagram illustrating an exemplary embodiment of a client device that may be configured to communicate via a communications network such as the networks from FIG. 32.

FIG. 33 is a functional diagram illustrating an exemplary embodiment of a client device that may be configured to communicate via a communications network such as the networks from FIG. 32. Although a wire-line client device is illustrated, this discussion can be applied to any device. According to an exemplary embodiment, in terms of hardware architecture, as shown in FIG. 33, the client device 3202 includes a processor 3382, volatile and nonvolatile memory 3384, a display interface 3394, data storage 3395, and one or more input and/or output (I/O) device interface(s) 3396 that are communicatively coupled via a local interface 3392. The local interface 3392 can include, for example but not limited to, one or more buses or other wired or wireless connections. The local interface 3392 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 3382 may be a hardware device for executing software, particularly software stored in volatile and nonvolatile memory 3384.

The processor 3382 can be any custom made or commercially available processor, a central processing unit (CPU), an auxiliary processor among several processors associated with the client device 3202, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 3384 can include any one or combination of volatile memory elements (e.g., random access memory (RAM, such as DRAM, SRAM, SDRAM, etc.)) and nonvolatile memory elements (e.g., ROM, hard drive, tape, CD-ROM, etc.). Moreover, the memory 3384 may incorporate electronic, magnetic, optical, and/or other types of storage media. Note that the volatile and nonvolatile memory 3384 can have a distributed architecture, where various components are situated remote from one another, but can be accessed by the processor 3382.

The software in volatile and nonvolatile memory 3384 may include one or more separate programs, each of which includes an ordered listing of executable instructions for implementing logical functions. In the example of FIG. 33, the software in the volatile and nonvolatile memory 3384 may include communications client software 3399, as well as an operating system 3386. Communications client software 3399 can include instant messaging logic, email logic, VoIP logic, web conferencing logic, etc. Additionally, while communications client software is illustrated in this nonlimiting example as a single piece of logic, as one of ordinary skill in the art will understand, communications logic 3399 can include one or more separate software or hardware modules.

A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system 3386 essentially controls the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 3384, so as to operate properly in connection with the Operating System 3386.

The Input/Output devices that may be coupled to system I/O Interface(s) 3396 may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device 3202 is a personal computer, workstation, or the like, the software in the volatile and nonvolatile memory 3384 may further include a basic input output system (BIOS) (omitted for simplicity). The BIOS is a set of software routines that initialize and test hardware at startup, start the Operating System 3386, and support the transfer of data among the hardware devices. The BIOS is stored in ROM so that the BIOS can be executed when the client device 3202 is activated.

When the client device 3202 is in operation, the processor 3382 is configured to execute software stored within the volatile and nonvolatile memory 3384, to communicate data to and from the volatile and nonvolatile memory 3384, and to generally control operations of the client device 3202 pursuant to the software. Software in memory, in whole or in part, is read by the processor 3382, perhaps buffered within the processor 3382, and then executed.

Figure 34:
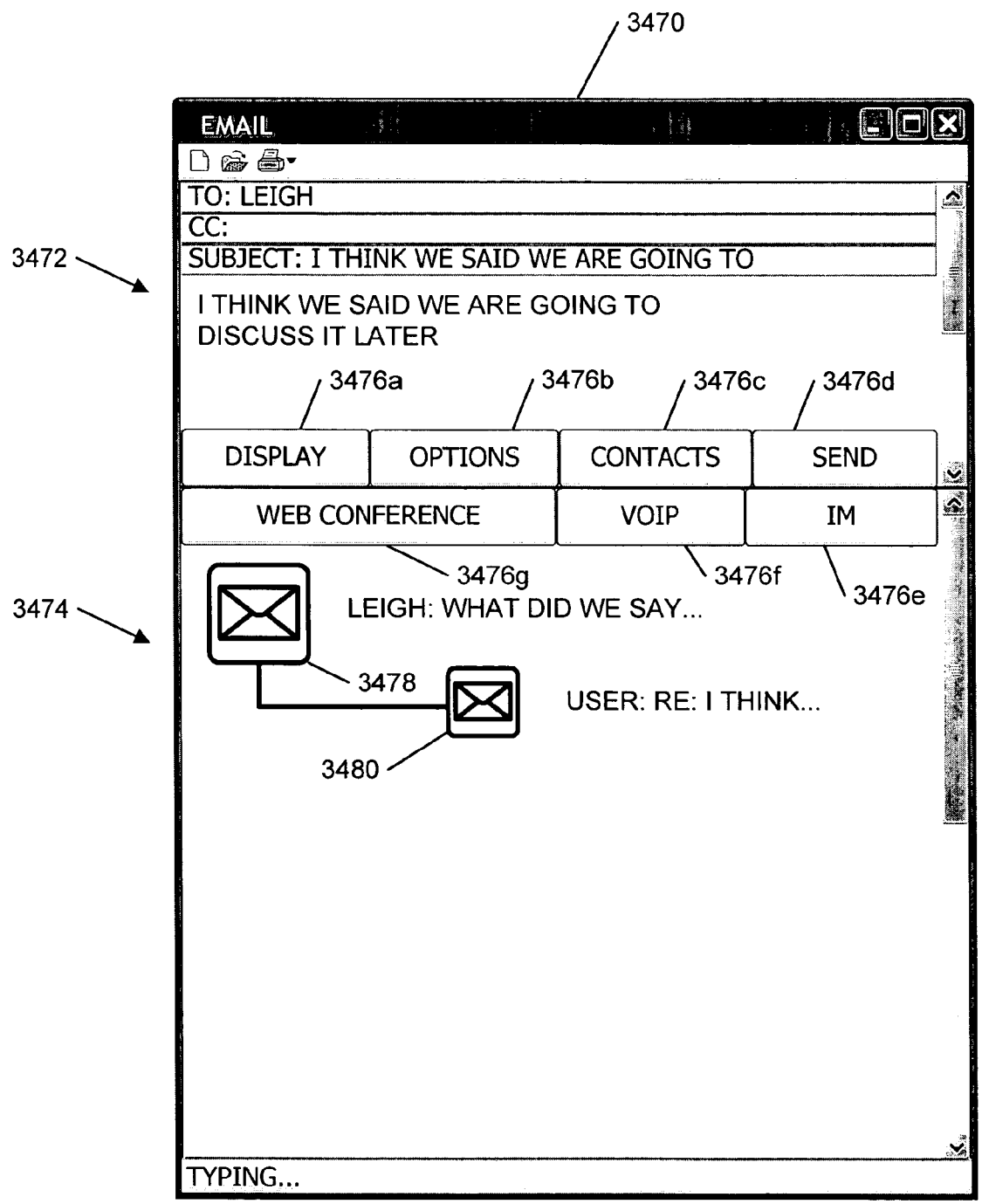
FIG. 34 is an exemplary display of an email user interface such as the email user interface from FIG. 7.

FIG. 34 is an exemplary display of an email user interface such as the email user interface from FIG. 7. According to one exemplary embodiment, the email user interface 3470 can include a text window 3472 for a user to input text for an email. The text window 3472 can include a "to" line, a "cc" line, a "subject" line, and a "bcc" line (not shown). Additionally, the user can enter the desired message in the text window 3472. Also included in the email user interface of FIG. 34 are options 3476*a*-3476*g*. Display option 3476*a* is a display option for providing the user with additional options related to the display of the email user interface and emails, themselves. Additionally, "options" option 3476*b* can provide a user with options related to the operation of the email agent.

Contacts option 3476c can provide the user with access to one or more or the user's contacts. The SEND option 3476d can facilitate easy access to contact information for sending emails, (or other communications) or otherwise viewing contact information related to one or more of the user's contacts.

Additionally included in the email user interface 3470 is an IM option 3476e, which can provide the user with the ability to launch an instant messaging communication to the recipient(s) of the current email. More specifically, the email thread illustrated in communications thread window 3474 illustrates that a first message in this communications thread was sent to the user by Leigh, as shown with email icon and text 3478. The user is now replying to that received message via the email user agent, as illustrated with email icon 3480 and associated title. If the user instead desires to send an instant message, the user can select the IM option 3476e to launch an instant messaging agent. The user can then begin an instant messaging session with Leigh, and the IM communication can be included in the displayed communications thread.

Similarly, by selecting VOIP option 3476f, the user can launch a Voice over IP communications session with Leigh that can be included in the current communications thread. If the user selects the web conference option 3476g, a web conference can be launched (or joined), and information from this communication can be included in the current communications thread.

One should note that, by selecting any of the icons in the communications thread window 3474, the user can view data related to that particular communication. More specifically, by selecting the email icon 3478, the user can view the received message related to that icon. If there is other data or files that are associated with that email (such as attachments, etc.) the user can also access that data as well.

Figure 35:
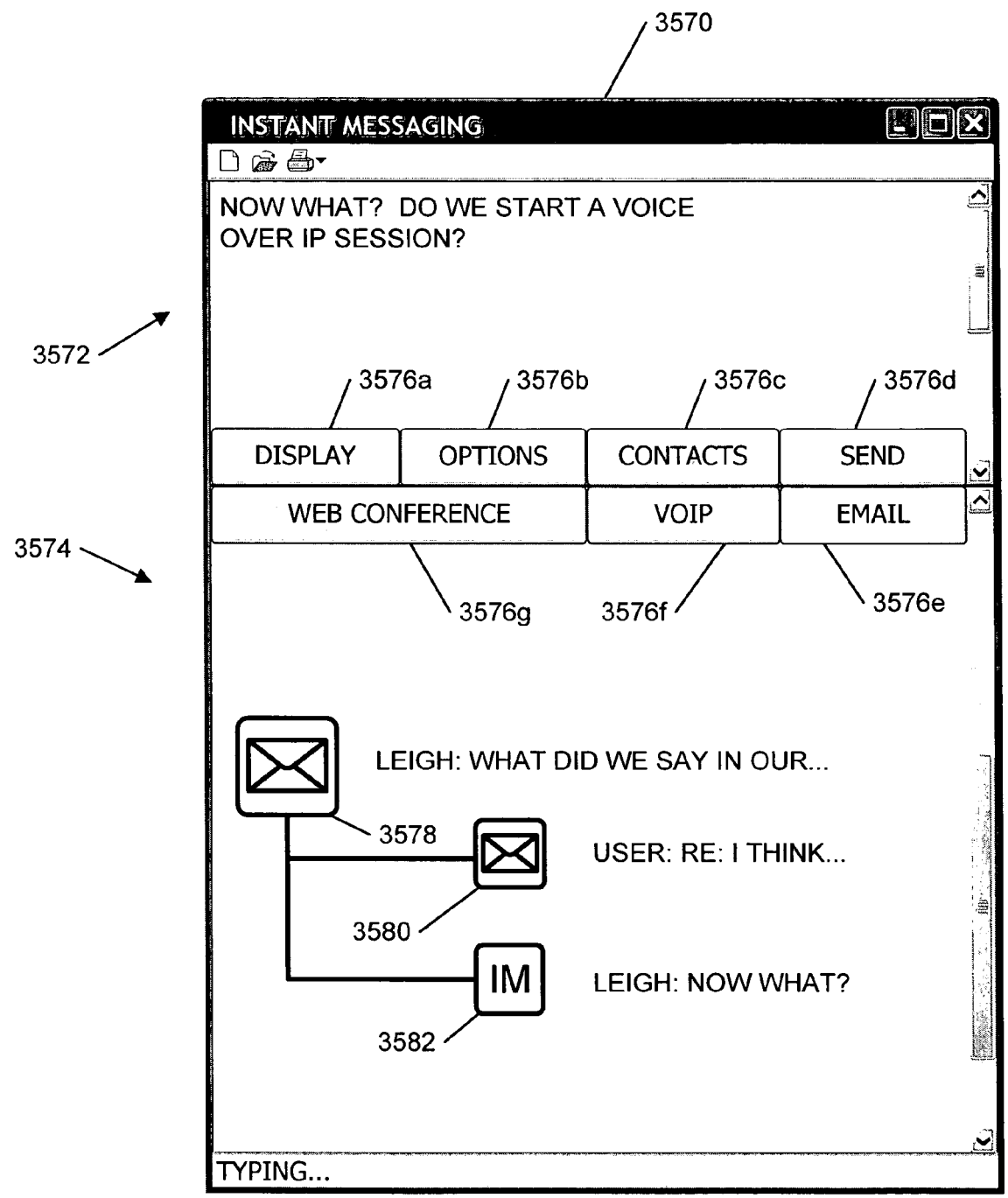
FIG. 35 is an exemplary display of an instant messaging interface, similar to the email interface from FIG. 34.

FIG. 35 is an exemplary display of an instant messaging interface, similar to the email interface from FIG. 34. According to one exemplary embodiment, this instant messaging interface 3570 has facilitated an instant messaging session from the email received from Leigh, entitled "I think we said we are going to . . . " (FIG. 34). In this nonlimiting example, Leigh has selected an IM option, similar to the IM option 3476, from FIG. 34 and sent an instant message to the user. The user's instant messaging agent can receive the message (depending on the presence status of the user), and can launch user's instant messaging user interface 3570. The user's instant messaging user interface 3570 can include a text window 3572, which can be configured for receiving instant messages, and for inputting instant messages to be sent to other users. Additionally included in the instant messaging user interface 3570 is a communications thread window 3574, which includes the communications thread from FIG. 33, with the addition of the received instant message, illustrated with IM icon 3582.

Additionally included in the instant messaging user interface 3570 are options 3576a-3576g. Similar to the options from the email user interface 3470, the options 3576 include a display option 3576a, an options option 3576b, a contacts option 3576c, and a send option 3576d. Also included are an email option 3576e, a VOIP option 3576f, and a web conference option 3576g. As discussed above, the email option 3576e, VOIP option 3576f, and web conference option 3576g can facilitate the launch of a new communication, while still maintaining the current communications thread.

One should note that by selecting an icon (3578, 3580, or 3582, or any permutation) in communications thread 3574, the user can be provided with data related with that communication. More specifically, if the user selects the IM icon 3582, the user can be provided with a transcript of that instant messaging session. Additionally, if other data (such as attachments, etc.) are included in that communication, the user can also be provided with access to that data.

Figure 36:
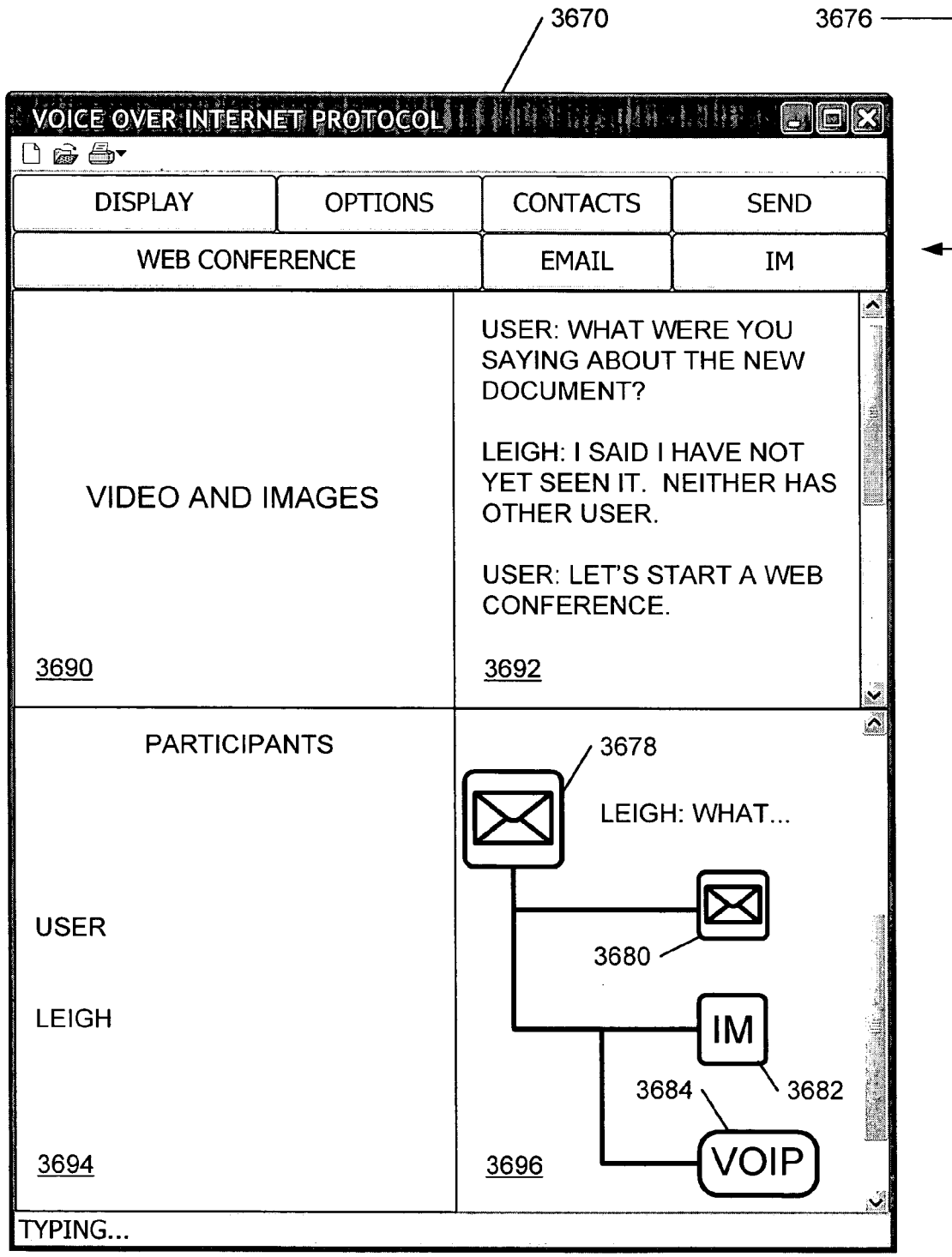
FIG. 36 is an exemplary display of a Voice over Internet Protocol user interface, similar to the email user interface from FIG. 34.

FIG. 36 is an exemplary display of a Voice over Internet Protocol user interface, similar to the email user interface from FIG. 34. According to one exemplary embodiment, the VoIP user interface 3670 includes options 3676, similar to those from FIGS. 34 and 35. Also included in the VoIP user interface is a video and images window 3690, a transcript window 3692, a participants window 3694 and a communications thread window 3696. While a VoIP communication session can include an audio (or voice) communication between users, at least one embodiment can also include communication of video or images (or both) in addition to the audio communication. In such a scenario, the video and images window 3690 can display the received data. Additionally, if the current communication does not include communication of video or images, logic associated with the user's VoIP user interface 3670 can be configured to retrieve an image (or video) for display in window 3690. The image or video displayed can be related to the other participant of the VoIP communication, or may be one or more images selected by the user.

Also included in the VoIP user interface 3670 is a transcript window 3692. The transcript window can include communication dialog exchanged between the participants in the communications session (in this nonlimiting example, user and Leigh), and can display this data as text. In at least one embodiment, the VoIP agent can be configured to convert the voice communications to text via voice-to-text logic. Other embodiments can simply record the audio (or video or both) and store the data as received.

The participants window 3694 can include each participant in the current communications session, and if desired, information related to that participant. As a nonlimiting example, if the user has information stored (or has access to information) that relates to Leigh, the participants window 3694 can display at least a portion of that information. Such information can include address, email address, birthday, height, weight, likes, dislikes, pictures, etc.

Additionally included in the VoIP user interface 3670 is a communications thread window 3696 that can display the current communications thread. Although the communications thread window 3696 in FIG. 36 currently displays only a portion of the current communications thread, as one of ordinary skill in the art will understand, the user can have the ability to scroll the communications thread window up or down to view the entire thread.

As stated above, by selecting any of the icons in the communications thread window 3696, the user can access information related to that communication. More specifically, if the user selects the VoIP icon 3684, the user can be provided with a transcript of that communication. While some embodiments can include providing the user with a speech-to-text converted transcript, other embodiments can provide the user with an audio file that includes the recorded dialog. Also available to the user are images, video, and other data that are associated with the communication, participants, etc.

Figure 37:
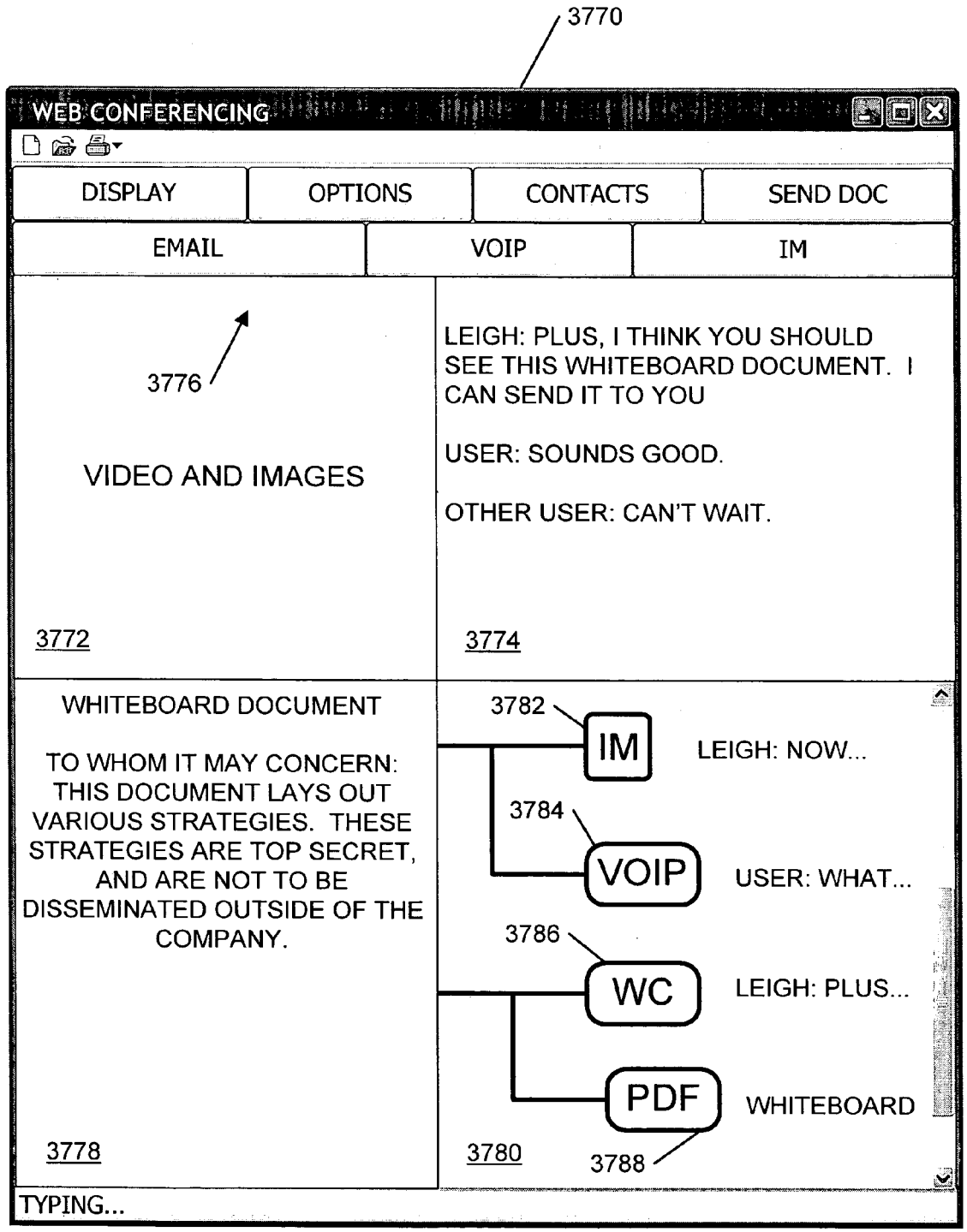
FIG. 37 is an exemplary display of a web conferencing user interface, similar to the email user interface from FIG. 34.

FIG. 37 is an exemplary display of a web conferencing user interface, similar to the email user interface from FIG. 35. According to one exemplary embodiment, the web conferencing user interface 3770 can include options 3776, similar to the options from FIGS. 34-36. Additionally included in the web conferencing user interface 3770 is a video and images window 3772, which can facilitate display of video and images that are associated with the current web conference or participants. Also included in the web conferencing user interface 3770 is a transcript window 3774. As with the transcript window 3674 from FIG. 36, the transcript window 3774 from FIG. 37 can include a voice-to-text converted transcript of the current communication. Other embodiments can include providing the user with access to an audio file transcript of the desired communication.

Additionally included in the web conferencing user interface 3770 is a received document window 3778. The received data window 3778 can be configured to display data that is received during the web conference. More specifically, in this nonlimiting example, the user has received a PDF document entitled "Whiteboard" during the current web conference, as indicated with PDF icon 3788. The contents of that document can be displayed in the received data window 3778. Upon receiving the document, (or upon selection of the PDF icon 3788), the web conferencing user interface 3770 can display at least a portion of the document in the received data window 3778.

Also included in the web conferencing user interface 3770 is a communications thread window 3780. As discussed above, the communications thread window 3780 can include various communications associated with the communications thread. More specifically, in this particular nonlimiting example, the current web conference is denoted with the WC icon 3786. Similarly, as discussed above, a PDF document is included in that communication, as denoted with PDF icon 3788.

Figure 38:
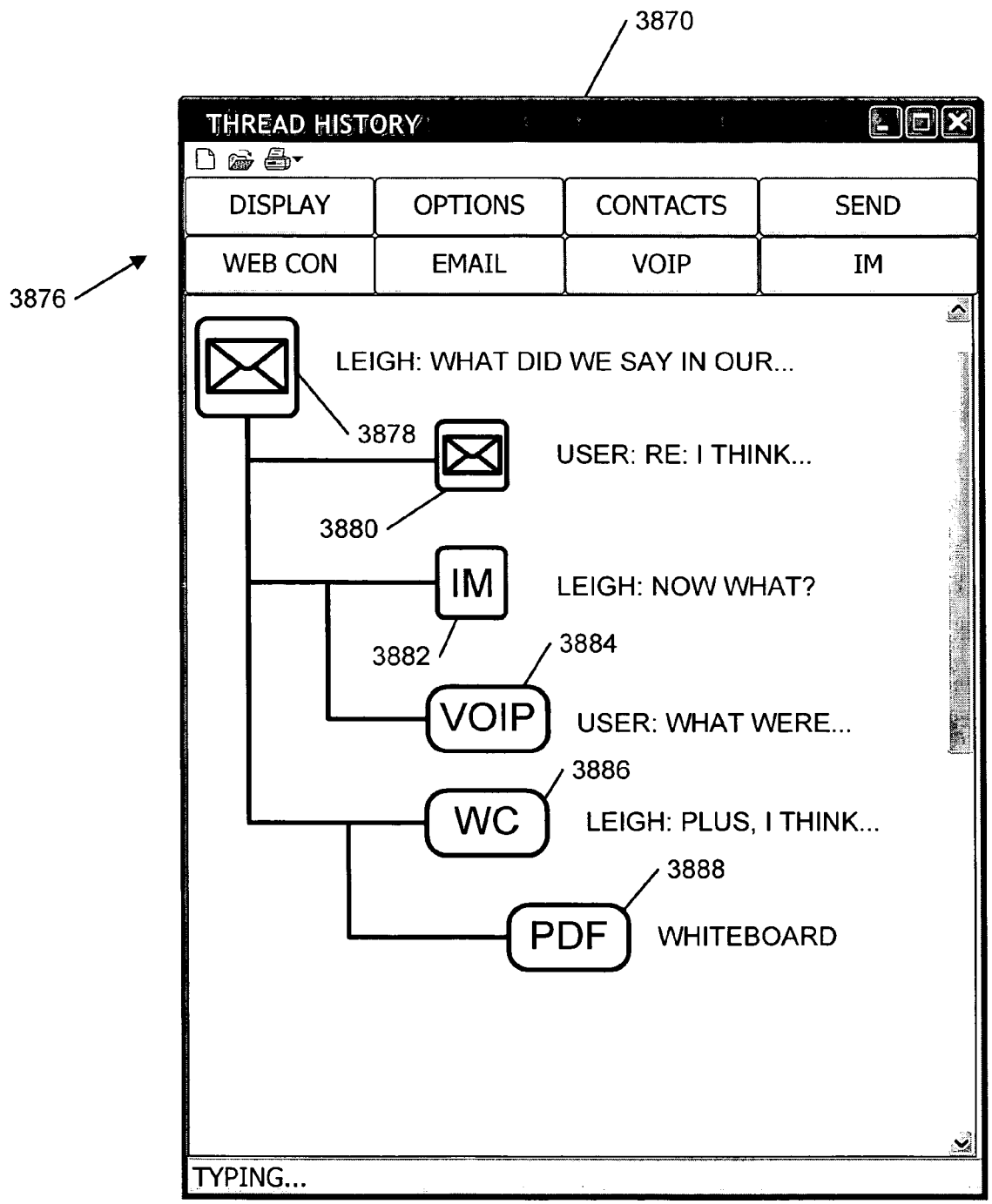
FIG. 38 is an exemplary display of a thread window, illustrating a communications thread, similar to the communications thread illustrated in FIG. 37.

FIG. 38 is an exemplary display of a thread window, illustrating a communications thread, similar to the communications thread illustrated in FIG. 37. According to one exemplary embodiment, the thread window 3870 can be accessed from any of the user interfaces illustrated in FIGS. 34-37, and can provide a more detailed display of the current communications thread. As illustrated, the thread window 3870 includes the original email message sent by Leigh, entitled "What did we say in our last . . . " and denoted with email icon 3478. Branching from that email is a reply email from the user entitled "I think we said . . . " and denoted with an email icon 3480. Branching from the first email icon 3478, is an Instant Messaging communication entitled "Now what?" and denoted with IM icon 3582. Branching from the IM messaging icon is a Voice over IP communication entitled "What were you saying . . . " and denoted 3684. Additionally branching from the first email icon 3478 is a web conference entitled "Plus, I think you . . . " and denoted with WC icon 3786. A PDF document entitled "whiteboard" and denoted with PDF icon 3888 was also communicated during that web conference.

One should note that the embodiments discussed herein relate to providing a user with the ability to associate communications created via any of a plurality of different communications mediums in a single thread. Similarly, data related to those communications can also be included in the created thread and provided to the user. While the embodiments discussed herein relate to associating a new communication to the current thread, as the new communication is established, other embodiments can also provide the user with the ability to retroactively associate past communications with a previously created thread. As a nonlimiting example, if a communications thread is established between the user and Leigh, and in a subsequent email, Leigh creates a new email (instead of replying to or forwarding the previously created email associated with communications thread), the user can later associate this email with the previously created communications thread. Such an association can take the form of a "drag and drop" or other action for signifying an association to the previously created communications thread.

Similarly, at least one embodiment can include the ability for a user to name a thread. When a user initially begins a thread by writing an email, instant message beginning a VoIP session, facilitating a web conference, etc. the user can also be provided with the option of naming the newly created thread. The option can be provided prior to initiating the communication thread, however this is not a requirement, as the option can be provided at any time. Additionally, other embodiments can provide a user option to name a previously created thread or to amend a previously named thread. As a name may be automatically generated when a thread is created or the user dislikes a previously created name, the user may change the name (or create a new name) after the thread is created. Additionally, while these naming options can be provided for user-specific naming of a thread, this is not a requirement. More specifically, at least one embodiment can provide an option for a user to universally name a thread. The universally named thread can have the same name for all participants in the thread, unless otherwise modified.

Still other embodiments can provide a user with the ability to concatenate or continue an existing saved thread with a new thread. More specifically, in at least one embodiment a user who is creating a new communication (e.g., email, instant message, VoIP, web conference, etc.) can be provided an option to associate the new communication as part of a previously created thread. Additionally, the user can be provided with the ability to determine where on the thread the new message is associated. Other embodiments can provide the user with the ability to associate (such as by using "drag and drop") communications, documents, files, etc. from a first thread to a second thread. This option provides a user with the ability to concatenate a communication with a communication thread as the communication is created or after the communication is complete (or anytime in between).

Figure 39:
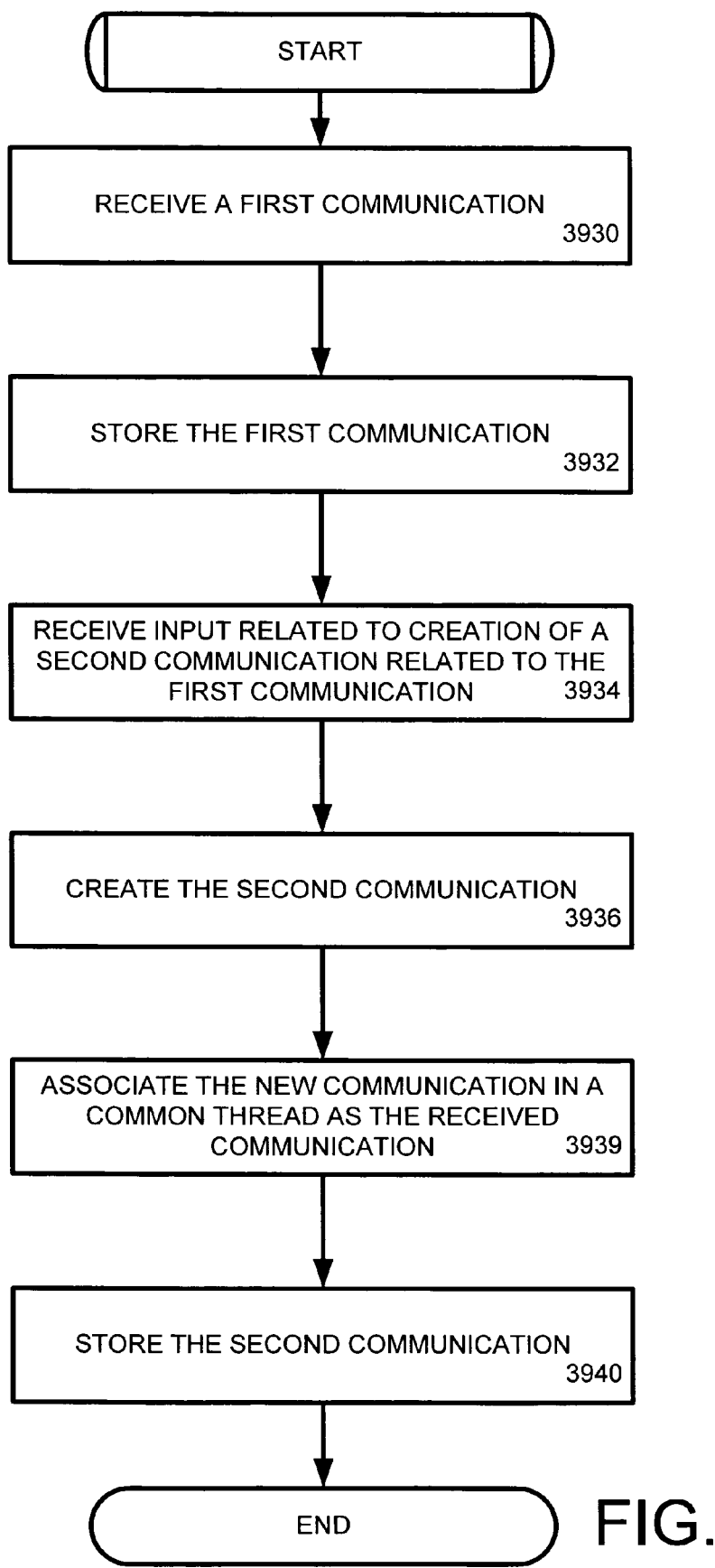
FIG. 39 is a flowchart illustrating exemplary steps that can be taken in associating a second communication to a first communication, as discussed with reference to FIG. 38.

FIG. 39 is a flowchart illustrating exemplary steps that can be taken in associating a second communication to a first communication, as discussed with reference to FIG. 38, among others. The first step in the flowchart of FIG. 39 is to receive a first communication (block 3930). The first communication can be received by logic associated with the user's client device (such as client device 3202) as an incoming communication, or the first communication can be received from the user of the client device 3202 as an outgoing communication (or both). Regardless, when the first communication is received, logic associated with the client device can store the received first communication (block 3932). Next, the logic associated with the user's client device 3202 can receive input related to the creation of a second communication that is related to the first communication (block 3935). As stated above, a user can create a new communication that is part of the thread as the first communication, despite the types of communication mediums being utilized. More specifically, if the first communication is an email, the second communication can be an email, an instant message, a VoIP communication, a web conference, or other type of communication. The user can select the desired option of creating a second communication that shares the thread of the first communication. Similarly, the first communication can take other forms, such as instant messaging session, VoIP session, web conference, etc.

The logic associated with the user's client device can then create the second message (block 3936). The logic can also associate the second message with the first message, in the same communication thread (block 3938). The logic can then store the second communication (block 3940).

Figure 40:
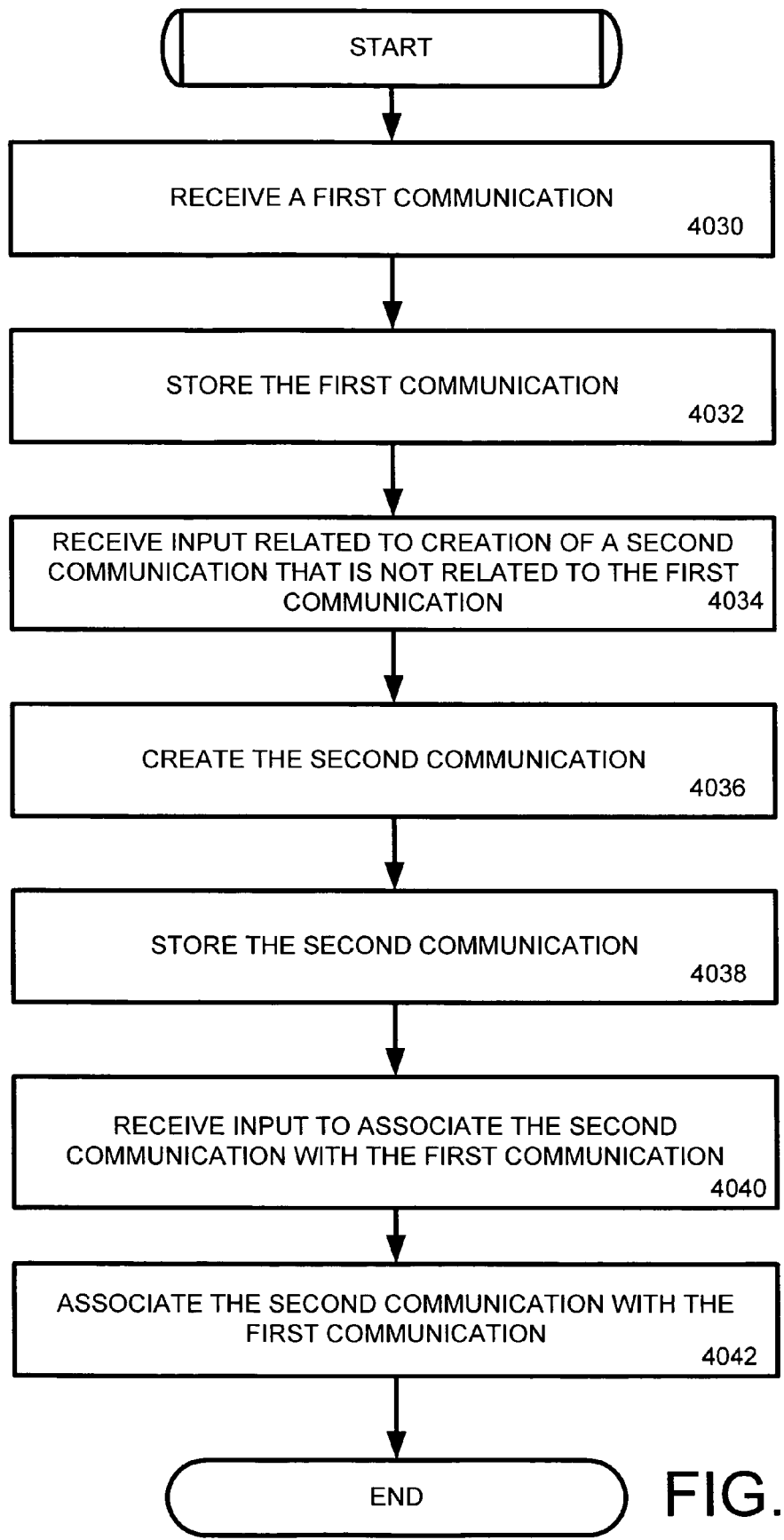
FIG. 40 is a flowchart illustrating exemplary steps that can be taken in retroactively associating a second message in a communication thread with a first message, similar to the flowchart of FIG. 39.

FIG. 40 is a flowchart illustrating exemplary steps that can be taken in retroactively associating a second message in a communication thread with a first message, similar to the flowchart of FIG. 39. The first step in the nonlimiting example of FIG. 40 is to receive a first communication (block 4030). Similar to the first step in the flowchart of FIG. 39, logic associated with the user's client device can receive the first communication from the user as an outgoing message or from a different client device as an incoming message. Regardless, upon receiving the first communication, the user's logic can store the first communication (block 4032). Once the communication is stored, the logic can receive input related to the creation of a second communication that is not associated with the first communication (block 4034). As discussed above, the user can create a communication that is unrelated to the received communication. In such a situation, the second message can be associated to a communication thread that is unrelated to the communication thread of the first communication.

Next, the logic can create the second communication (block 4036) and store the second communication (block 4038). Once the second communication is stored, the logic associated with the user's client device can receive an input (block 4040) associate the second message in the thread with the first message (or vice versa). The user can drag and drop or otherwise indicate a desired association of the second communication with the thread of the first communication. The user can designate where in the thread the second communication is to be positioned, as well as associate files related to the second communication with the first message thread. Additionally, logic can associate the second communication with the first communication (block 4042).

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art.

The address book object 108, the email user agent 106, the IM user agent 104, the tray manager 102, and other objects instantiated by these components may be implemented as a computer program, which comprises an ordered listing of executable instructions for implementing logical functions. As such the address book object 108, the email user agent 106, the IM user agent 104, the tray manager 102, the address book database 110, and other objects instantiated by these components can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while the disclosed embodiments show the various modules (e.g., address book object 108, the email user agent 106, the IM user agent 104, the tray manager 102, other objects instantiated by these components, etc.) as being in a distributed network, it will be clear to one of ordinary skill in the art that the various modules may be located on a server or a client without adverse effect to the functioning of the various components. All such changes, modifications, and alterations should therefore be seen as within the scope of the disclosure.

What is claimed is:

1. A method for associating information related to a first communication and information related to a second communication with a first communications thread representing communication between at least two users, the method comprising:
 receiving a first communication, the first communication being associated with a first protocol;
 associating the first communication with a first communication thread representing communications between at least two users;
 receiving a second communication, the second communication associated with a second protocol different from the first protocol;
 associating the second communication with the first communication thread;
 receiving at least one file associated with the second communication and associating the at least one file associated with the second communication with the first communication thread at a location on the first communication thread designated by a user;
 receiving a third communication, the third communication associated with a third protocol different from the first protocol and the second protocol; and
 associating the third communication with the first communication thread at a location on the first communication thread designated by a user;
 wherein the first communication thread is displayed as a graphical user interface.

2. The method of claim 1, wherein at least one of the first communication and the second communication includes at least one of a Voice over Internet Protocol (VoIP) communication and a web conference communication.

3. The method of claim 1, further comprising receiving user input related to associating the second communication with the first communication thread.

4. The method of claim 1, further comprising storing at least one of at least a portion of the first communication and at least a portion of the second communication.

5. The method of claim 1, wherein the first communication includes at least one of an email, an instant messaging chat session, a Voice over Internet Protocol (VoIP) session, and a web conference.

6. The method of claim 1, wherein the second communication includes at least one of an email, an instant messaging chat session, a Voice over Internet Protocol (VoIP) session, and a web conference.

7. The method of claim 1, further comprising determining that the first communication is associated with the first protocol.

8. The method of claim 1, further comprising determining that the second communication is associated with the second protocol.

9. The method of claim 1, further comprising receiving at least one user-defined name for the first communication thread.

10. A non transitory computer readable storage medium having stored thereon computer executable instructions for associating information related to a first communication and information related to a second communication with a communications thread representing communication between at least two users, the computer executable instructions defining steps-comprising:
   receiving a first communication, the first communication being associated with a first protocol;
   associating the first communication with a communication thread representing communications between at least two users;
   receiving a second communication, the second communication associated with a second protocol different from the first protocol;
   associating the second communication with the communication thread;
   receiving at least one file associated with the second communication and associating the at least one file associated with the second communication with the communication thread;
   receiving a third communication, the third communication associated with a third protocol different from the first protocol and the second protocol;
   receiving user instructions designating a location on the communication thread at which the third communication is to be associated; and
   associating the third communication with the communication thread at the location designated by the user;
   wherein the communication thread is displayed as a graphical user interface.

11. The non transitory computer readable medium of claim 10, wherein at least one of the first communication and the second communication includes at least one of a Voice over Internet Protocol (VoIP) communication and a web conference communication.

12. The non transitory computer readable medium of claim 10, the computer executable instructions further comprising the step of receiving user input related to associating the second communication with the communication thread.

13. The non transitory computer readable medium of claim 10, the computer executable instructions further comprising the step of storing at least a portion of one of the first communication and the second communication.

14. The non transitory computer readable medium of claim 10, wherein the first communication includes at least one of an email, an instant messaging chat session, a Voice over Internet Protocol (VoIP) session, and a web conference.

15. The non transitory computer readable medium of claim 10, wherein the second communication includes at least one of an email, an instant messaging chat session, a Voice over Internet Protocol (VoIP) session, and a web conference.

16. The non transitory computer readable medium of claim 10, the computer executable instructions further comprising the step of receiving at least one user-defined name for the communication thread.

17. A client device configured to associate a first communication with a second communication in a common thread, the client device comprising:
   a processor; and
   a non transitory computer readable storage medium in communication with said processor, the computer readable medium having stored thereon executable instructions for execution by said processor, the executable instructions defining steps comprising:
   receiving a first communication, the first communication being associated with a first protocol;
   receiving a second communication, the second communication being associated with a second protocol, wherein the first protocol is different from the second protocol;
   associating the first communication with a first communication thread representing communications between at least two users;
   associating the second communication with the first communication thread;
   associating at least one file associated with the second communication with the first communication thread;
   receiving a third communication, the third communication associated with a third protocol different from the first protocol and the second protocol;
   receiving user instructions designating a location on the first communication thread at which the third communication is to be associated; and
   associating the third communication with the first communication thread at the location designated by the user;
   wherein the first communication thread is displayed as a graphical user interface.

18. The client device of claim 17, wherein at least one of the first communication and the second communication includes at least one of a Voice over internet protocol (VoIP) communication and a web conference communication.

19. The client device of claim 17, the executable instructions further comprising the step of receiving user input related to associating the second communication with the first communication thread.

20. The client device of claim 17, the executable instructions further comprising the step of storing at least a portion of one of the first communication and the second communication.

21. The client device of claim 17, wherein the first communication includes at least one of an email, an instant messaging chat session, a Voice over Internet Protocol (VoIP) session, and a web conference.

22. The client device of claim 17, wherein the second communication includes at least one of an email, an instant messaging chat session, a Voice over Internet Protocol (VoIP) session, and a web conference.

23. The client device of claim 17, the executable instructions further comprising the step of receiving at least one user-defined name for the first communication thread.

* * * * *